US009682550B2

United States Patent
Katsuyama

(10) Patent No.: US 9,682,550 B2
(45) Date of Patent: Jun. 20, 2017

(54) DITHER MASK GENERATION METHOD AND DEVICE

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/958,376

(22) Filed: Dec. 3, 2015

(65) Prior Publication Data

US 2016/0167376 A1 Jun. 16, 2016

(30) Foreign Application Priority Data

Dec. 10, 2014 (JP) .................................. 2014-250292

(51) Int. Cl.
*B41J 2/045* (2006.01)
*G06K 15/10* (2006.01)

(52) U.S. Cl.
CPC ........ *B41J 2/04586* (2013.01); *G06K 15/107* (2013.01)

(58) Field of Classification Search
None
See application file for complete search history.

(56) References Cited

U.S. PATENT DOCUMENTS

2003/0025746 A1* 2/2003 Vega ................... B41J 2/04543 347/12
2010/0177137 A1* 7/2010 Kakutani ............... B41J 2/2132 347/15

FOREIGN PATENT DOCUMENTS

JP 2010-162770 A 7/2010

* cited by examiner

*Primary Examiner* — Christopher D Wait
(74) *Attorney, Agent, or Firm* — Studebaker & Brackett PC

(57) ABSTRACT

The dither mask generation method includes: a nozzle ejection rate determination process of determining a nozzle ejection rate of each nozzle in a recording head; a corresponding nozzle specifying process of specifying the nozzle corresponding to individual pixels of a dither mask by making at least one nozzle in charge of recording at each pixel position correspond to the individual pixels of the dither mask; a nozzle ejection rate reflecting processing process of performing processing of reflecting the nozzle ejection rate on an evaluation index when individual thresholds of the dither mask are set; and a threshold setting process of setting the thresholds to the individual pixels of the dither mask on the basis of the evaluation index.

15 Claims, 34 Drawing Sheets

FIG.12

| 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|
| 5 | 5 | 5 | 5 | 5 | 5 | 5 | 5 | 5 | 5 | 5 | 5 | 5 | 5 | 5 | 5 | 5 | 5 |
| 1 | 1 | 1 | 1 | 1 | 1 | 1 | 1 | 1 | 1 | 1 | 1 | 1 | 1 | 1 | 1 | 1 | 1 |
| 6 | 6 | 6 | 6 | 6 | 6 | 6 | 6 | 6 | 6 | 6 | 6 | 6 | 6 | 6 | 6 | 6 | 6 |
| 2 | 2 | 2 | 2 | 2 | 2 | 2 | 2 | 2 | 2 | 2 | 2 | 2 | 2 | 2 | 2 | 2 | 2 |
| 7 | 7 | 7 | 7 | 7 | 7 | 7 | 7 | 7 | 7 | 7 | 7 | 7 | 7 | 7 | 7 | 7 | 7 |
| 3 | 3 | 3 | 3 | 3 | 3 | 3 | 3 | 3 | 3 | 3 | 3 | 3 | 3 | 3 | 3 | 3 | 3 |
| 8 | 8 | 8 | 8 | 8 | 8 | 8 | 8 | 8 | 8 | 8 | 8 | 8 | 8 | 8 | 8 | 8 | 8 |
| 4 | 4 | 4 | 4 | 4 | 4 | 4 | 4 | 4 | 4 | 4 | 4 | 4 | 4 | 4 | 4 | 4 | 4 |
| 0 | 0 | 0 | 0 | 0 | 0 | 0 | 0 | 0 | 0 | 0 | 0 | 0 | 0 | 0 | 0 | 0 | 0 |
| 5 | 5 | 5 | 5 | 5 | 5 | 5 | 5 | 5 | 5 | 5 | 5 | 5 | 5 | 5 | 5 | 5 | 5 |
| 1 | 1 | 1 | 1 | 1 | 1 | 1 | 1 | 1 | 1 | 1 | 1 | 1 | 1 | 1 | 1 | 1 | 1 |
| 6 | 6 | 6 | 6 | 6 | 6 | 6 | 6 | 6 | 6 | 6 | 6 | 6 | 6 | 6 | 6 | 6 | 6 |
| 2 | 2 | 2 | 2 | 2 | 2 | 2 | 2 | 2 | 2 | 2 | 2 | 2 | 2 | 2 | 2 | 2 | 2 |
| 7 | 7 | 7 | 7 | 7 | 7 | 7 | 7 | 7 | 7 | 7 | 7 | 7 | 7 | 7 | 7 | 7 | 7 |
| 3 | 3 | 3 | 3 | 3 | 3 | 3 | 3 | 3 | 3 | 3 | 3 | 3 | 3 | 3 | 3 | 3 | 3 |
| 8 | 8 | 8 | 8 | 8 | 8 | 8 | 8 | 8 | 8 | 8 | 8 | 8 | 8 | 8 | 8 | 8 | 8 |
| 4 | 4 | 4 | 4 | 4 | 4 | 4 | 4 | 4 | 4 | 4 | 4 | 4 | 4 | 4 | 4 | 4 | 4 |

FIG.27

FIG.29
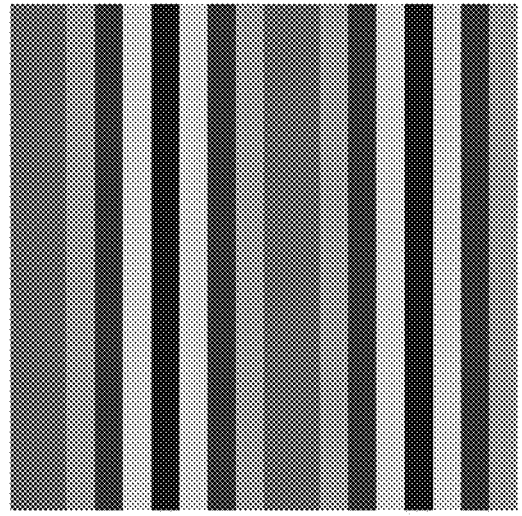
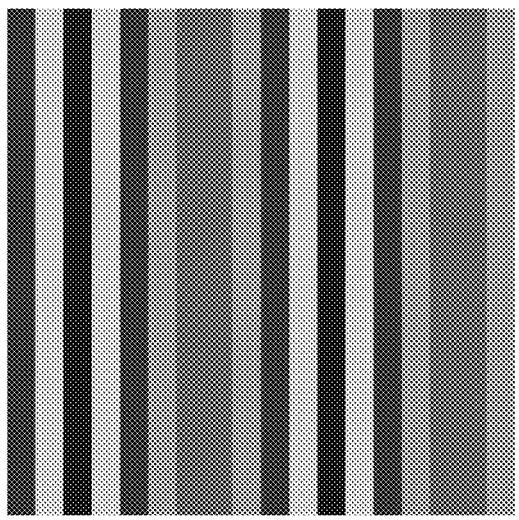
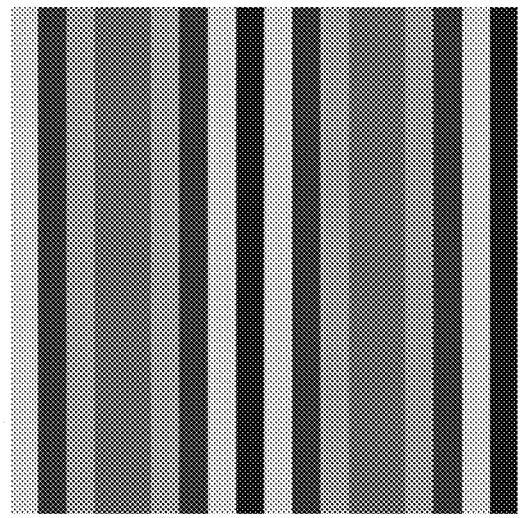

FIG.31
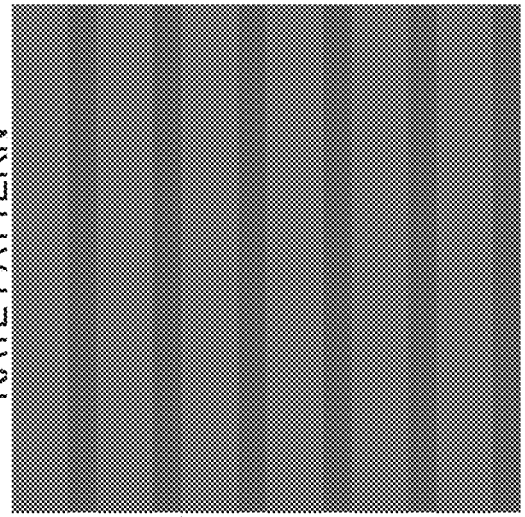
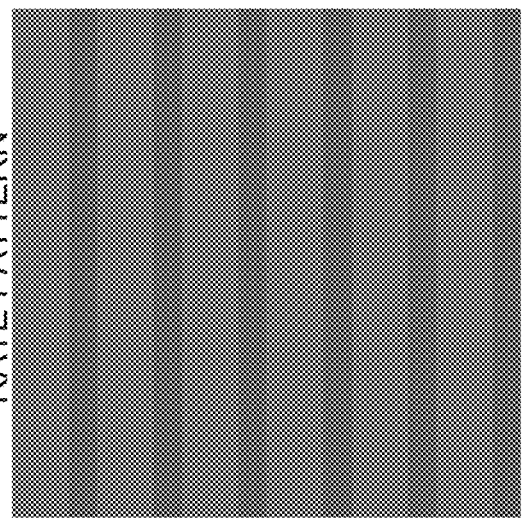
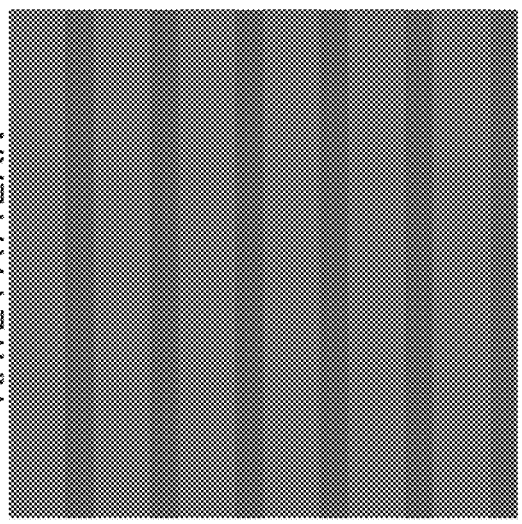

DITHER MASK GENERATION METHOD AND DEVICE

CROSS-REFERENCE TO RELATED APPLICATIONS

The patent application claims priority under 35 U.S.C. §119 to Japanese Patent Application No. 2014-250292 filed on Dec. 10, 2014. Each of the above application is hereby expressly incorporated by reference, in its entirety, into the present application.

BACKGROUND OF THE INVENTION

Field of the Invention

The present invention relates to a dither mask generation method and device, and in particular relates to a technology of generating a dither mask used in halftone processing utilized in ink ejection control of an inkjet printer.

Description of the Related Art

Japanese Patent Application Laid-Open No. 2010-162770 gazette discloses a serial type inkjet printer that controls ejection of each nozzle of a print head by performing halftone processing by an ordered dither method using a dither mask. The serial type inkjet printer records images on a recording medium by repeating a scan operation of ejecting ink from a nozzle of a print head while moving the print head along a main scanning direction and a medium conveying operation which is sub scanning feed of intermittently conveying the recording medium in a sub scanning direction.

In such a recording method, behavior of impacted droplets on a recording medium, that is, dot behavior, is changed by recording position errors of individual dots to the recording medium by individual nozzles of a print head, ejection amount errors of the individual nozzles, a recording order or recording timing of dots or the like. Due to the change of the dot behavior on the recording medium, density irregularity called "banding" in which a recording density changes in a repetition cycle of individual print paths, a boundary of the individual print paths is conspicuous or the like is generated. When banding is generated, a problem that print image quality declines arises.

For such a problem, in the printer described in Japanese Patent Application Laid-Open No. 2010-162770 gazette, banding is suppressed by setting a threshold of the dither mask such that a nozzle using rate of at least one of nozzle groups (including most distal end nozzles arranged at both individual ends) arranged at each of both ends of a nozzle array of the print head becomes lower than a nozzle using rate of an intermediate nozzle group arranged between the nozzle groups at both ends. Japanese Patent Application Laid-Open No. 2010-162770 gazette discloses a method of generating a dither mask that makes a dot density of pixels recorded by the nozzle groups at both ends of the nozzle array lower than a dot density of pixels recorded by the intermediate nozzle group to suppress banding.

It is understood that "print head" in Japanese Patent Application Laid-Open No. 2010-162770 gazette is a term corresponding to "recording head" in the present specification. Also, it is understood that "nozzle using rate" in Japanese Patent Application Laid-Open No. 2010-162770 gazette is a term corresponding to "nozzle ejection rate" in the present specification.

SUMMARY OF THE INVENTION

In the method of generating a dither mask disclosed in Japanese Patent Application Laid-Open No. 2010-162770 gazette, first, a dot suppression threshold for suppressing recording of dots is set to specific pixels of the dither mask. Then, positions of the specific pixels to which the dot suppression threshold is applied are excluded, that is, a mask that excludes the specific pixels is applied, and a threshold of the dither mask is optimally arranged regarding remaining pixels (paragraph 0045 in Japanese Patent Application Laid-Open No. 2010-162770 gazette). Thereafter, by optimally arranging the dot suppression threshold to the excluded specific pixels, a target dither mask is obtained.

However, in the method of generating a dither mask disclosed in Japanese Patent Application Laid-Open No. 2010-162770 gazette, since generation of dots is suppressed for predetermined specific pixels, as a result, dots are densely generated at the pixels around the specific pixels, and a dot distribution is distorted. That is, dispersibility of dots is poor, and graininess of dot arrangement is deteriorated.

Further, in the case that the specific pixels are sparsely distributed within an area of an image to be recorded on a recording medium, at a low recording duty, an effect of suppressing the nozzle ejection rate of the nozzle group corresponding to the specific pixels cannot be obtained. A recording duty is a ratio of pixels to be dot-on in the individual pixels of an image to be recorded on a recording medium. The recording duty is sometimes called by a term such as a printing duty, a print duty, or a recording rate.

The above-described problem is related not only to the serial type inkjet printer but also to a single path type inkjet printer that uses a line head. The line head is often configured by connecting a plurality of head modules in a main scanning direction. In the case of using the line head having such a structure, on an end of the head module corresponding to a part of a joint of the individual head modules, a superimposing area of a nozzle group that overlaps with a recording area of a nozzle array of the other head module is provided.

Due to a difference in characteristics of the individual head modules configuring the line head, there are cases that stripes or irregularity is generated in the superimposing area at a joint part or density irregularity is generated in a cycle of a main scanning direction length of the head module. The problem like this is similar to "banding" explained for a serial type inkjet printer at a point that stripe or belt-like density irregularity is generated. The term "banding" in the present specification is used for an inclusive meaning including not only the density irregularity by the serial type inkjet printer but also the density irregularity by a single path type inkjet printer.

The present invention is implemented in consideration of such a situation, and an object is to provide a dither mask generation method and device capable of generating a dither mask that can improve graininess of dot arrangement compared to a conventional method, and can obtain halftone images capable of achieving a target nozzle ejection rate regardless of a recording duty.

To achieve the object, the following invention aspects are provided.

A dither mask generation method relating to a first aspect is a method of generating a dither mask used in halftone processing, and the dither mask generation method includes: a nozzle ejection rate determination process of determining a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording; a corresponding nozzle specifying process of specifying the nozzle corresponding to the individual pixels of the dither mask by making at least one nozzle in charge of recording at each pixel position correspond to the individual pixels of the dither mask; a nozzle ejection rate reflecting processing process of performing processing of reflecting the nozzle ejection rate on an evaluation index when setting individual thresholds of the dither mask; and a threshold setting process of setting the thresholds to the individual pixels of the dither mask on the basis of the evaluation index.

According to the first aspect, when the individual thresholds of the dither mask are set, the pixel to set the threshold can be determined on the basis of the evaluation index reflecting the nozzle ejection rate. According to the first aspect, there is no restriction of threshold arrangement to be a problem in a conventional method, and the dither mask capable of achieving a dot arrangement with excellent dispersibility by a dot density corresponding to the target nozzle ejection rates of the individual nozzles can be obtained. The nozzle ejection rates of the individual nozzles can be appropriately set from a viewpoint of obtaining a banding suppressing effect. The nozzle ejection rate that suppresses banding can be determined according to characteristics of the recording head such as a nozzle array form and image drawing conditions or the like. The dither mask generated by the dither mask generation method of the first aspect can control the nozzle ejection rates of the individual nozzles to the target nozzle ejection rates regardless of the recording duty, and can effectively suppress banding.

As a second aspect, in the dither mask generation method of the first aspect, a configuration can be such that the method includes a gradation conversion process of converting gradation values of the individual pixels, reflecting the nozzle ejection rates of the nozzles corresponding to the individual pixels, which are specified by the corresponding nozzle specifying process, on the gradation values of the individual pixels in an input value uniform image, and an input image reflecting the nozzle ejection rate is generated by the gradation conversion process.

As a third aspect, in the dither mask generation method of the second aspect, the configuration can be such that the method includes a correction process of correcting the nozzle ejection rate, and the correction process performs correction to the value of the nozzle ejection rate that makes an average gradation value per unit area be invariable before and after reflecting the nozzle ejection rate in the gradation conversion process.

As a fourth aspect, in the dither mask generation method of the second aspect or the third aspect, the configuration can be such that the method includes a first low-pass filter processing process of generating a second image by convoluting a first low-pass filter to a first image that is an input image reflecting the nozzle ejection rate, generated by the gradation conversion process.

As a fifth aspect, in the dither mask generation method of the fourth aspect, the configuration can be such that the first low-pass filter is a filter of a function indicating a human visual characteristic, or a filter of a Gaussian function.

As a sixth aspect, in the dither mask generation method of the fourth aspect or the fifth aspect, the configuration can be such that the method includes a first dot arrangement generation process of generating a first dot arrangement corresponding to the first image, and a second low-pass filter processing process of generating a third image by convoluting a second low-pass filter to the first dot arrangement.

As a seventh aspect, in the dither mask generation method of the sixth aspect, the configuration can be such that the second low-pass filter is a filter of a function indicating a human visual characteristic, or a filter of a Gaussian function.

As an eighth aspect, in the dither mask generation method of the sixth aspect or the seventh aspect, the configuration can be such that the method includes a process of temporarily setting a target pixel to threshold non-set pixels to which the threshold is not set among the pixels of the dither mask, and temporarily placing or temporarily removing a dot for the target pixel in the first dot arrangement, and a process of temporarily correcting the third image accompanying the temporary placement or temporary removal of the dot, and an error between the second image and the third image is calculated as the evaluation index.

As a ninth aspect, in the dither mask generation method of the sixth aspect or the seventh aspect, the configuration can be such that the method includes a fourth image generation process of generating a fourth image indicating a difference between the second image and the third image, and the threshold setting process of determining the pixels that improve uniformity of a gradation distribution of the fourth image in the case of correcting the third image and the fourth image accompanying execution of dot installation or removal, among the individual pixels in the first dot arrangement corresponding to the individual pixels by comparing values of the individual pixels of the fourth image, and setting the thresholds to the determined pixels.

As a tenth aspect, in the dither mask generation method of the ninth aspect, the configuration can be such that the fourth image generation process generates the fourth image indicating a difference between the second image and the third image by subtraction of pixel values of the pixels corresponding to each other between the images of the second image and the third image.

As an eleventh aspect, in the dither mask generation method of the ninth aspect, the configuration can be such that the fourth image generation process generates the fourth image indicating a ratio between the second image and the third image by division of pixel values of the pixels corresponding to each other between the images of the second image and the third image.

As a twelfth aspect, in the dither mask generation method of any one aspect of the first aspect to the eleventh aspect, the configuration can be such that the plurality of nozzles corresponding to the individual pixels of the dither mask are present.

As a thirteenth aspect, in the dither mask generation method of any one aspect of the first aspect to the twelfth aspect, the configuration can be such that the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

As a fourteenth aspect, in the dither mask generation method of the thirteenth aspect, the configuration can be such that the nozzle ejection rate determination process makes the nozzle ejection rate of the nozzle arranged at an end of the nozzle array lower than the nozzle ejection rate of the nozzle arranged at a center part of the nozzle array.

As a fifteenth aspect, in the dither mask generation method of any one aspect of the first aspect to the fourteenth aspect, the configuration can be such that the nozzle ejection rate of each nozzle is controlled by the dither mask and the dither mask is position-shifted in a sub scanning direction and arranged, to image data, when the dither mask is applied to the image data, in the halftone processing, and the configuration can be such that, in the case that m is an integer equal to or larger than 2 and p is an integer equal to or larger than 1 and is smaller than m, a size in the sub scanning direction of the dither mask is m, a shift amount in the sub scanning direction of the dither mask is p, and p and m−p are different from a nozzle pitch in the sub scanning direction and a divisor of the nozzle pitch.

"Controlling the nozzle ejection rate of each nozzle by the dither mask" means controlling the nozzle ejection rates of the individual nozzles to the target nozzle ejection rates by a halftone image obtained by applying the dither mask to the image data by the halftone processing. That is, it means achieving the target nozzle ejection rates of the individual nozzles in the dot arrangement of the halftone image obtained by applying the dither mask.

Also, "p and m−p are different from a nozzle pitch in the sub scanning direction and a divisor of the nozzle pitch" means that p is different from the nozzle pitch and is also different from the divisor of the nozzle pitch, and further, m−p is different from the nozzle pitch and is also different from the divisor of the nozzle pitch. The term "nozzle pitch" has the same meaning as a term "nozzle interval" or "inter-nozzle distance".

"The nozzle pitch in the sub scanning direction" means a nozzle interval in the sub scanning direction in the nozzle array configured by an array of the plurality of nozzles. It is possible to express m, p and the nozzle pitch with the size in the sub scanning direction of the pixel defined from a recording resolution (that is, a pixel pitch in the sub scanning direction) as a unit.

A dither mask generation device relating to a sixteenth aspect is a device that generates a dither mask used in halftone processing, and the dither mask generation device includes: a nozzle ejection rate determination unit that determines a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording; a corresponding nozzle specifying unit that specifies the nozzle corresponding to the individual pixels of the dither mask by making at least one nozzle in charge of recording at each pixel position correspond to the individual pixels of the dither mask; a nozzle ejection rate reflecting processing unit that performs processing of reflecting the nozzle ejection rate on an evaluation index when individual thresholds of the dither mask are set; and a threshold setting unit that sets the thresholds to the individual pixels of the dither mask on the basis of the evaluation index.

In the dither mask generation device of the sixteenth aspect, matters similar to specific matters of the dither mask generation method specified in the second aspect to the fifteenth aspect can be appropriately combined. In that case, a process (step) of processing or an operation specified in the dither mask generation method can be recognized as an element of a processing unit or a functional unit as a device in charge of the processing or the operation corresponding thereto.

A non-transitory computer-readable recording medium relating to a seventeenth aspect, including a program for making a computer achieve a function of generating a dither mask used in halftone processing, stored thereon, such that when the program is read and executed by the computer, the computer achieves: a nozzle ejection rate determination function of determining a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording; a corresponding nozzle specifying function of specifying the nozzle corresponding to the individual pixels of the dither mask by making at least one nozzle in charge of recording at each pixel position correspond to the individual pixels of the dither mask; a nozzle ejection rate reflecting processing function of performing processing of reflecting the nozzle ejection rate on an evaluation index when individual thresholds of the dither mask are set; and a threshold setting function of setting the thresholds to the individual pixels of the dither mask on the basis of the evaluation index.

In the medium of the seventeenth aspect, matters similar to specific matters of the dither mask generation method specified in the second aspect to the fifteenth aspect can be appropriately combined. In that case, a process (step) of processing or an operation specified in the dither mask generation method can be recognized as an element of "function" of the program that performs the processing or the operation corresponding thereto.

According to the present invention, it is possible to generate a dither mask that can improve graininess of dot arrangement of a dot density corresponding to a nozzle ejection rate compared to a conventional method, and can obtain halftone images of the dot arrangement to be a target nozzle ejection rate regardless of a recording duty. By performing halftone processing using the dither mask obtained by the present invention, banding can be effectively suppressed.

BRIEF DESCRIPTION OF THE DRAWINGS

FIG. 12 is an explanatory diagram illustrating one example of the nozzle pattern;

FIG. 27 is an explanatory diagram of nozzle numbers corresponding to individual pixels of the dither mask in the case of mask shifting processing;

FIG. 29 is an explanatory diagram schematically illustrating values of the nozzle ejection rates in individual ejection rate patterns by shades;

FIG. 31 is an explanatory diagram schematically illustrating the value of the nozzle ejection rate in the case of applying the average ejection rate pattern to each of the nozzle patterns illustrated in FIG. 27 by shades;

FIG. 33 is an explanatory diagram illustrating an example in the case of satisfying a condition that all the nozzle numbers are circulated;

FIG. 34 is an explanatory diagram illustrating another example in the case of satisfying the condition that all the nozzle numbers are circulated;

DETAILED DESCRIPTION OF THE EMBODIMENTS

Hereinafter, a mode for carrying out the present invention is described in detail according to the accompanying drawings.

<Configuration Example of Inkjet Recording Device>

Figure 1:
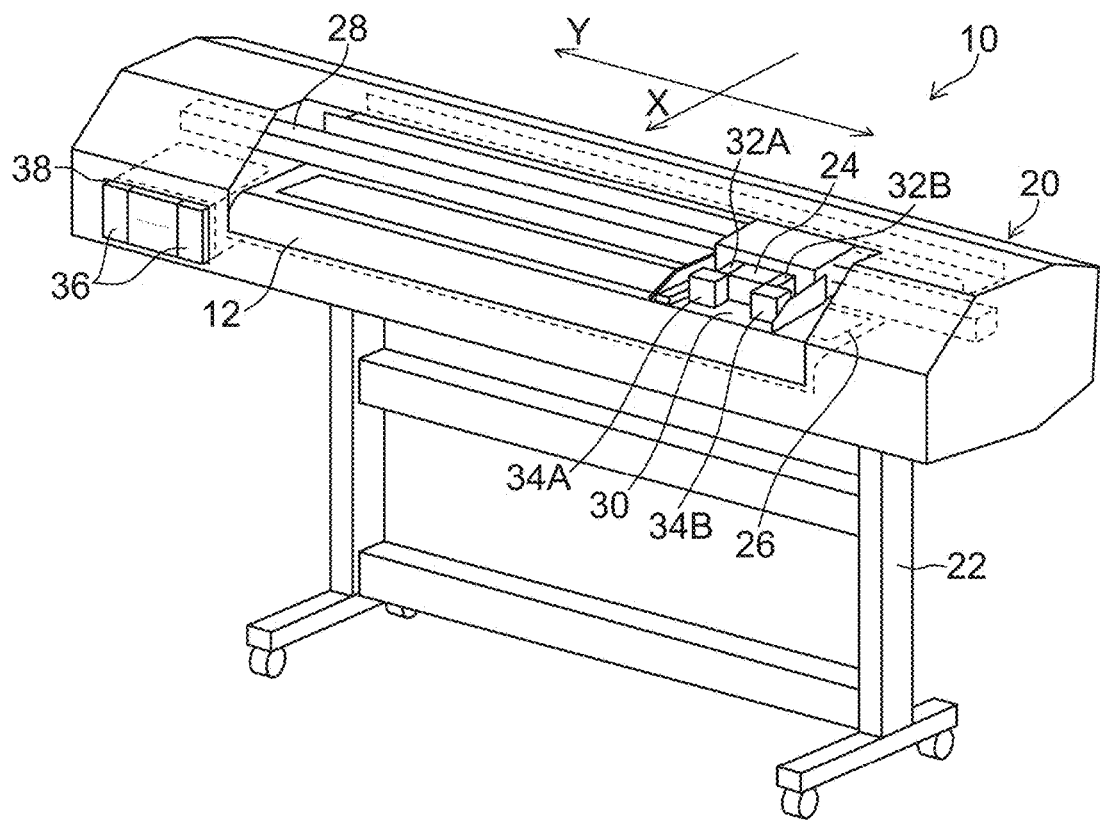
FIG. 1 is an external perspective view illustrating a configuration example of an inkjet recording device.

FIG. 1 is an external perspective view illustrating a configuration example of an inkjet recording device. An inkjet recording device 10 is one example of a serial type inkjet printer, and is a wide format printer that records a color image onto a recording medium 12 using ultraviolet curing type ink. However, in application of the invention, a form of the inkjet recording device is not limited to this example.

The inkjet recording device 10 includes a device body 20, and a support leg 22 that supports the device body 20. The device body 20 is provided with a recording head 24, a platen 26, a guide mechanism 28, and a carriage 30.

The recording head 24 is a drop-on-demand type inkjet head that ejects ink toward the recording medium 12. The term "recording head" has the same meaning as terms such as a print head, a printing head, a drawing head, an ink ejecting head, a liquid ejecting head, a droplet ejecting head, or a droplet jetting head or the like. Also, the term "inkjet recording device" has the same meaning as terms such as an inkjet printing device, an inkjet printing machine, an inkjet printer, or an inkjet type image forming apparatus or the like. "Recording" is used as a term that includes the meaning of print, printing, drawing or image formation.

For the recording medium 12, various media can be used regardless of a material such as paper, nonwoven fabric, vinyl chloride, synthetic chemical fibers, polyethylene, polyester, or tarpaulin. The recording medium 12 may be a permeable medium or may be an impermeable medium. The term "recording medium" is a general term of a medium to which ink is deposited, and includes the ones called by various terms such as a printing medium, a recording target medium, an image formation target medium, an image receiving medium, an ejection target medium, a print medium, recording paper or print paper. The term "paper" in the present specification is used for the same meaning as "recording medium".

The platen 26 is a member that supports the recording medium 12. The guide mechanism 28 and the carriage 30 function as a head moving device that movably supports the recording head 24. The guide mechanism 28 is arranged extending along a head scanning direction which is a direction that intersects with a conveyance direction of the recording medium 12 and is a direction parallel to a medium support surface of the platen 26 at an upper part of the platen 26. The upper part of the platen 26 means a high position on an upper side of the platen 26 with a gravity direction as "lower part". The conveyance direction of the recording medium 12 is sometimes called "paper feed direction". Also, a direction which is orthogonal to the paper feed direction and the direction parallel to a recording surface of the recording medium 12 is sometimes called "paper width direction".

The carriage 30 is supported movably back and forth in the paper width direction along the guide mechanism 28. The direction parallel to the reciprocating moving direction of the carriage 30 corresponds to "main scanning direction". Also, the direction parallel to the conveyance direction of the recording medium 12 corresponds to "sub scanning direction". That is, the paper width direction is the main scanning direction, and the paper feed direction is the sub scanning direction. In FIG. 1, the sub scanning direction is noted as an X direction, and the main scanning direction is noted as a Y direction.

The carriage 30 is loaded with the recording head 24, temporarily curing light sources 32A and 32B, and full curing light sources 34A and 34B. The recording head 24, the temporarily curing light sources 32A and 32B, and the full curing light sources 34A and 34B are integrally moved together with the carriage 30 along the guide mechanism 28. By moving the carriage 30 back and forth in the main scanning direction along the guide mechanism 28, the recording head 24 can be relatively moved in the main scanning direction to the recording medium 12.

The temporarily curing light sources 32A and 32B emit ultraviolet rays for temporarily curing ink impacted onto the recording medium 12. Temporary curing means partial curing of the ink so as to prevent movement and deformation of ink droplets immediately after deposition. A process of the temporary curing is sometimes called "partial curing", "semi-curing", "pinning" or "set" or the like. In the present specification, the term "temporary curing" is used.

On the other hand, a process of further emitting ultraviolet rays and sufficiently curing the ink after the temporary curing is called "full curing" or "curing". In the present specification, the term "full curing" is used. The full curing light sources 34A and 34B are light sources that perform additional exposure after the temporary curing and emit ultraviolet rays for completely curing (that is, fully curing) the ink finally.

The device body 20 is provided with an attaching unit 38 for attaching an ink cartridge 36. The ink cartridge 36 is a freely exchangeable ink tank that stores the ultraviolet curing type ink. The ink cartridge 36 is provided corresponding to the ink of each color used in the inkjet recording device 10. The inkjet recording device 10 of this example is configured to use the ink of four colors that are cyan (C), magenta (M), yellow (Y), and black (K). The individual ink cartridges 36 for the respective colors are connected to the recording head 24 by respectively independently formed ink supply routes not shown in the figure. When an ink residual amount of each color becomes small, the ink cartridge 36 is exchanged.

Though omitted in the figure, on a right side facing the front of the device body 20, a maintenance unit of the recording head 24 is provided. The maintenance unit includes a cap for moisture retention and nozzle suction of the recording head 24 when printing is not performed, and a wiping member for cleaning a nozzle surface which is an ink ejection surface of the recording head 24. For the wiping member, a blade and/or a web can be used.

[Configuration of Recording Medium Conveyance Path]

Figure 2:
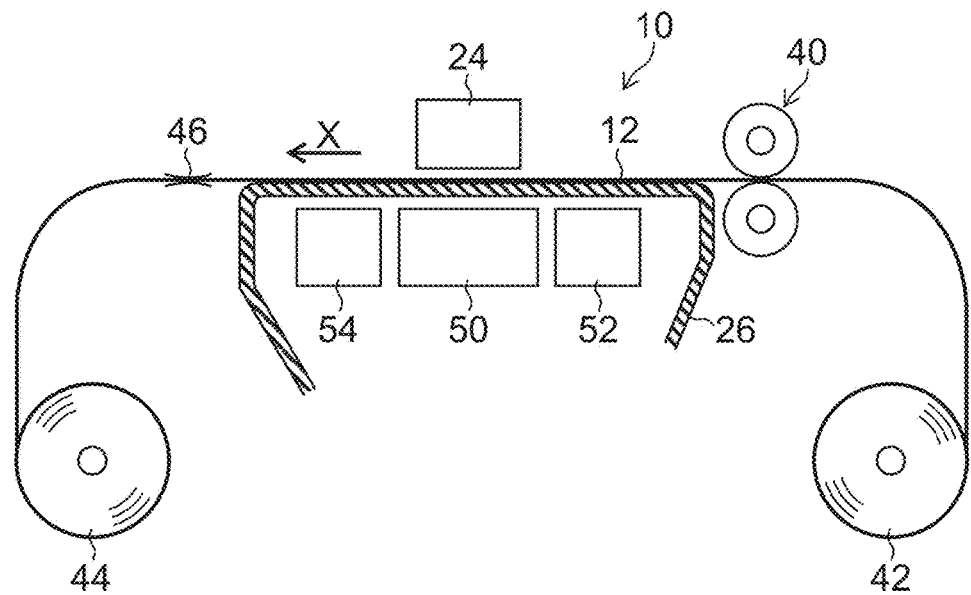
FIG. 2 is a schematic diagram schematically illustrating a recording medium conveyance path of the inkjet recording device.

FIG. 2 is a schematic diagram schematically illustrating a recording medium conveyance path of the inkjet recording device 10. As illustrated in FIG. 2, an upper surface of the platen 26 becomes a support surface of the recording medium 12. A nip roller 40 is disposed on an upstream side of the paper feed direction relative to a position of the platen 26.

The recording medium 12 of this example is supplied in a form of continuous paper (also called web paper) wound in a roll shape. The recording medium 12 sent out from a roll 42 on a supply side is conveyed by the nip roller 40. To the recording medium 12 which arrives at a part right below the recording head 24, an image is recorded by the recording head 24. On a downstream side of the paper feed direction relative to the position of the recording head 24, a winding roll 44 that winds the recording medium 12 after the image is recorded is provided. Also, in the conveyance path of the recording medium 12 between the platen 26 and the winding roll 44, a guide 46 is provided.

In the inkjet recording device 10 of the present embodiment, a roll-to-roll type paper conveyance device by which the recording medium 12 sent out from the roll 42 on the supply side is wound to the winding roll 44 through the platen 26 is adopted. However, in implementing the invention, the configuration of the paper conveyance device is not limited to this example. For example, a form that the winding roll 44 is omitted and a form that has a cutter which cuts the recording medium 12 into a desired size or the like are also possible. Also, the recording medium 12 is not limited to the continuous paper, and may be a form of cut paper that is separated sheet by sheet (that is, sheet paper).

On a back surface side of the platen 26, that is, on an opposite side of the medium support surface that supports the recording medium 12 on the platen 26, a temperature control unit 50 that adjusts a temperature of the recording medium 12 while recording images is provided. By temperature adjustment by the temperature control unit 50, a physical property value such as viscosity or surface tension of the ink impacted on the recording medium 12 is turned to a desired value, and a desired dot diameter can be obtained. Also, a pre-temperature-control unit 52 is provided on the upstream side in the paper feed direction of the temperature control unit 50, and an after-temperature-control unit 54 is provided on the downstream side in the paper feed direction of the temperature control unit 50. The configuration of omitting the pre-temperature-control unit 52 and/or the after-temperature-control unit 54 is also possible.

[Configuration Example of Recording Head]

Figure 3:
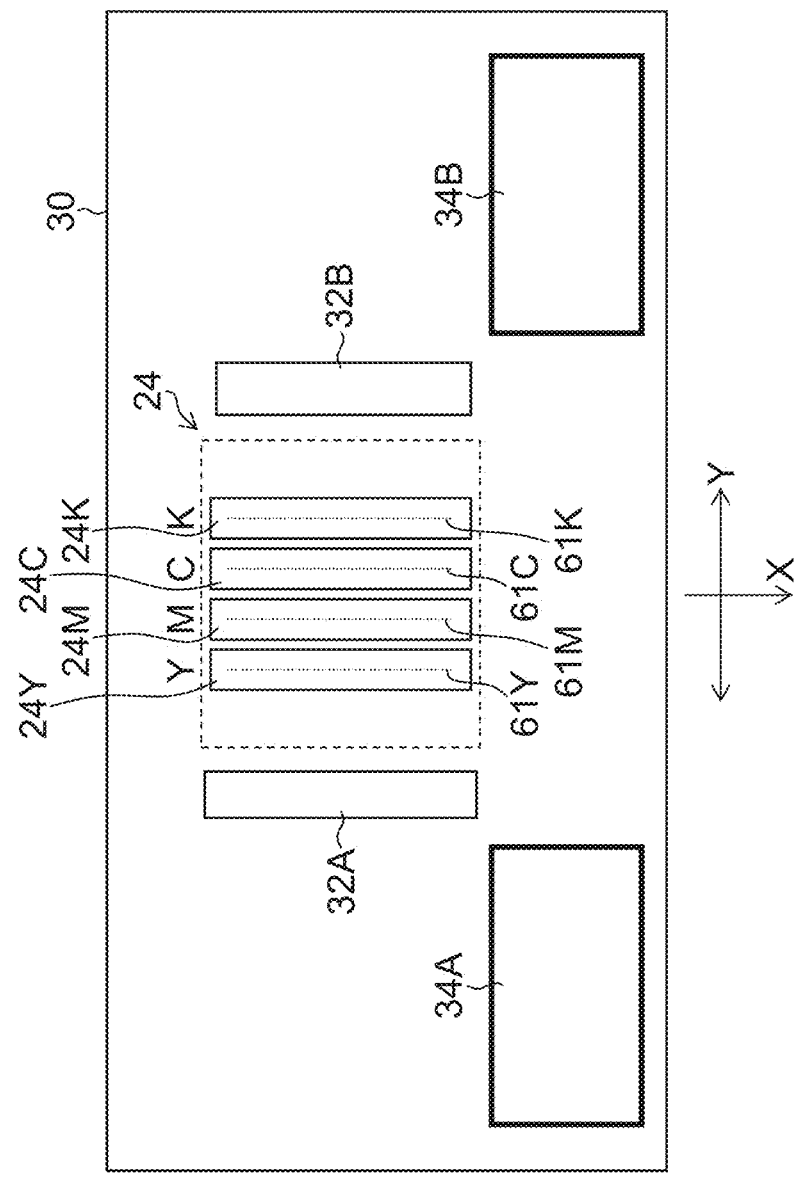
FIG. 3 is a plane perspective view illustrating an example of an arrangement form of a recording head arranged on a carriage.
Figure 4:
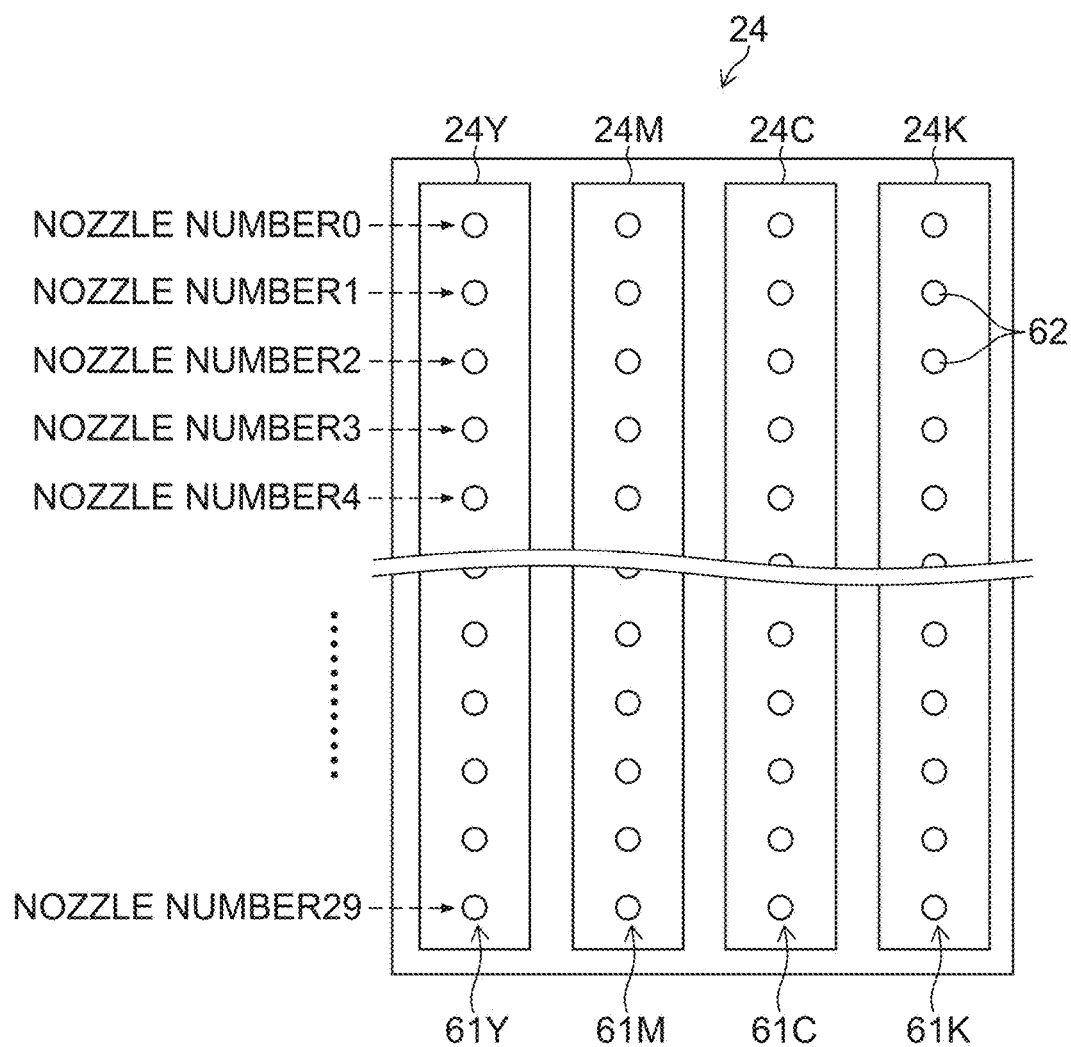
FIG. 4 is an enlarged view of the recording head in FIG. 3.

FIG. 3 is a plane perspective view illustrating an example of an arrangement form of the recording head 24, the temporarily curing light sources 32A and 32B and the full curing light sources 34A and 34B arranged on the carriage 30. FIG. 4 is an enlarged view of the recording head 24 in FIG. 3.

As illustrated in FIG. 3 and FIG. 4, the recording head 24 is provided with nozzle arrays 61C, 61M, 61Y and 61K formed by arraying nozzles 62 (see FIG. 4) for ejecting the ink of the respective colors in the sub scanning direction, for each of the ink of the respective colors that are cyan (C), magenta (M), yellow (Y) and black (K).

In FIG. 3, the nozzle arrays are illustrated by dotted lines, and individual illustrations of the nozzles are omitted. In the recording head 24 illustrated in FIG. 3 and FIG. 4, an example that the individual nozzle arrays are arranged in an order of the nozzle array 61Y for yellow, the nozzle array 61M for magenta, the nozzle array 61C for cyan, and the nozzle array 61K for black from the left of the figure is illustrated, however, kinds (the number of the colors) of the ink colors and color combinations are not limited by the present embodiment.

For example, in addition to four colors of CMYK, the configuration of using light shade ink such as light cyan or light magenta, or the configuration of using the ink of other special colors further instead of the light shade ink or in combination with the light shade ink is also possible. A form of adding a nozzle array that ejects pertinent ink corresponding to the kind of the ink color to be used is possible. Also, an arranging order of the nozzle arrays for the respective colors is not limited in particular. However, it is preferable to arrange the nozzle array of the ink whose curing sensitivity to ultraviolet rays is relatively low among a plurality of ink kinds on a side close to the temporarily curing light source 32A or 32B.

In the present embodiment, a head module is configured for each of the nozzle arrays 61C, 61M, 61Y and 61K for the respective colors, and the recording head 24 is configured by lining the head modules. Specifically, a head module 24Y having the nozzle array 61Y that ejects yellow ink, a head module 24M having the nozzle array 61M that ejects magenta ink, a head module 24C having the nozzle array 61C that ejects cyan ink, and a head module 24K having the nozzle array 61K that ejects black ink are arranged at equal intervals so as to be lined along the reciprocating moving direction (that is, the main scanning direction) of the carriage 30.

The entire module group of the head modules 24Y, 24M, 24C and 24K for the respective colors may be interpreted as "recording head", or it is also possible to interpret each head module as "recording head" respectively. Also, instead of the configuration of combining the head modules 24Y, 24M, 24C and 24K for the respective colors, the configuration of forming ink flow paths separately for the respective colors inside one recording head and having the nozzle array that ejects the ink of the plurality of colors by one head is also possible.

As illustrated in FIG. 4, for each of the nozzle arrays 61C, 61M, 61Y and 61K, the plurality of nozzles 62 are lined and arrayed at fixed intervals in the sub scanning direction. FIG. 4 illustrates an example that 30 pieces of the nozzles 62 are arrayed respectively in the nozzle arrays 61C, 61M, 61Y and 61K for the respective colors. To the individual nozzles 62, nozzle numbers 0-29 are imparted.

The nozzle numbers in this example are imparted to the individual nozzles 62 by consecutive numbers in an order from one end side to the other end side in the sub scanning direction in the nozzle array. In this example, the nozzle numbers start from the number 0, however, a leading number of the nozzle numbers may be the number 1. The leading number can be an arbitrary integer equal to or larger than 0. The nozzle numbers can be used as identification numbers indicating positions of the individual nozzles 62.

Also, the nozzle array in which 30 pieces of the nozzles 62 are arranged in one line along the sub scanning direction is illustrated, however, the number of the nozzles configuring the nozzle array and an arrangement form of the nozzles are not limited to this example. For example, it is possible to form the nozzle array in which the nozzles are lined at equal intervals in the sub scanning direction by a two-dimensional nozzle array for which the plurality of nozzle arrays are combined.

As an ink ejection system of the recording head 24, a piezojet system of jetting the ink by deformation of a piezoelectric element is adopted. The configuration of using an electrostatic actuator instead of the piezoelectric element as an ejection energy generating element is also possible. Also, it is possible to adopt a thermal jet system of generating air bubbles by using a heat generating body (heating element) such as a heater and heating the ink, and jetting ink droplets by the pressure. However, since generally the ultraviolet curing type ink is highly viscous compared to solvent ink, in the case of using the ultraviolet curing type ink, it is preferable to adopt the piezojet system of relatively great ejection power.

The recording head 24 ejects the ink to the recording medium 12 while moving in the main scanning direction, and performs image recording in an area having a fixed length in the sub scanning direction of the recording medium 12. Then, when the recording medium 12 is moved by a fixed amount in the sub scanning direction after the image recording, the recording head 24 performs the similar image recording in the next area, and thereafter, repeatedly performs the similar image recording every time the recording medium 12 is moved by the fixed amount in the sub scanning direction, and can perform the image recording over the entire surface of a recording area of the recording medium 12.

In this way, the recording head 24 is a serial type recording head. The inkjet recording device 10 (see FIG. 1) of the present embodiment adopts a multipath system that achieves a predetermined recording resolution by a plurality of times of scanning by the recording head 24 in the main scanning direction.

[Configuration of Control System of Inkjet Recording Device]

Figure 5:
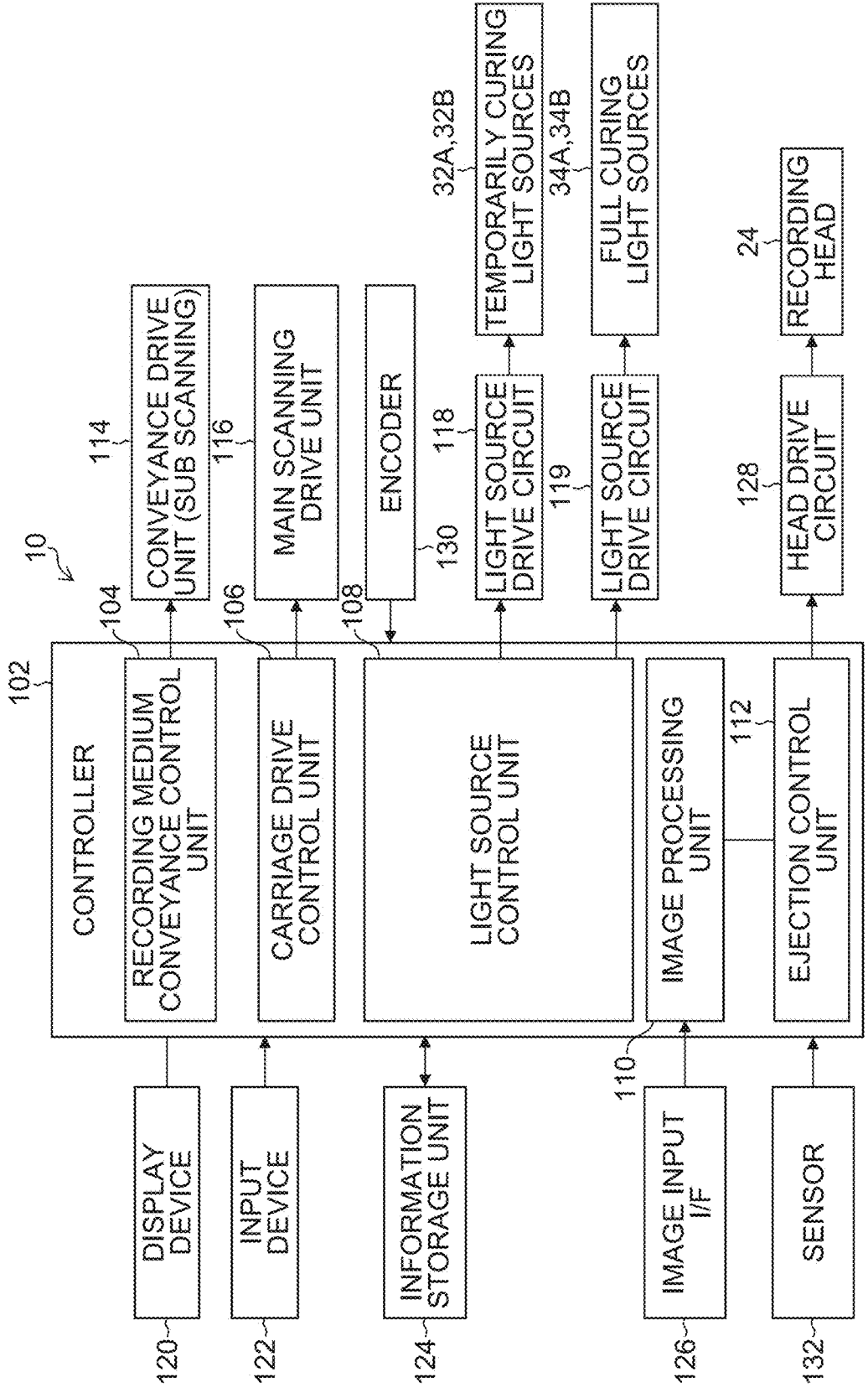
FIG. 5 is a block diagram illustrating a configuration of the inkjet recording device.

FIG. 5 is a block diagram illustrating the configuration of the inkjet recording device 10. As illustrated in FIG. 5, the inkjet recording device 10 includes a controller 102. As the controller 102, for example, a computer including a central processing unit (CPU) can be used. The controller 102 generally controls the entire inkjet recording device 10 by executing various kinds of programs read from an information storage unit 124.

The controller 102 includes a recording medium conveyance control unit 104, a carriage drive control unit 106, a light source control unit 108, an image processing unit 110, and an ejection control unit 112. These respective units can be realized by hardware or software, or the combination thereof "Software" has the same meaning as "program" or "application".

The recording medium conveyance control unit 104 controls a conveyance drive unit 114 that conveys the recording medium 12. The conveyance drive unit 114 includes a drive motor that drives the nip roller 40 (see FIG. 2), and a drive circuit thereof. The recording medium 12 conveyed onto the platen 26 is intermittently fed in the sub scanning direction by a swath width unit, matched with scanning (movement of a print path) in the main scanning direction by the recording head 24. A swath width is a length in the sub scanning direction determined by a repetition cycle of a scan by the reciprocating movement of the carriage 30, and is obtained by dividing a nozzle array length which is the length in the sub scanning direction of the nozzle array by the number of paths which is the number of times of repeating the scan. The number of the paths which is the number of times of repeating the scan is the number of times of the scanning required for completing drawing by a set recording resolution, and is determined by an image drawing mode. Details of the image drawing mode are described later.

The carriage drive control unit 106 controls a main scanning drive unit 116 that moves the carriage 30 in the main scanning direction. The main scanning drive unit 116 includes a drive motor connected to a moving mechanism of the carriage 30, and a control circuit thereof.

To the drive motor of the main scanning drive unit 116 and the drive motor of the conveyance drive unit conveyance drive unit 114 described above, an encoder 130 is attached. The encoder 130 inputs pulse signals according to a rotation amount and a rotation speed of each drive motor to the controller 102. Thus, the controller 102 can recognize a position of the carriage 30 and a position of the recording medium 12 on the basis of the pulse signals inputted from the encoder 130.

The light source control unit 108 controls light emission of the temporarily curing light sources 32A and 32B through a light source drive circuit 118, and controls light emission of the full curing light sources 34A and 34B through a light source drive circuit 119.

The image processing unit 110 executes image processing to image data inputted through an image input interface 126, and converts the image data to dot data for print. In FIG. 5, for simplification of notation, a notation "IF" is used as a substituting notation substituting a description of an interface. IF is an abbreviation notation of "interface".

The image processing unit 110 functions as a halftone processing unit that executes halftone processing by a dither method. That is, the image processing unit 110 performs quantization processing of a pixel value using a dither mask to a continuous gradation image which is the inputted image data, and generates a halftone image corresponding to the dot data for print. The dither mask used in the halftone processing in the image processing unit 110 is generated by applying the present invention. A method of generating the dither mask is described later.

The ejection control unit 112 controls ejection of the ink from the individual nozzles 62 of the recording head 24, by controlling a head drive circuit 128 that drives the recording head 24 on the basis of the dot data generated in the image processing unit 110.

For the information storage unit 124, a nonvolatile memory is used for example, and various kinds of programs required for control of the controller 102 and various kinds of data are stored. For example, the information storage unit 124 stores, as the programs, a control program to be executed by the individual units of the controller 102, and a scanning pattern program, or the like. The scanning pattern program is a program for multipath type image recording, and defines reciprocating scanning (the movement of the print path) in the main scanning direction by the recording head 24 to the recording medium 12 intermittently conveyed in the sub scanning direction, and the number of the paths (the number of times of repeating the scan). The movement of the print path accompanied by the movement of the recording head 24 in the main scanning direction includes at least one of a moving direction of the recording head 24 when forming dots, selection of the nozzle to eject the ink, and an ejection timing. A pattern of the scanning determined by a combination of the movement of the print path and the number of the paths is called "scanning pattern".

To the controller 102, an input device 122 and a display device 120 are connected. For the input device 122, for example, various kinds of devices such as a keyboard, a mouse, a touch panel or an operation button can be adopted, and it may be an appropriate combination thereof. The input device 122 inputs external operation signals by a manual operation of an operator who is a user to the controller 102.

For the display device 120, a liquid crystal display or the like is used. An operator can input various kinds of information using the input device 122. Also, an operator can confirm various kinds of information such as input contents and a state of a system or the like through display at the display device 120.

A sensor 132 is attached to the carriage 30. The controller 102 can recognize a width of the recording medium 12 on the basis of sensor signals inputted from the sensor 132.

[Explanation of Multipath Type Image Recording Method]

Figure 6:
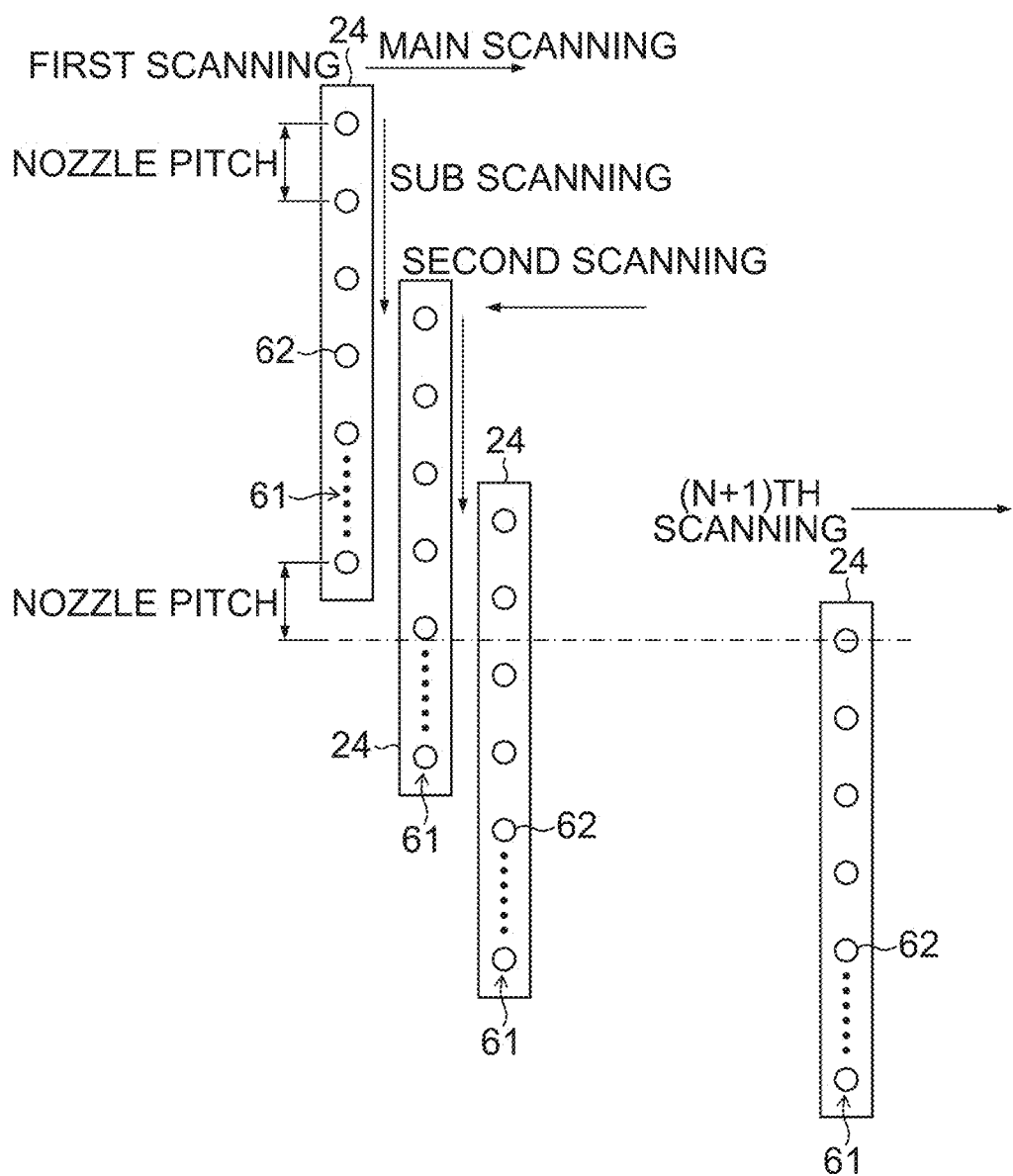
FIG. 6 is an explanatory diagram for explaining one example of a multipath type image recording method.

FIG. 6 is an explanatory diagram for explaining one example of a multipath type image recording method. Here, in order to simplify an explanation, the configuration of the recording head 24 is simplified, and the case that there is only one nozzle array of the recording head 24 and recording is performed by one nozzle array 61 is described as an example. It can be understood that the nozzle array 61 is indicated representing any one array of the nozzle arrays 61C, 61M, 61Y and 61K described in FIG. 4.

Also, for the configuration of intermittently feeding the recording medium in the sub scanning direction, for convenience of the illustration, in FIG. 6, the illustration is such that the recording medium is stopped and the recording head 24 is intermittently moved in the sub scanning direction. In FIG. 6, the illustration of the recording medium is omitted, and only the movement of the recording head 24 is illustrated.

As illustrated in FIG. 6, the ink is ejected from the nozzles 62 when the recording head 24 is moved in the main scanning direction (a crosswise direction in FIG. 6). By the combination of the reciprocating movement of the recording head 24 along the main scanning direction and intermittent feed of the recording medium in the sub scanning direction (a longitudinal direction in FIG. 6), two-dimensional image recording is performed on the recording medium. The term "image recording" may be replaced with the term of drawing, image drawing, print or image formation.

An operation that the recording head 24 ejects the ink from the nozzles 62 and records dots while moving in the main scanning direction is called "scan" or "scanning". For the scan, there may be the scan performed in an outward path in the main scanning direction and the scan performed in a homeward path. The image may be recorded by the scan in both directions of the outward path and the homeward path, and the image may be recorded by the scan in only one direction of the outward path or the homeward path. In the case of performing the scan in both directions of the outward path and the homeward path, the scan of reciprocating once is counted as execution of two times of the scan for the outward path scan and the homeward path scan.

In the case of defining N as a natural number and completing the image of a desired recording resolution by N times of the scan, relative positional relation (here, the positional relation in the sub scanning direction) between the recording medium of the (N+1)th scanning and the recording head 24 becomes the relation illustrated in FIG. 6. That is, in order to perform the image recording of the desired recording resolution by N times of writing, the positional relation is such that the recording medium is intermittently fed in the sub scanning direction for the first time, the second time, the third time, . . . and is connected to a position corresponding to the length of the nozzle array just at the (N+1)th time. In order to seamlessly connect the operation of writing N times, movement is made in the sub scanning direction by a portion of "the nozzle array length+one nozzle pitch" from the sub scanning direction position of the first scanning and the (N+1)th scanning is performed. "Nozzle array length" is the length in the sub scanning direction of the nozzle array 61 in which the nozzles 62 are lined and arrayed in the sub scanning direction, and corresponds to an inter-nozzle distance of the nozzles positioned at both ends of the nozzle array. "Nozzle pitch" is a nozzle interval in the sub scanning direction in the nozzle array.

As one example, the case of using the recording head 24 having the nozzle array 61 in which the nozzles 62 are lined at a nozzle array density 100 npi, and achieving the recording resolution of main scanning 600 dpi×sub scanning 400 dpi by eight paths (eight times of writing) of two paths in the main scanning direction and four paths in the sub scanning direction (main 2×sub 4) is considered. A unit npi (nozzle per inch) is a unit indicating the number of nozzles per inch.

A unit dpi (dot per inch) is a unit indicating the number of dots per inch. One inch is about 25.4 millimeters.

Here, an interval of deposition points determined from the recording resolution is called "deposition point interval", and a lattice indicating positions of recordable deposition points is called "deposition point lattice". "Deposition point" has the same meaning as "pixel" for which recording or non-recording of the dot can be controlled. "Deposition point interval" has the same meaning as "pixel interval", and corresponds to the minimum dot interval at the recording resolution. "Deposition point lattice" has the same meaning as "pixel lattice". "Lattice" has the same meaning as cells of a matrix expressed by rows and columns.

In the case of the recording resolution of main scanning 600 dpi×sub scanning 400 dpi, the deposition point interval in the main scanning direction is 25.4 (millimeters)/60≈42.3 micrometers, and the deposition point interval in the sub scanning direction is 25.4 (millimeters)/400=63.5 micrometers. This indicates a size "42.3 micrometers×63.5 micrometers" of one cell (corresponding to one pixel) of the deposition point lattice. For feed control of the recording medium 12 and control of a deposition position (that is, a deposition timing) from the recording head 24, a feed amount and the position are controlled with the deposition point interval determined from the recording resolution as a unit. The deposition point interval determined from the recording resolution is sometimes called "resolution pitch" or "pixel pitch". Also, while the nozzle pitch can be indicated by a unit of the length, instead, it can be indicated with the deposition point interval (pixel pitch) in the sub scanning direction as a unit. For example, in the case that the nozzle array density is 100 npi for the recording resolution of sub scanning 400 dpi, since the nozzle pitch is four times the pixel pitch in the sub scanning direction, with the pixel pitch in the sub scanning direction as the unit, the nozzle pitch can be expressed as "4".

In the case of N=8 by two paths in the main scanning direction and four paths in the sub scanning direction, to fill a deposition point line in the main scanning direction by two times of the scanning and to fill a deposition point line in the sub scanning direction by four times of the scanning, recording of 2×4 pieces of deposition point lattices is performed by eight times of the scanning (that is, eight paths). "Deposition point line" means a scanning line and has the same meaning as a raster line.

Figure 7:
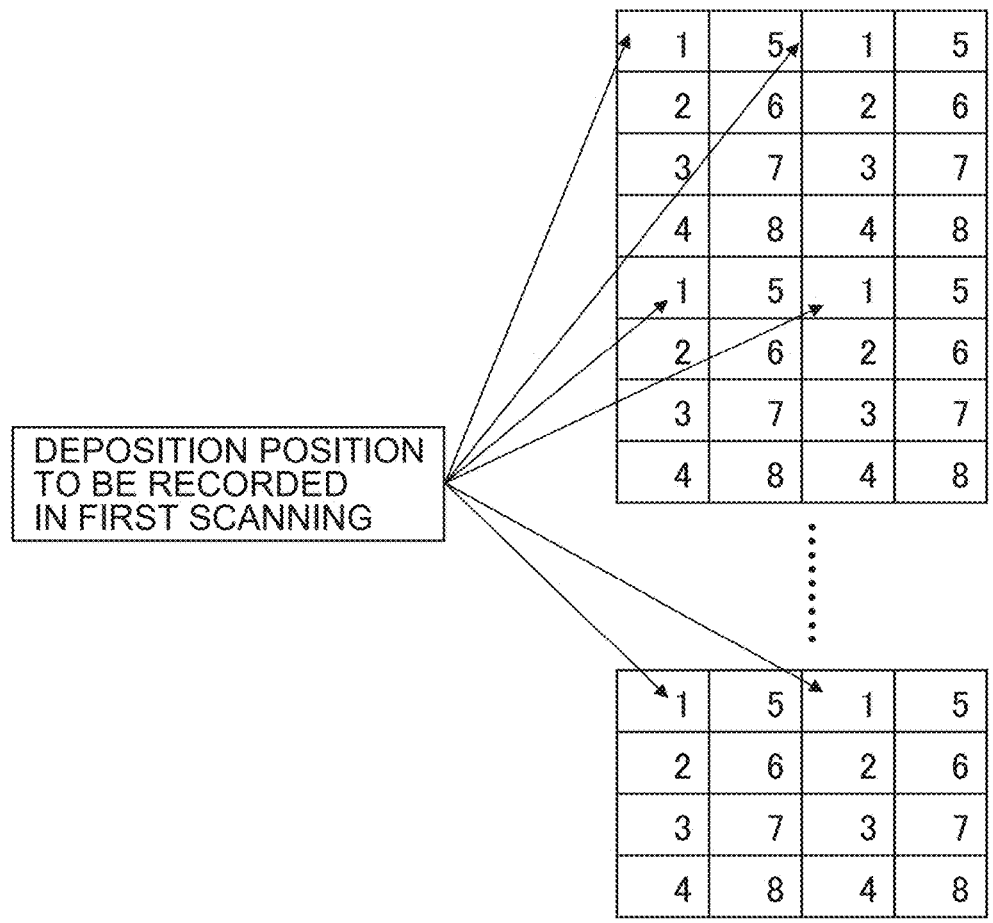
FIG. 7 is a schematic diagram schematically illustrating relation between a number of each scanning by a drawing operation of writing eight times and a deposition position recorded by the scanning.

FIG. 7 is a schematic diagram schematically illustrating relation between a number (1 to 8) of each scanning by a drawing operation of writing eight times and a deposition position recorded by the scanning. In FIG. 7, the individual cells to which numbers of 1 to 8 are attached indicate the deposition positions (pixel positions) to be recorded by the nozzles 62, and the numbers 1-8 indicate the number of the scanning indicating in the scanning of what order the pixel position is to be recorded. For example, the cell (pixel) to which the number "1" is attached indicates the deposition position to be recorded in the first scanning.

As is clear from FIG. 7, for an arrangement distribution of the numbers 1 to 8 indicating a scanning order to record the individual deposition positions, the lattice of "2×4" of main 2×sub 4 is a basic unit of repetition. The lattice of 2×4 is called "basic unit lattice" or "2×4 lattice". A method of filling the 2×4 lattice (a deposition order) can be variously assumed without being limited to the example illustrated in FIG. 7.

According to the image drawing mode, the recording resolution and the scanning pattern are determined, and the number of the cells of the basic unit lattice, an array form of the cells, and the numbers (scanning orders) of the scanning of the individual cells are determined.

[Example of Image Drawing Mode]

As already described, for the inkjet recording device 10, multipath type drawing control is applied, and the recording resolution can be changed by changing the number of the print paths. For example, three kinds of modes that are a high production mode, a standard mode, and a high image quality mode are prepared, and the recording resolution is different respectively in the individual modes. The recording resolution has the same meaning as "printing resolution". The image drawing mode can be selected according to print purposes or uses. The term "image drawing mode" may be replaced with "print mode".

A specific description is given with a simple numerical example. It is assumed that the nozzle array density in the sub scanning direction of the nozzle array 61 in the recording head 24 is 100 npi.

In the case of the high production mode, recording is performed by the recording resolution of main scanning 600 dpi×sub scanning 400 dpi, and the recording by the recording resolution of 600 dpi is achieved by two paths (two times of the scanning) in the main scanning direction. That is, dots are formed by the resolution of 300 dpi in the first scanning (outward path of the carriage 30). In the second scanning (homeward path), dots are formed so as to complement the middle of the dots formed by the first scanning (outward path) by 300 dpi, and the resolution of 600 dpi is obtained for the main scanning direction.

On the other hand, for the sub scanning direction, the nozzle pitch is 100 npi, and dots are formed by the resolution of 100 dpi in the sub scanning direction by one time of main scanning (one path). Therefore, the recording resolution of 400 dpi is achieved by performing complementary printing by four-path printing (four times of the scanning).

In the standard mode, recording is executed by the recording resolution of 600 dpi×800 dpi, and the resolution of 600 dpi×800 dpi is obtained by two-path printing in the main scanning direction, and eight-path printing in the sub scanning direction.

In the high image quality mode, printing is executed by the resolution of 1200 dpi×1200 dpi, and the recording resolution of 1200 dpi×1200 dpi is obtained by four paths in the main scanning direction and 12 paths in the sub scanning direction.

[About Nozzle Ejection Rate]

Here, the nozzle ejection rate is described. The nozzle ejection rate is a value indicating a ratio of recording pixels for which each nozzle 62 ejects ink to record a dot, to the recording pixels when recording of a certain gradation is performed, in recording attending pixels allocated to each nozzle as pixels for which each of the plurality of nozzles 62 in the recording head 24 is in charge of recording.

The nozzle ejection rate is determined for each nozzle. The nozzle ejection rate is indicated by the quotient of division, whose denominator is the number of the recording pixels when recording of a certain gradation is performed, in the number of the recording attending pixels allocated to each nozzle, and whose numerator is the number of the recording pixels for which each nozzle ejects ink to record a dot, and can be indicated by a numerical value equal to or larger than 0 and is equal to or smaller than 1. Also, the nozzle ejection rate can be also indicated by a percentage.

In short, the nozzle ejection rate indicates a ratio of ejecting ink for each nozzle 62. The ratio of ejecting ink for each nozzle 62 is equal to the ratio of the recording pixels for each nozzle 62. The nozzle ejection rate can be understood as the ratio of using the nozzles, and can be considered as a nozzle using rate or a nozzle operation rate.

Specifically, the nozzle ejection rate indicates a using rate for each nozzle 62 when recording of a solid pattern which is a uniform gradation image of a certain fixed density reflecting the nozzle ejection rate is performed, in the case that the using rate for each nozzle 62 when recording of the solid pattern without reflecting the nozzle ejection rate is performed is defined as "1.0" or "100%" which is a reference value. The using rate for each nozzle 62 may be replaced with an ink ejection amount for each nozzle 62 or may be replaced with the number of pixels of the recording pixels for each nozzle 62.

In the present embodiment, the nozzle ejection rate is fixedly determined regardless of tones, however, the nozzle ejection rate may be changed depending on the tones. As the meaning including both of the nozzle ejection rate for each nozzle in the case of determining the nozzle ejection rate in common to the individual tones regardless of the tones and the nozzle ejection rate for each nozzle in the case of determining the nozzle ejection rate that differs depending on the tones, the nozzle ejection rate for each nozzle can be "information indicating the ratio of the recording pixels for which each nozzle ejects ink to record a dot, in the recording attending pixels allocated to each nozzle as pixels for which each of the plurality of nozzles in the recording head having the plurality of nozzles that eject ink is in charge of recording".

Figure 8:
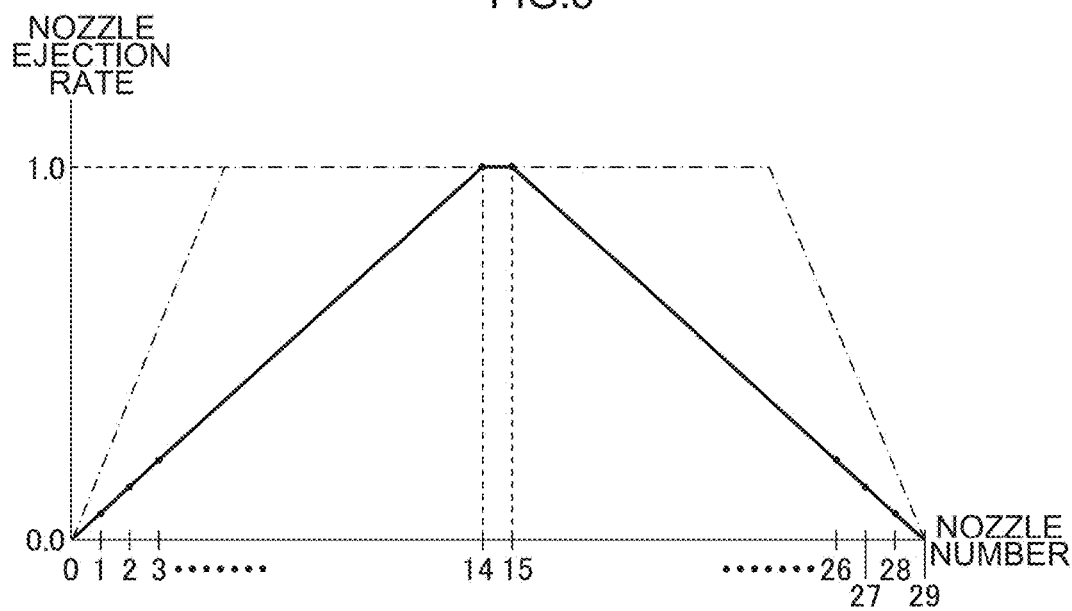
FIG. 8 is a diagram illustrating one example of data of a nozzle ejection rate determined for each nozzle.

FIG. 8 is a diagram illustrating one example of data of the nozzle ejection rate determined for each nozzle. In FIG. 8, a horizontal axis indicates the nozzle number, and a vertical axis indicates the nozzle ejection rate corresponding to each nozzle number. In FIG. 8, the nozzle ejection rate of the nozzle arranged at the center part of the nozzle array is set at "1.0" of the reference value. That is, it means that the using rate of the nozzle arranged at the center part of the nozzle array (or the ink ejection amount by the nozzle or the number of pixels of the recording pixels) coincides with the using rate (or the ink ejection amount by the nozzle or the number of pixels of the recording pixels) in the case of not reflecting the nozzle ejection rate.

Also, in the example illustrated in FIG. 8, to suppress banding similarly to Japanese Patent Application Laid-Open No. 2010-162770 gazette, the nozzle ejection rate of the nozzle arranged at the end of the nozzle array is set to be lower than the nozzle ejection rate of the nozzle arranged at the center part of the nozzle array. For example, as illustrated by a solid line in FIG. 8, the nozzle ejection rate is set to be gradually high from the individual nozzles at both ends of the nozzle number 0 and the nozzle number 29 positioned at both ends of the nozzle array to the nozzles of the nozzle number 14 and the nozzle number 15 positioned at the center part of the nozzle array respectively.

Or, as illustrated by a dashed line in FIG. 8, the nozzle ejection rate of the nozzle groups positioned at both ends of the nozzle array (for example, the nozzle group of the nozzle numbers 0 to 5 and the nozzle group of the nozzle numbers 24 to 29) may be set relatively low, and the nozzle ejection rate of the nozzles positioned between both ends may be set at "1.0", and regarding setting of the nozzle ejection rate, not only the example illustrated in FIG. 8 but also various setting forms can be assumed.

The nozzle ejection rate for each nozzle can be arbitrarily set by a user in addition to the configuration programmed beforehand. For example, a user can input the nozzle ejection rate for each nozzle by utilizing an appropriate user interface, or select a desired pattern from two or more kinds of prepared nozzle ejection rate data candidate patterns.

[Explanation of Dither Mask Generation Method]

Figure 9:
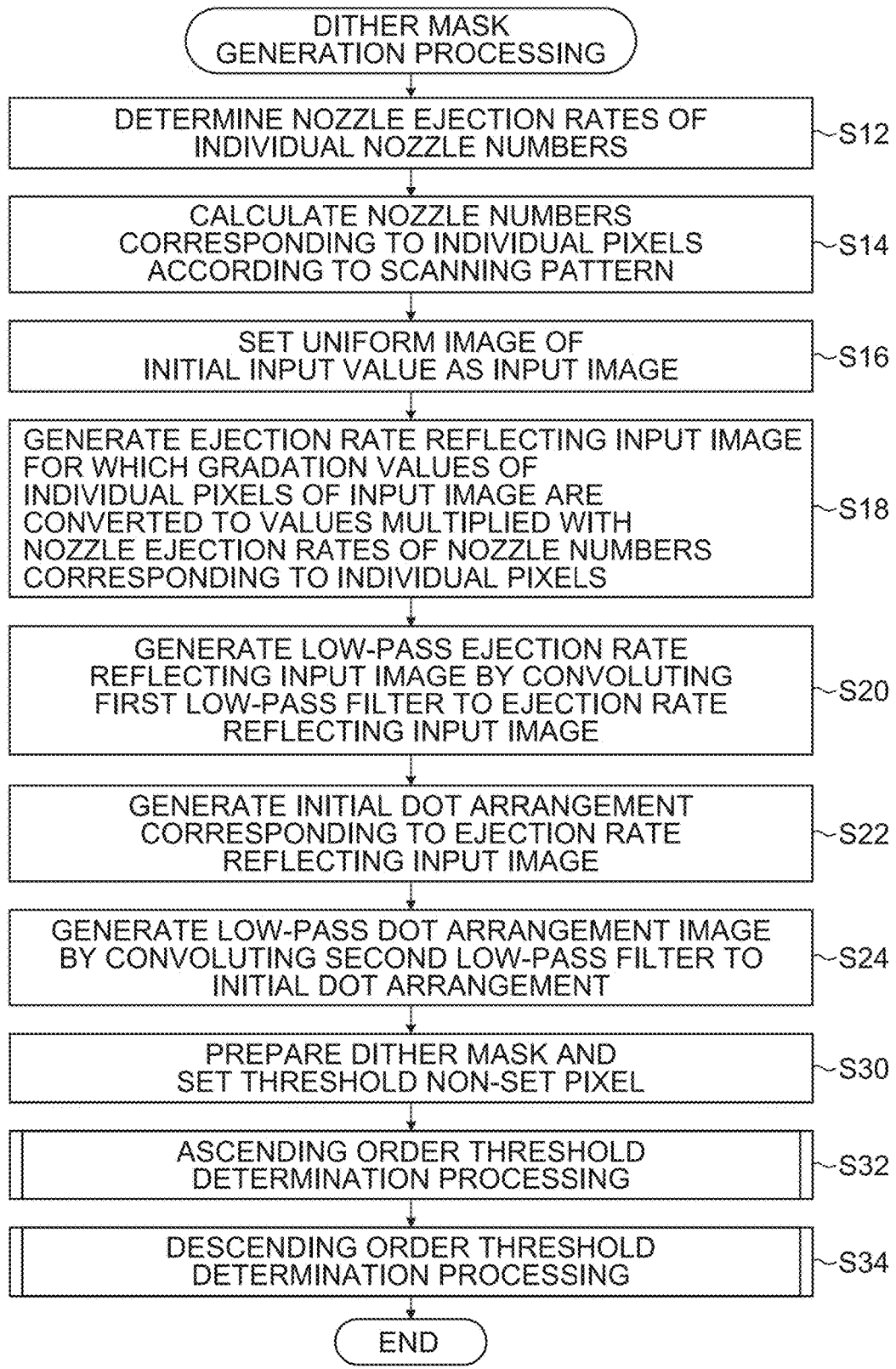
FIG. 9 is a flowchart illustrating a procedure of a dither mask generation method relating to a first embodiment of the present invention.

FIG. 9 is a flowchart illustrating a procedure of the dither mask generation method relating to a first embodiment of the present invention. First, the nozzle ejection rates of the individual nozzle numbers in the recording head are determined (step S12). The process of step S12 corresponds to one form of "nozzle ejection rate determination process".

Figure 10:
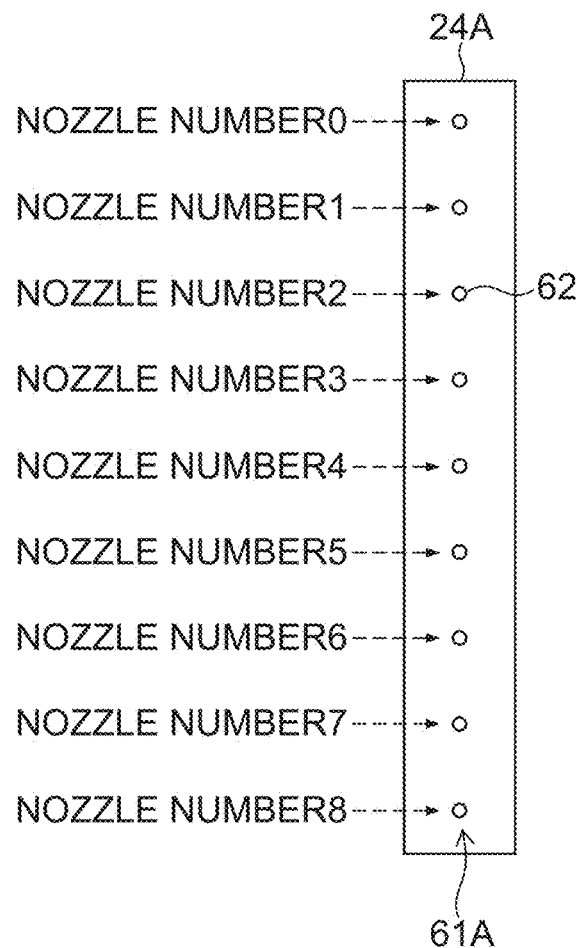
FIG. 10 is a schematic diagram of the recording head.

Here, to simplify the description, the number of the nozzles in the recording head is reduced, and a recording head 24A for which the number of the nozzles is "9" as illustrated in FIG. 10 is described as an example. The recording head 24A has a nozzle array 61A in which nine pieces of nozzles 62 are arranged in one line at equal intervals in the sub scanning direction. From the nozzle 62 at an upper end in FIG. 10 which is one end of the nozzle array 61A to a lower end in FIG. 10 which is the other end, respectively intrinsic nozzle numbers 0, 1, 2 . . . 8 are imparted in an order to the individual nozzles 62. The nozzle array density of the nozzle array 61A can be variously designed, and is assumed to be 200 npi, for example.

Figure 11:
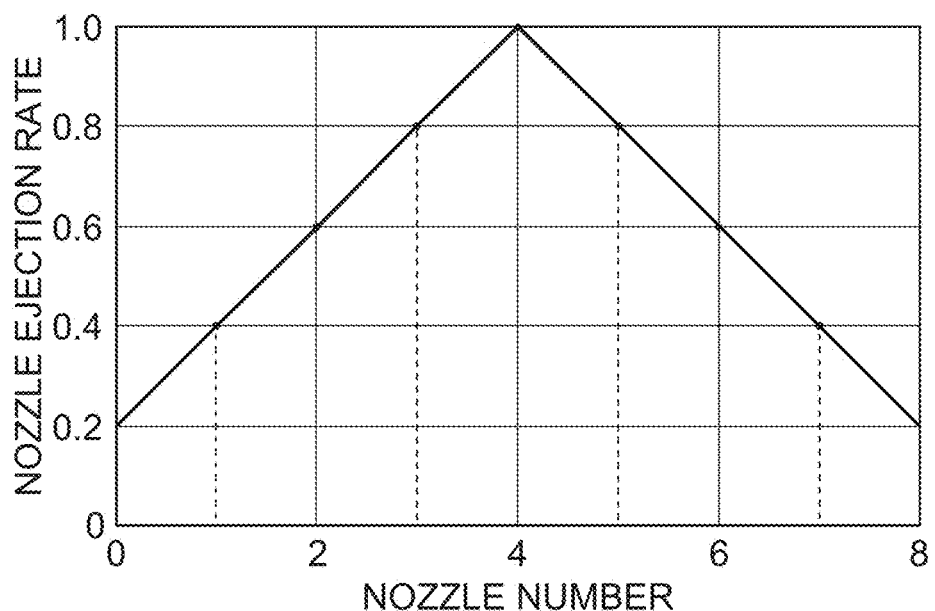
FIG. 11 is a graph illustrating a setting example of a nozzle ejection rate.

FIG. 11 is a graph illustrating a setting example of the nozzle ejection rate. A horizontal axis indicates the nozzle number, and a vertical axis indicates the nozzle ejection rate. The nozzle ejection rates of the individual nozzles 62 in the nozzle array 61A of the recording head 24A illustrated in FIG. 10 can be set as in FIG. 11.

Next, the nozzle numbers corresponding to the individual pixels of the dither mask are determined (step S14 in FIG. 9) according to the scanning pattern when the image recording by the inkjet recording device 10 is performed, for an image area (that is, a mask area) having a pixel array with the number of pixels equal to a mask size of the dither mask. The process of step S14 corresponds to one form of "corresponding nozzle specifying process".

The nozzle numbers corresponding to the individual pixels mean the nozzle numbers of the nozzles in charge of the recording of the individual pixels. The process of step S14 corresponds to determining the respectively corresponding nozzle numbers for the individual pixels of the dither mask.

In the case that m and n are natural numbers respectively and the dither mask which is a generation target is a matrix of m rows×n columns, the respectively corresponding nozzle numbers are determined for the individual pixels of the image area formed by a two-dimensional pixel array of m rows×n columns. A pattern of the nozzle numbers in which the corresponding nozzle numbers are determined for the individual pixels of the dither mask is called a "nozzle pattern".

FIG. 12 illustrates one example of the nozzle pattern. In FIG. 12, an example of the mask size of 18 rows×18 columns is illustrated, and to the individual pixels, the respectively corresponding nozzle numbers are written.

The nozzle pattern illustrated in FIG. 12 illustrates the nozzle numbers corresponding to the individual pixels of the dither mask in the scanning pattern in the case of performing intermittent feed of relatively moving, by nine pixels each in the sub scanning direction, the nozzle array 61A (see FIG. 10) for which the nozzle pitch is two pixels and the number of the nozzles is nine, and scanning a scanning line of one line in the main scanning direction by the single (the same one) nozzle. For example, the pixel to which the nozzle number 0 is entered in FIG. 12 is the pixel for which the nozzle of the nozzle number 0 is in charge of the recording, and indicates the recording attending pixel of the nozzle of the nozzle number 0. That is, the nozzle pattern indicates the recording attending pixel for each nozzle number.

The nozzle pitch being two pixels means that the nozzle pitch corresponds to a distance for two pixels in the sub scanning direction, with the size of one pixel determined from the recording resolution during printing as a unit. For example, the nozzle array density 200 npi of the recording head 24A described in FIG. 10 corresponds to 200 dpi in terms of a dot recording density (resolution). That is, in this example, the recording resolution assumed during printing is 400 dpi, and the nozzle pitch of the nozzle array 61A of 200 npi corresponds to two pixels with the size of the pixel of 400 dpi as a unit.

Figure 13:
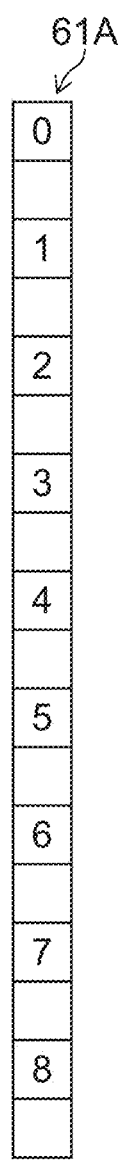
FIG. 13 is an explanatory diagram for explaining a description method of a nozzle array.

Here, in order to easily understandably illustrate the relation between the positions of the individual nozzles 62 configuring the nozzle array 61A and the positions of the individual pixels of the dither mask, a describing method as illustrated in FIG. 13 is introduced regarding the description of the nozzle array. In FIG. 13, the nozzle array 61A is sectioned into cells of a pixel unit, and numbers 0-8 indicating the nozzle numbers are described inside the cells. The positions of the cells to which the nozzle numbers are attached indicate the positions of the nozzles. That is, the description of the nozzle array 61A illustrated in FIG. 13 is replaced the description of the recording head 24A illustrated in FIG. 10.

Figure 14:
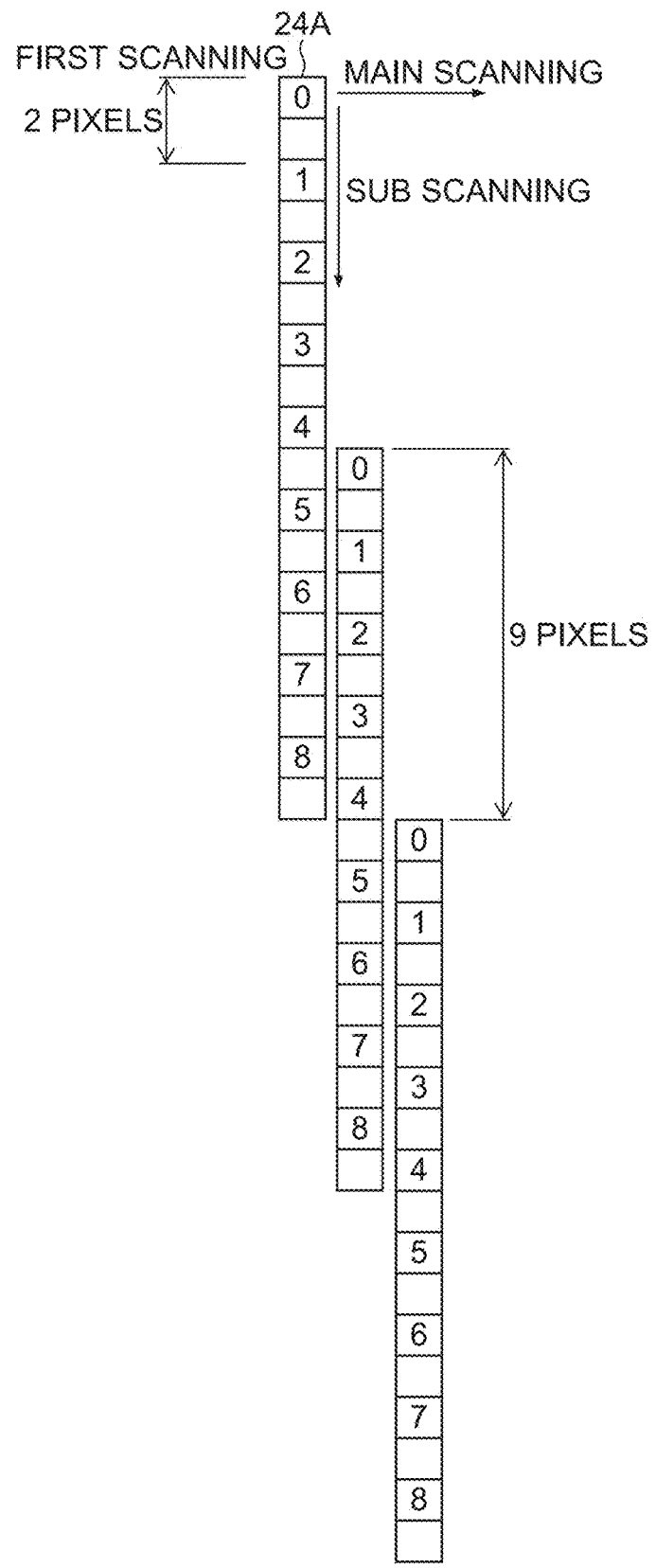
FIG. 14 is an explanatory diagram illustrating a specific example of a multipath type drawing method.

FIG. 14 illustrates a situation of the intermittent feed of relative movement by nine pixels each in the sub scanning direction every time the print path in the main scanning direction is executed once. For the convenience of the illustration, similarly to FIG. 6, FIG. 14 is illustrated assuming that the recording head 24A is moved in the sub scanning direction to the stopped recording medium.

In an image drawing method illustrated in FIG. 14, the recording of 400 dpi is completed by one path for a main scanning line which is a deposition point line in the main scanning direction, and the recording of 400 dpi is completed by two paths for a sub scanning line which is a deposition point line in the sub scanning direction. A paper feed amount in the sub scanning direction is nine pixels. The nozzle pattern of the image drawing method of repeating such scanning is illustrated in FIG. 12.

After step S14 in FIG. 9, a uniform image of an initial input value is set as the input image next (step S16 in FIG. 9). The uniform image of the initial input value can be the uniform image for which the gradation value of about 50% in the case that the maximum gradation is 100% is the initial input value. Here, in order to simplify the description, a range of the gradation values is defined as 0 to 100. As an initial input value $I_0$ which is the gradation value of 50% to the maximum gradation 100, "50" is set. However, the range of the gradation values and a specific numerical value of the initial input value are not limited to the example. For example, in the case of the image data of 8-bit gradation for which the range of the gradation values is 0 to 255, one example of the initial input value is "126" or the like.

Next, an ejection rate reflecting input image for which the gradation values of the individual pixels of the input image set in step S16 are converted to values multiplied with the nozzle ejection rates of the nozzle numbers corresponding to the individual pixels is generated (step S18). The process of step S18 corresponds to one form of "gradation conversion process". The ejection rate reflecting input image generated in step S18 corresponds to one form of "the input image reflecting the nozzle ejection rate", and corresponds to one form of a "first image".

Figure 15:
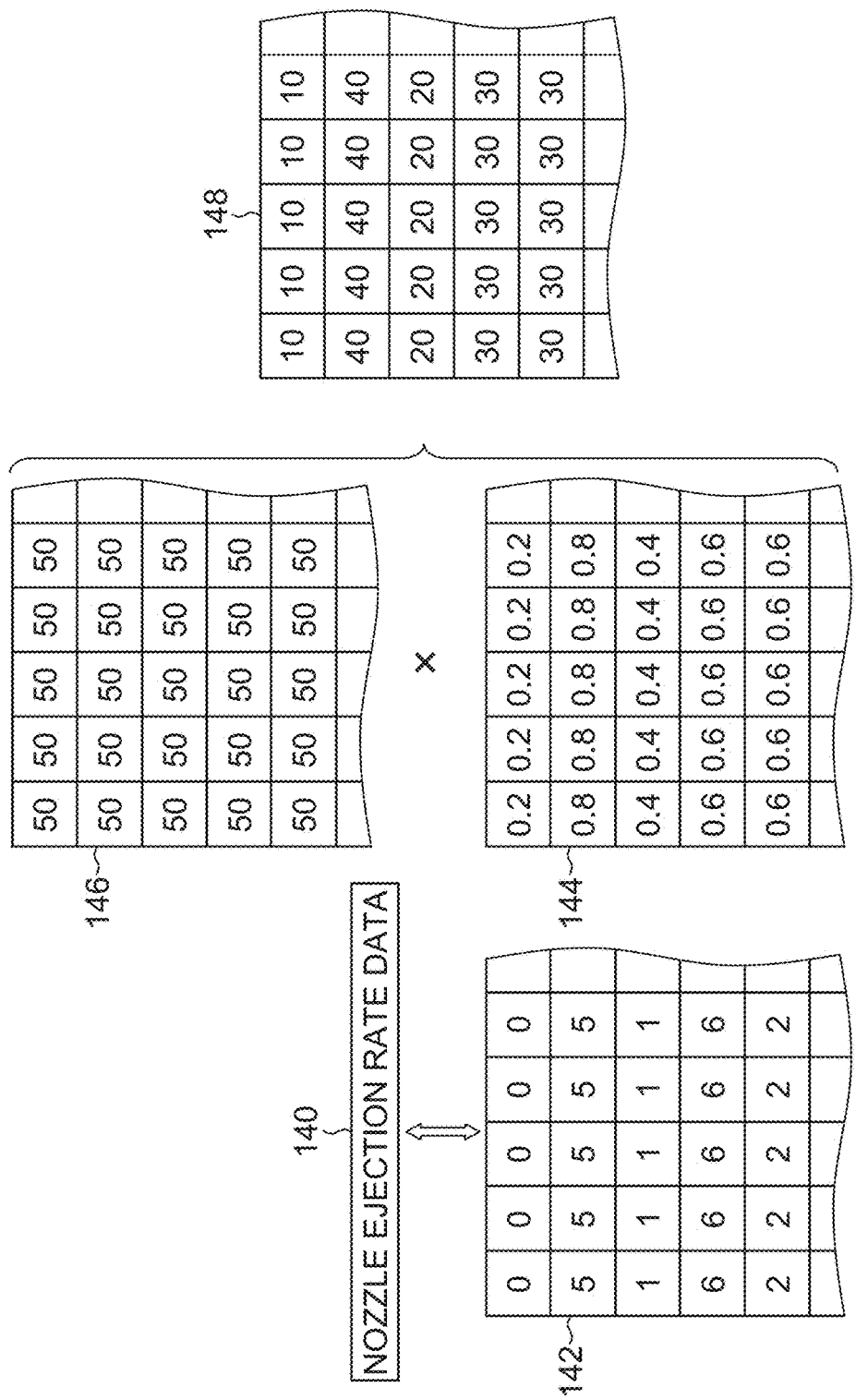
FIG. 15 is a conceptual diagram schematically illustrating the content of the generation processing of the ejection rate reflecting input image.

FIG. 15 is a conceptual diagram schematically illustrating content of the generation processing of the ejection rate reflecting input image. A nozzle ejection rate data 140 in FIG. 15 corresponds to data determining the nozzle ejection rates of the individual nozzles described in FIG. 11 for example.

A nozzle pattern 142 in FIG. 15 corresponds to the nozzle pattern described in FIG. 12. By referring to the nozzle ejection rate data 140 for the individual nozzle numbers in the nozzle pattern 142, an ejection rate pattern 144 indicating the relation between the individual pixels of the dither mask and the nozzle ejection rates of the nozzle numbers corresponding to the individual pixels is obtained.

The individual cells to which numbers are attached in the ejection rate pattern 144 indicate the individual pixels of the dither mask, and the numbers inside the cells indicate the nozzle ejection rates of the nozzle numbers in charge of the recording of the pertinent pixel. On the basis of the ejection rate pattern 144, the nozzle ejection rate for each pixel is determined.

An input image 146 of the uniform gradation illustrated in FIG. 15 is the uniform image whose initial input value is "50". By multiplying each of the gradation values of the individual pixels in the input image 146 with the nozzle ejection rates corresponding to the individual pixels and converting the pixel values of the input image 146, an ejection rate reflecting input image 148 is generated.

As one example, since the nozzle ejection rate of the nozzle number 0 is "0.2", the gradation value of the pixel corresponding to the nozzle of the nozzle number 0 is converted from "50" to "10" by the multiplication of 50×0.2. The pixel values are converted similarly for all the pixels.

A low-pass ejection rate reflecting input image is generated by convoluting a first low-pass filter to the ejection rate reflecting input image 148 obtained in this way (step S20 in FIG. 9). The process of step S20 corresponds to one form of a "first low-pass filter processing process". The low-pass ejection rate reflecting input image corresponds to one form of a "second image".

The first low-pass filter can be any low-pass filter, but a low-pass filter suited to a human visual characteristic is preferable. As the first low-pass filter, a visual transfer function (VTF) which is a function indicating a human visual characteristic is well known. Also, as the first low-pass filter, a filter of a Gaussian function can be also used.

For the visual transfer function, while a graph function for which a horizontal axis indicates a frequency and a vertical axis indicates a response is known, the frequency characteristic (that is, a filter in a frequency space) can be replaced with a spatial filter in a real space. An operation of multiplying f(fx, fy) of the visual transfer function in the frequency space is processing mathematically equivalent to convoluting a spatial filter F(x, y) on the real space. It is similar for the Gaussian function, and a "multiplying" operation in one of the frequency space and the real space is equivalent to convolution in the other space, and an expression of "multiplying" is used including both meanings.

Next, an initial dot arrangement corresponding to the ejection rate reflecting input image is generated (step S22 in FIG. 9). The initial dot arrangement is obtained by executing the halftone processing such as a known dither method, an error diffusion method or a direct binary search (DBS) method to the ejection rate reflecting input image. Here, it is desirable that the initial dot arrangement is continuous at a boundary of the individual arrangements in the case of being arranged in the same size and by the same arrangement method as the dither mask described later. Therefore, it is desirable that the size and the arrangement method of the dither mask in the dither method or the dot arrangement in the DBS method for generating the initial dot arrangement for example are the same as the dither mask described later.

The process of step S22 corresponds to one form of a "first dot arrangement generation process". Also, the dot arrangement generated in step S22 corresponds to one form of a "first dot arrangement".

Next, a low-pass dot arrangement image is generated by convoluting a second low-pass filter to the initial dot arrangement (step S24). The process of step S24 corresponds to one form of a "second low-pass filter processing process". The low-pass dot arrangement image corresponds to one form of a "third image".

The second low-pass filter can be any low-pass filter, but a low-pass filter suited to the human visual characteristic is preferable. As the second low-pass filter, a filter of the visual transfer function or a filter of the Gaussian function can be used, similarly to the first low-pass filter.

The first low-pass filter and the second low-pass filter do not always coincide. While the first low-pass filter is a low-pass filter corresponding to the gradation value "1" of the input image, the second low-pass filter is a low-pass filter corresponding to one dot, and is a filter reflecting at least one characteristic among the density of the dot, the diameter of the dot and the shape of the dot or the like.

Next, the dither mask is prepared, and a threshold non-set pixel is set (step S30). The mask size of the dither mask is turned to an integer multiple of the repetition cycle in the main scanning direction and the sub scanning direction of the nozzle numbers by the scanning pattern. In the case of the scanning pattern described in FIG. 12, the repetition cycle of the nozzle numbers in the main scanning direction is one pixel, and the repetition cycle of the nozzle numbers in the sub scanning direction is "nine pixels". Therefore, the mask size of the dither mask is turned to the integer multiple of one pixel for the main scanning direction, and the integer multiple of nine pixels for the sub scanning direction. In this example, as one example of the mask size that satisfies such a condition, the dither mask of 18 rows×18 columns is illustrated. The threshold non-set pixel means a pixel to which the threshold is not set.

The threshold non-set pixel of the dither mask is the pixel without a dot in the case that the threshold setting is in an ascending order, and is the pixel with a dot in the case that the threshold setting is in a descending order. "Ascending order" is a procedure of setting the threshold from a threshold of a small value and successively setting the threshold of a large value. "Descending order" is a procedure of setting the threshold from a threshold of the large value and successively setting the threshold of the small value.

In the case of this example, ascending order threshold determination processing (step S32 in FIG. 16) of starting from the initial dot arrangement corresponding to the initial input value (for example, 50% gradation) and setting a larger threshold gradually in the ascending order while gradually increasing the dots, and descending order threshold determination processing (step S34 in FIG. 9) of setting a smaller threshold gradually in the descending order from the initial dot arrangement while gradually removing the dots are included.

An order of the ascending order threshold determination processing (step S32) and the descending order threshold determination processing (step S34) can be switched around.

Figure 16:
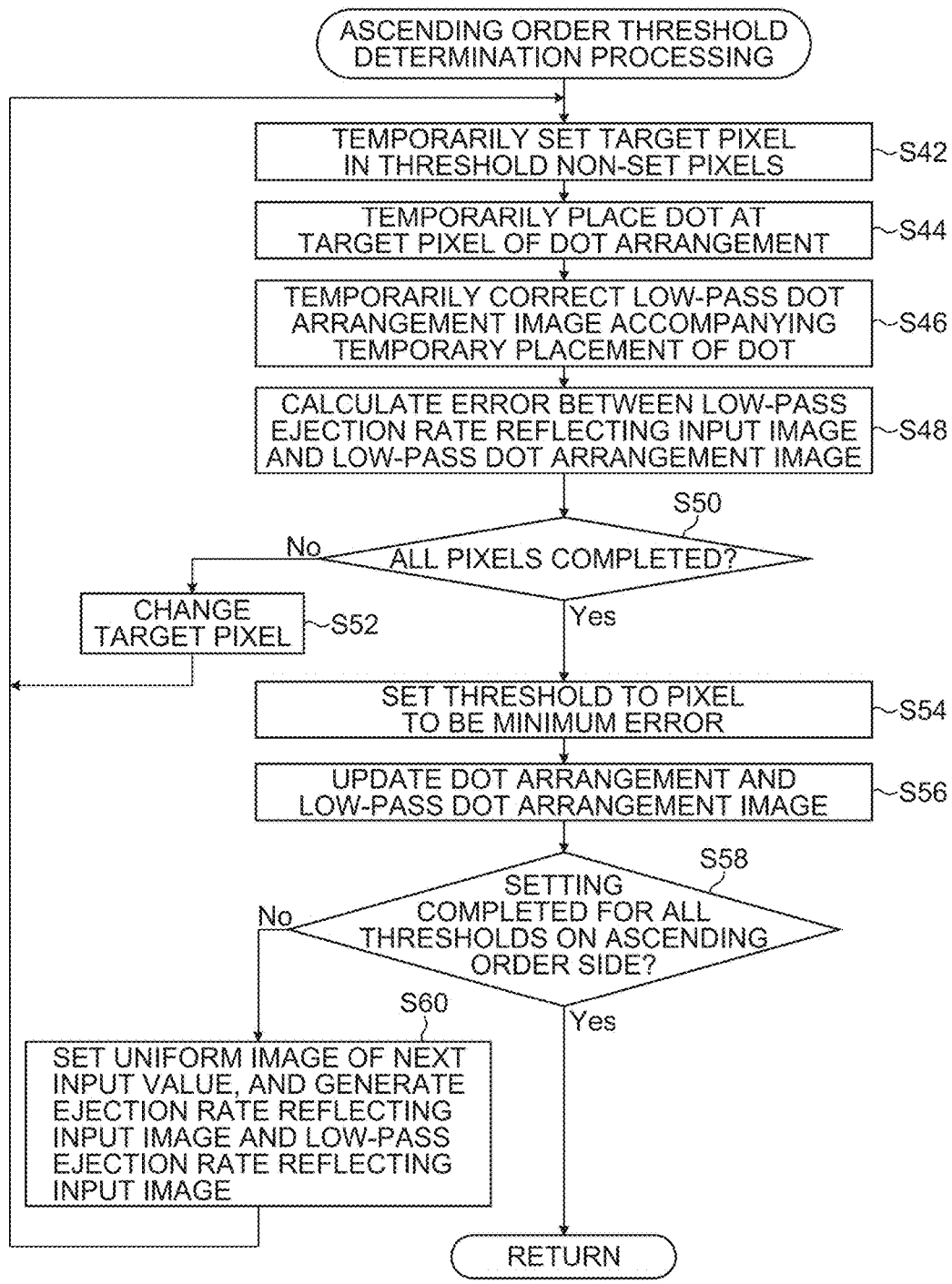
FIG. 16 is a flowchart of ascending order threshold determination processing.

FIG. 16 is a flowchart of the ascending order threshold determination processing. First, a target pixel is temporarily set in the threshold non-set pixels (step S42). Then, a dot is temporarily placed at a pixel position corresponding to the target pixel in the dot arrangement (step S44). The process of step S44 is called "temporary placement of dot". Accompanying the temporary placement of the dot, the low-pass dot arrangement image is temporarily corrected (step S46). Temporary correction in step S46 is processing of temporarily adding the second low-pass filter to the pixel corresponding to the target pixel in the low-pass dot arrangement image.

Here, for the dot arrangement and the low-pass dot arrangement, since the arrangement of the same size as the dither mask is repeatedly and adjacently arranged by the same arrangement method as the dither mask, adding the low-pass filter to the pixel corresponding to the target pixel means adding the low-pass filter to the pixel corresponding to the target pixel in all the adjacent arrangements. In the present embodiment, the processing of adding or removing the low-pass filter to/from the low-pass dot arrangement image and convoluting the low-pass filter to the dot arrangement indicates the processing on the assumption that the dot arrangement and low-pass dot arrangement images are repeatedly and adjacently arranged in the same size and by the same arrangement method as the dither mask, in this way.

Next, an error between the low-pass ejection rate reflecting input image and the low-pass dot arrangement image after the temporary correction is calculated (step S48).

As an evaluation index of the error between the low-pass ejection rate reflecting input image and the low-pass dot arrangement image, various indexes are possible. The index of the error may be, for example, a sum of squares or diffusion of a difference between the low-pass ejection rate reflecting input image and the low-pass dot arrangement image, or a square root of the sum of squares or a standard deviation.

As another evaluation index, the index of the error can be the sum of squares or diffusion of a value for which the individual pixel values of the low-pass dot arrangement image are divided by the individual pixel values of the low-pass ejection rate reflecting input image, or the square root of the sum of squares or the standard deviation. Also, on the contrary, it can be the sum of squares or diffusion of a value for which the individual pixel values of the low-pass ejection rate reflecting input image are divided by the individual pixel values of the low-pass dot arrangement image, or the square root of the sum of squares or the standard deviation. As the index of the error, in the case of including an operation of division by the individual pixel values of the low-pass ejection rate reflecting input image or the low-pass dot arrangement image, in order to prevent the division of the denominator "0", it is desirable to add a minute value (for example, "1") to an original image to be a divisor.

As a further example of the index of the error, the index that evaluates similarity of both images, such as a value for which the individual pixel values of the low-pass dot arrangement image and the individual pixel values of the low-pass ejection rate reflecting input image are multiplied and summed up or a cross-correlation value of the low-pass dot arrangement image and the low-pass ejection rate reflecting input image, may be the index of the error.

A combination of the process of step S48 of calculating the error which is the evaluation index reflecting the nozzle ejection rate and the process of steps S18 to S24 in FIG. 9 required for the processing of step S48 corresponds to one form of a "nozzle ejection rate reflecting processing process".

Next, for all the pixels of the threshold non-set pixels, whether or not the processing of step S42 to step S48 is completed is determined (step S50). When it is not completed in step S50, the target pixel is changed (step S52), and the process returns to step S42.

The target pixel is successively changed, the processing of step S42 to step S48 is repeatedly executed, and when it is Yes determination in step S50, the process advances to step S54. In step S54, the threshold is set to the pixel for which the error between the low-pass ejection rate reflecting input image and the low-pass dot arrangement image becomes minimum. In the case of using the sum of squares or diffusion of the difference or the divided value or the square root of the sum of squares or the standard deviation as the index of the error, it is determined that the error is minimum in the case that an evaluation value to be the index is minimum.

On the other hand, in the case of using the index that evaluates the similarity of both images, such as the value for which the individual pixel values of the low-pass dot arrangement image and the individual pixel values of the low-pass ejection rate reflecting input image are multiplied and summed up or the cross-correlation value of the low-pass dot arrangement image and the low-pass ejection rate reflecting input image, as the index of the error, it is determined that the error is minimum in the case that the evaluation value indicating the similarity is maximum, that is, in the case that the similarity is highest. The process of step S54 corresponds to one form of a "threshold setting process".

Then, a dot is placed at a position corresponding to the pixel to which the threshold is set in step S54, and the dot arrangement and the low-pass dot arrangement image are updated (step S56).

In step S58, whether or not the setting of the entire thresholds on an ascending order side is completed is determined. In the case of No determination in step S58, the process advances to step S60. In step S60, the uniform image of the next input value is set, and the ejection rate reflecting input image and the low-pass ejection rate reflecting input image are generated.

The initial input value set in step S16 and "next input value" in step S60 are determined as follows. That is, in step S48, the low-pass ejection rate reflecting input image and the low-pass dot arrangement image corresponding to it are compared to evaluate the error (similarity) between both, so that it is desirable that an average value of the pixel values in the low-pass ejection rate reflecting input image and an average value of the pixel values in the low-pass dot arrangement image corresponding to the low-pass ejection rate reflecting input image coincide or roughly coincide, when the error between both images is evaluated. "Rough coincidence" includes a range in which a difference between both is so small as not to be a problem practically for the evaluation of the error between the images and handling as the coincident ones is allowable. When the average values of both images are quite different from each other, since the error between both images cannot be appropriately evaluated, it is desirable that both are made to coincide or roughly coincide at a level of the average values.

Therefore, in step S60, according to increase of the dots accompanying the setting of the threshold in step S54, the input value of the low-pass ejection rate reflecting input image to be compared when the next threshold is determined is increased. For that, an increment of the input value corresponding to increase of one dot in step S56 is obtained beforehand, and in step S60, the input value is changed with the increment as a unit.

The increment of the input value corresponding to the increase of one dot is defined as $\Delta I$, the ejection rate reflecting input image converted to the value for which the gradation values ($\Delta I$) of the individual pixels in the uniform image of the gradation value $\Delta I$ are multiplied with the nozzle ejection rates of the nozzle numbers corresponding to the individual pixels is generated, and the low-pass ejection rate reflecting input image for which the first low-pass filter is convoluted to it is generated. Then, $\Delta I$ is determined such that the average value of the low-pass ejection rate reflecting input image coincides with the average value of the second low-pass filter corresponding to one dot.

Also, as another method, without generating the low-pass ejection rate reflecting input image from the uniform image of $\Delta I$, $\Delta I$ may be determined such that the value that is the total sum of the entire pixels of the values for which the gradation values of the individual pixels of the ejection rate reflecting input image are multiplied with the average value of the first low-pass filter corresponding to the gradation value 1 coincides with the average value of the second low-pass filter corresponding to one dot.

Figure 17:
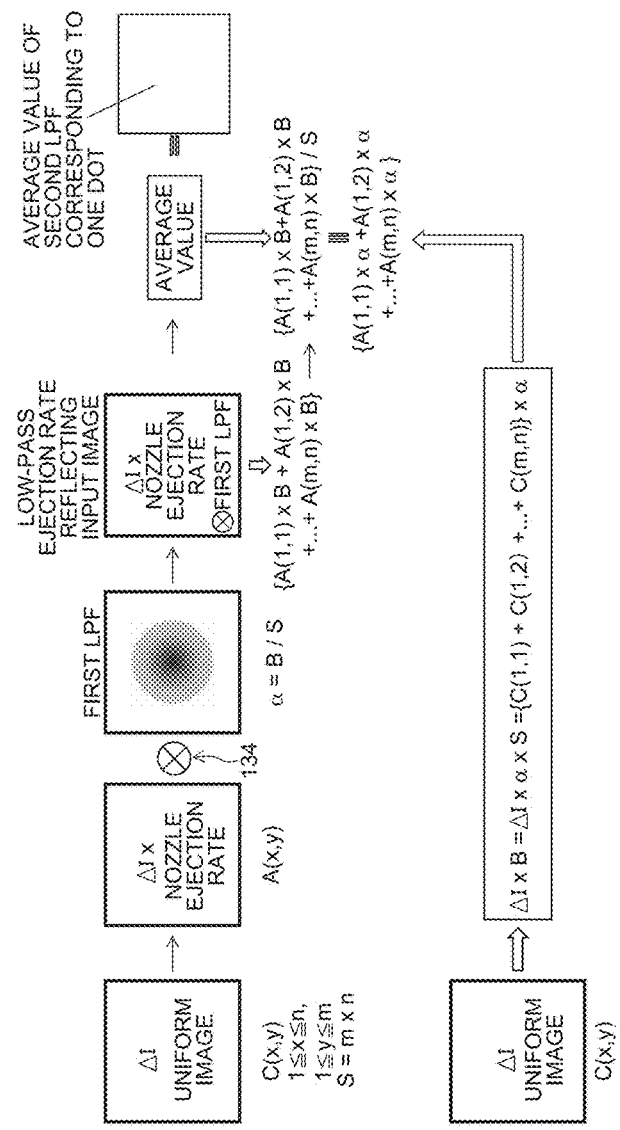
FIG. 17 is an explanatory diagram for explaining a method of obtaining an increment of an input value for one dot to be a unit of increase/decrease when changing the input value.

An outline of the method of obtaining $\Delta I$ is given using an explanatory diagram in FIG. 17. Here, the pixel value of the uniform image of the gradation value $\Delta I$ is indicated by $C(x,y)$. Reference characters x and y designate the position of the pixel. The pixel value of the ejection rate reflecting input image for which the uniform image is multiplied with the nozzle ejection rates of the nozzle numbers corresponding to the individual pixels is indicated by $A(x,y)$. The total sum of coefficients that are components of the individual cells of the first low-pass filter itself is indicated by B. In the drawings such as FIG. 17 and the like, for the simplification of the description, a simple notation of "LPF" is used as a substituting notation substituting the description of "low-pass filter". The LPF is an abbreviation notation of "low-pass filter". A symbol indicated by a sign 134 in FIG. 17 indicates that a convolution operation is to be performed.

Also, the mask size of the dither mask is indicated by S. Reference characters B and S respectively designate positive integers. The mask size in the case of assuming the dither mask of m rows×n columns is S=m×n. Reference characters m and n respectively designate positive integers. Further, the average value per pixel of the first low-pass filter itself corresponding to the gradation value 1 is defined as $\alpha=B/S$.

When the first low-pass filter is applied to a certain pixel (x,y) of the ejection rate reflecting input image $A(x,y)$, since the total of the pixel values increases by $A(x,y) \times B$ as the entire image, the total sum of the entire low-pass ejection rate reflecting input image obtained by convoluting the first low-pass filter to all the pixels of the ejection rate reflecting input image $A(x,y)$ is indicated by the following expression (1).

$$A(1,1) \times B + A(1,2) \times B + \ldots + A(m,n) \times B \qquad \text{Expression (1)}$$

Therefore, the average value per pixel of the increment is indicated by the following expression (2) by dividing the value of the expression (1) by the mask size S.

$$\{A(1,1) \times B + A(1,2) \times B + \ldots + A(m,n) \times B\}/S \qquad \text{Expression (2)}$$

On the other hand, since $\alpha=B/S$, the average value indicated by the expression (2) can be indicated as the following expression (3).

$$A(1,1) \times \alpha + A(1,2) \times \alpha + \ldots + A(m,n) \times \alpha \qquad \text{Expression (3)}$$

In order to make the value indicated by the expression (3) coincide with the average value of the second low-pass filter corresponding to one dot, ΔI is determined.

When ΔI is determined in this way, for an arbitrary dither mask threshold, the value for which the number of the dots generated by the threshold is multiplied with ΔI is determined as the input value.

In step S56, when the dots are added and the dot arrangement is updated, accordingly, as the next input value, ΔI is added to the input value, the uniform image is changed (step S60), and the ejection rate reflecting input image and the low-pass ejection rate reflecting input image are generated. In such a manner, the low-pass ejection rate reflecting input image and the low-pass dot arrangement image to be compared can be made to roughly coincide at the level of the average values.

In step S18 in FIG. 9 and step S60 in FIG. 16, by multiplying the gradation values of the individual pixels with the nozzle ejection rate (see FIG. 11), the values become smaller than the gradation values in the case of not multiplying the nozzle ejection rate. The nozzle ejection rate may be corrected so that, with the repetition cycle in the main scanning direction and the sub scanning direction of the nozzle numbers as the unit area, the average gradation value in the unit area does not change before multiplying and after multiplying the nozzle ejection rate, that is, the average gradation value per unit area becomes invariable before and after reflecting the nozzle ejection rate.

By not changing the average gradation value in the unit area before and after multiplying the nozzle ejection rate, calculation of ΔI described above can be further simplified. Specifically, as illustrated in a lower column of FIG. 17, ΔI is determined so that the value for which the value for which ΔI is multiplied with the average value a of the first low-pass filter corresponding to the gradation value 1 is further multiplied with the mask size S, or the value for which ΔI is multiplied with the total sum B of the first low-pass filter corresponding to the gradation value 1 coincides with the average value of the second low-pass filter corresponding to one dot.

Even when the nozzle ejection rate is reflected on ΔI, under the condition that the average value of ΔI per unit area does not change before and after that, the following expression (4) is satisfied.

$$\Delta I \times B = \Delta I \times \alpha \times S = A(1,1) \times \alpha + A(1,2) \times \alpha + \ldots + A(m,n) \times \alpha \quad \text{Expression (4)}$$

Therefore, in order to make this value coincide with the average value of the second low-pass filter corresponding to one dot, ΔI is determined.

The method of determining ΔI based on the average value per pixel of the coefficients that are the components of the individual cells of the first low-pass filter is described above, however, ΔI may be determined based on the total sum of the coefficients that are the components of the individual cells of the first low-pass filter. That is, ΔI may be determined so that the total sum of the entire low-pass ejection rate reflecting input image indicated by the expression (1) coincides with the total sum of the second low-pass filter corresponding to one dot, or, in the case of correcting the nozzle ejection rate so that the average gradation value in the unit area does not change before and after multiplying the nozzle ejection rate, ΔI may be determined so that the value indicated by the following expression (5) coincides with the total sum of the second low-pass filter corresponding to one dot.

$$\Delta I \times B \times S = A(1,1) \times B + A(1,2) \times B + \ldots + A(m,n) \times B \quad \text{Expression (5)}$$

The fact that the average gradation in the unit area does not change before and after multiplying the nozzle ejection rate means that there is the value of the nozzle ejection rate exceeding 1 by the correction of the nozzle ejection rate.

[About Correction of Nozzle Ejection Rate]

The nozzle ejection rate is corrected specifically as follows.

With the repetition cycle in the main scanning direction and the sub scanning direction of the individual nozzles 62 as the unit area, the area ratio of the pixel corresponding to the nozzle number 0 in the unit area is indicated as r0, the area ratio of the pixel corresponding to the nozzle number 1 is indicated as r1, and the area ratio of the pixel corresponding to the nozzle number k in the unit area is indicated as rk in the same manner. Reference character k is a parameter indicating the nozzle number. When the number of the nozzles configuring the nozzle array is Q and the leading number of the nozzle number is 0, reference character k designates an integer of 0 to Q−1 (k=0, 1, 2, . . . Q−1). Reference character Q designates an integer equal to or larger than 2.

In the case of the example illustrated in FIG. 12, the unit area to be a unit of the repetition cycle of the scanning pattern is configured by nine pixels that are one pixel in the main scanning direction×nine pixels in the sub scanning direction that are lined in the order of the nozzle numbers 0, 5, 1, 6, 2, 7, 3, 8 and 4. The unit area to be the unit of the repetition cycle of the scanning pattern is called "scanning pattern unit area", and the pixel corresponding to the nozzle number k in the scanning pattern unit area is called "nozzle number k corresponding pixel". In this case, a gradation sum of the nozzle number k corresponding pixel becomes rk×I (k=0, 1, 2, . . . Q−1).

Then, when the nozzle ejection rate of the nozzle number k is defined as Lk, as a result, an average gradation in the scanning pattern unit area after multiplying the nozzle ejection rate becomes I×(r0×L0+r1×L1+ . . . ).

In order to prevent the average gradation in the scanning pattern unit area from changing before and after multiplying nozzle ejection rate, the following expression (6) is satisfied, $$I = I \times (r0 \times L0 + r1 \times L1 + \ldots) \quad \text{Expression (6)}$$

that is, the nozzle ejection rates L0, L1 . . . of the individual nozzles 62 are corrected so as to satisfy an expression (7).

$$r0 \times L0 + r1 \times L1 + \ldots = 1 \quad \text{Expression (7)}$$

The area ratio rk of the individual nozzles 62 normally satisfies the following expression (8).

$$r0 = r1 = r2 = \ldots = 1/Q \quad \text{Expression(8)}$$

In the expression (8), reference character Q designates the number of the nozzles configuring the nozzle array.

Therefore, the value of the nozzle ejection rate is corrected by multiplying the nozzle ejection rates Lk (k=0, 1, 2, . . . Q−1) of the individual nozzles respectively with the correction value β=Q/(L0+L1+L2+ . . . ) so as to satisfy the following expression (9), $$L0 + L1 + L2 + \ldots = Q \quad \text{Expression (9)}$$

without changing the rates of the nozzle ejection rates (L0, L1, L2 . . . ) of the individual nozzles, based on the expression (7) and the expression (8).

Figure 18:
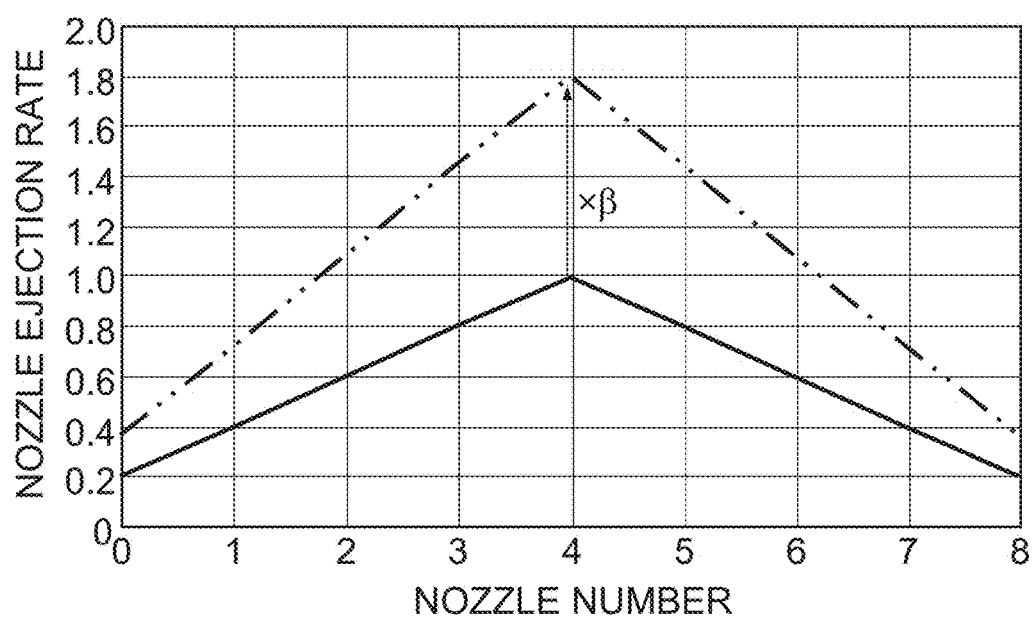
FIG. 18 is an explanatory diagram of the corrected nozzle ejection rate.

FIG. 18 is an explanatory diagram of the nozzle ejection rate corrected by multiplying the nozzle ejection rate described in FIG. 11 with the correction value β. Since the correction value β becomes a value larger than 1, as illustrated in FIG. 18, there is a possibility that the nozzle ejection rate after the correction becomes greater than 1. In this case, in the case that the value for which the gradation values of the individual pixels of the image data are multiplied with the nozzle ejection rate after the correction becomes 100% (255 in the case of the image data of eight bits) of the largest gradation value or greater, the gradation value after the conversion may be turned to 100% of the largest gradation value.

The process of correcting the nozzle ejection rate using the correction value $\beta$ as illustrated in FIG. 18 corresponds to one form of a "correction process". The process of correcting the nozzle ejection rate is executed before using the nozzle ejection rate in step S18 in FIG. 9.

After step S60 in FIG. 16, the process returns to step S42, and the above-described processing of step S42 to step S58 is repeated. In this way, the individual thresholds are determined in the ascending order, and when setting is ended to the largest threshold, Yes determination is attained in step S58, a subroutine in FIG. 16 is ended, and the process returns to a main flow in FIG. 9.

Figure 19:
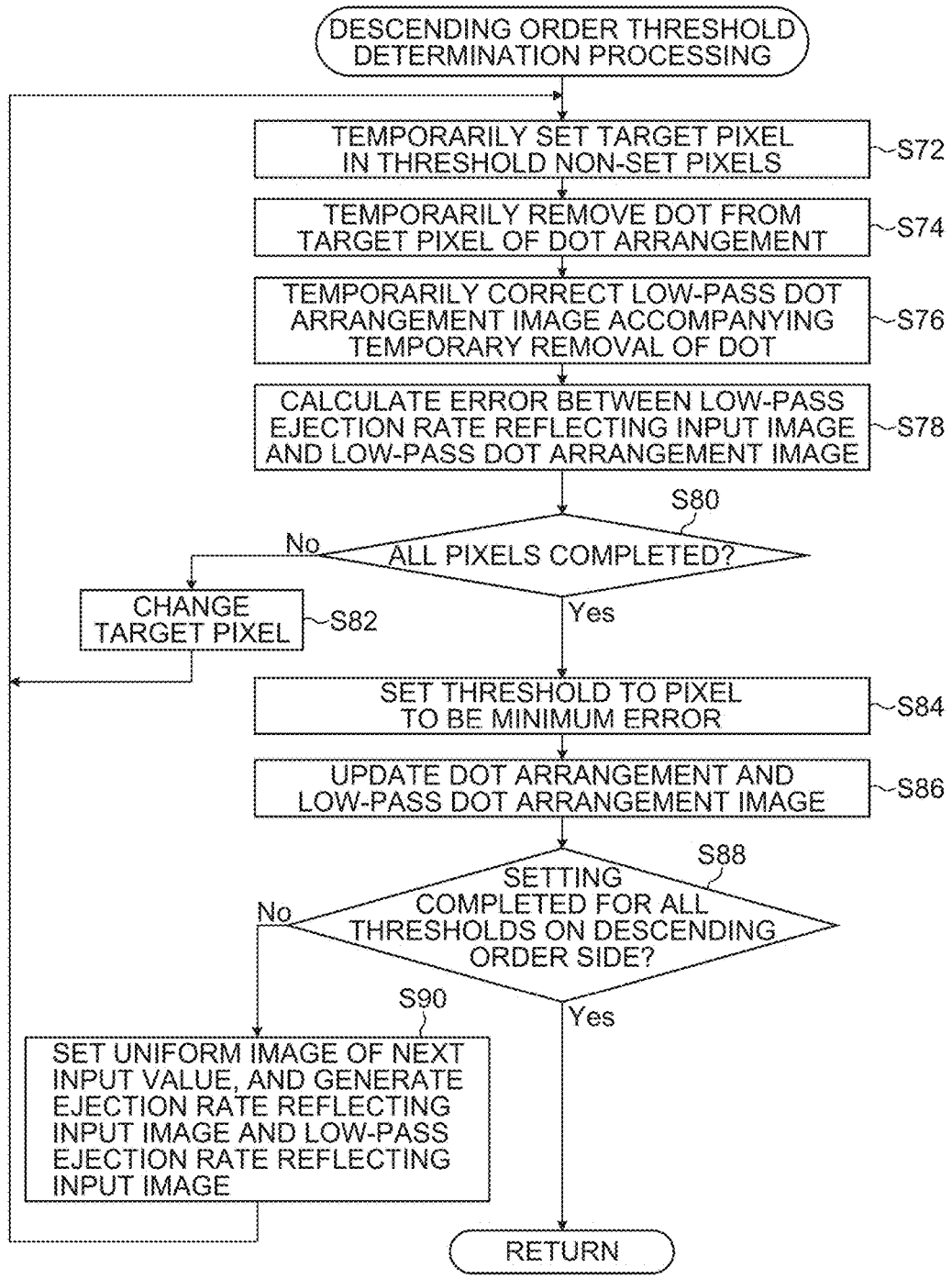
FIG. 19 is a flowchart of descending order threshold determination processing.

FIG. 19 is a flowchart of descending order threshold determination processing. The flowchart in FIG. 19 is a flow of the processing similar to the flowchart in the ascending order described in FIG. 16. Main difference is a process of steps S74 and S76 in FIG. 19.

In the descending order threshold determination processing illustrated in FIG. 19, first, a target pixel is temporarily set in the threshold non-set pixels (step S72). The threshold non-set pixels of the dither mask are the pixels with dots in the case that a threshold setting order is the descending order. That is, the target pixel is temporarily set from the pixels with dots in the dot arrangement. Then, in the case that the threshold setting order is the descending order, processing of temporarily removing a dot from the pixel position corresponding to the target pixel in the dot arrangement is performed (step S74). The process of step S74 is called "temporary removal of dot".

Accompanying the temporary removal of the dot, the low-pass dot arrangement image is temporarily corrected (step S76). Temporary correction in step S76 is processing of temporarily removing the second low-pass filter at the pixel position corresponding to the target pixel from the low-pass dot arrangement image.

Then, an error between the low-pass ejection rate reflecting input image and the low-pass dot arrangement image after the temporary correction is calculated (step S78). An evaluation index of "error" calculated here can be, similarly to step S48 in FIG. 16, the sum of squares or diffusion of a difference, or the square root of the sum of squares of the difference or the standard deviation.

Since the individual processes of steps S80, S82, S84, S86, S88 and S90 in FIG. 19 correspond to the individual processes of steps S50, S52, S54, S56, S58 and S60 in FIG. 16 respectively, the description is omitted. However, in step S88 in FIG. 19 replacing step S58 in FIG. 16, whether or not the setting of all the thresholds on the descending order side is competed is determined.

After step S90, the process returns to step S72, and the above-described processing of step S72 to step S88 is repeated.

In this way, the individual thresholds are determined in the descending order, and when the setting is ended to the smallest threshold, Yes determination is attained in step S88, a subroutine in FIG. 19 is ended, and the process returns to the main flow in FIG. 9.

In this way, the thresholds of all the pixels in the dither mask are set, and the dither mask is completed.

[Configuration of Dither Mask Generation Device]

Figure 20:
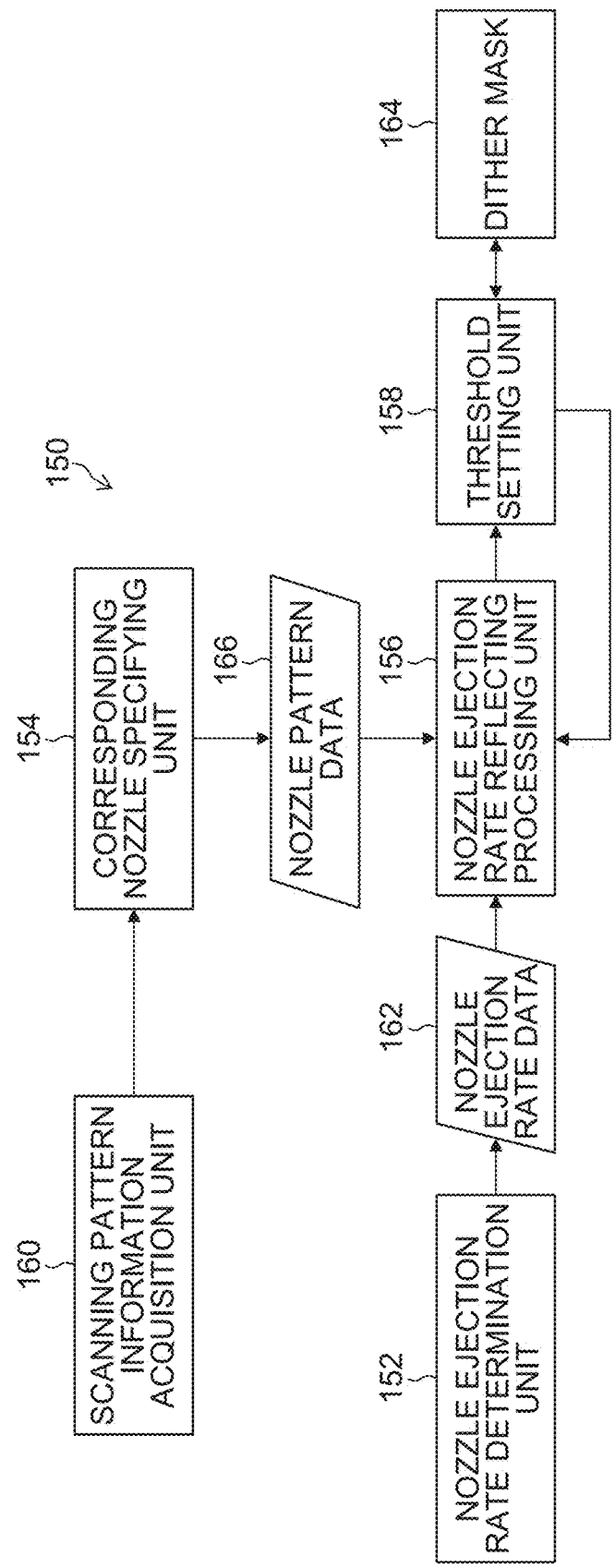
FIG. 20 is a block diagram illustrating a configuration of a dither mask generation device relating to the first embodiment.

FIG. 20 is a block diagram illustrating a configuration of a dither mask generation device relating to the first embodiment. A dither mask generation device 150 includes a nozzle ejection rate determination unit 152, a corresponding nozzle specifying unit 154, a nozzle ejection rate reflecting processing unit 156, and a threshold setting unit 158. Also, the dither mask generation device 150 has a scanning pattern information acquisition unit 160. These individual units can be achieved by a hardware circuit such as an integrated circuit, or hardware and software of a computer, or an appropriate combination thereof. Also, a function of the dither mask generation device 150 may be loaded on the controller 102 described in FIG. 5.

The nozzle ejection rate determination unit 152 illustrated in FIG. 20 performs processing of determining the nozzle ejection rate for each nozzle in the recording head 24 (see FIG. 4). The nozzle ejection rate determination unit 152 determines nozzle ejection rate data 162 indicating the nozzle ejection rate of each nozzle. The nozzle ejection rate data 162 corresponds to the nozzle ejection rate data 140 described in FIG. 15, and is like the one described in FIG. 8 and FIG. 11 specifically.

The corresponding nozzle specifying unit 154 illustrated in FIG. 20 performs processing of specifying the nozzles corresponding to the individual pixels of a dither mask 164, based on the information of the scanning pattern obtained from the scanning pattern information acquisition unit 160. That is, the corresponding nozzle specifying unit 154 performs processing of making at least one nozzle in charge of recording at the respective pixel positions correspond, for the individual pixels of the dither mask 164.

The scanning pattern information acquisition unit 160 acquires the information of the scanning pattern according to the image drawing mode from the scanning pattern program or the like. As described above, since the scanning pattern program defines the reciprocating scanning in the main scanning direction by the recording head 24 to the recording medium 12 intermittently conveyed in the sub scanning direction and the number of the paths, the scanning pattern of the recording head 24 can be discriminated from the scanning pattern program.

The corresponding nozzle specifying unit 154 discriminates the scanning pattern when the recording head 24 is relatively moved in the main scanning direction and the sub scanning direction to the recording medium 12. The corresponding nozzle specifying unit 154 performs processing of determining by which nozzle 62 of the recording head 24 the individual pixels of the dither mask 164 are to be recorded based on the scanning pattern. The corresponding nozzle specifying unit 154 generates nozzle pattern data 166 which is the data of the nozzle pattern indicating correspondence relation between the individual pixels of the dither mask 164 and the nozzles in charge of the recording of the respective pixels. The nozzle pattern data 166 corresponds to the data of the nozzle pattern 142 described in FIG. 15.

The method of generating the nozzle pattern data 166 is not limited to the method of determining it based on the scanning pattern program, and various kinds of methods can be used. Since the nozzle pattern data 166 can be determined by the image drawing mode and the size and arrangement method of the dither mask 164, the nozzle pattern data corresponding to each of the plurality of kinds of the image drawing modes can be held beforehand in the information storage unit such as a memory.

The nozzle ejection rate reflecting processing unit 156 performs processing of reflecting the nozzle ejection rate on the evaluation index when the individual thresholds of the dither mask 164 are set.

The threshold setting unit 158 performs processing of preparing the dither mask 164 including the pixels to which the threshold is not set, and setting the threshold to the threshold non-set pixels of the dither mask 164 based on the evaluation index on which the nozzle ejection rate is reflected. By setting the thresholds of all the pixels of the dither mask 164 by the threshold setting unit 158, the dither mask 164 which is a generation target is completed.

A function of the nozzle ejection rate determination unit 152 corresponds to one form of a "nozzle ejection rate determination function". A function of the corresponding nozzle specifying unit 154 corresponds to one form of a "corresponding nozzle specifying function". A function of the nozzle ejection rate reflecting processing unit 156 corresponds to one form of a "nozzle ejection rate reflecting processing function". A function of the threshold setting unit 158 corresponds to one form of a "threshold setting function".

For a correcting function of correcting the nozzle ejection rate described in FIG. 18, a nozzle ejection rate correction unit (not shown in the figure) may be provided in the nozzle ejection rate determination unit 152, or the nozzle ejection rate correction unit (not shown in the figure) may be provided in the nozzle ejection rate reflecting processing unit 156.

The dither mask 164 obtained by the present embodiment becomes the dither mask capable of obtaining the dot arrangement to be excellent dot dispersibility for reproduction of the ejection rate reflecting input image reflecting the nozzle ejection rate.

Using the dither mask generated by the present embodiment, the halftone processing of the image data for printing is performed. On the basis of the halftone image generated in this way, the ejection of the individual nozzles of the recording head 24 is controlled. Thus, generation of image defects such as banding, stripes or irregularity can be suppressed, and high-quality print images are obtained.

Figure 21:
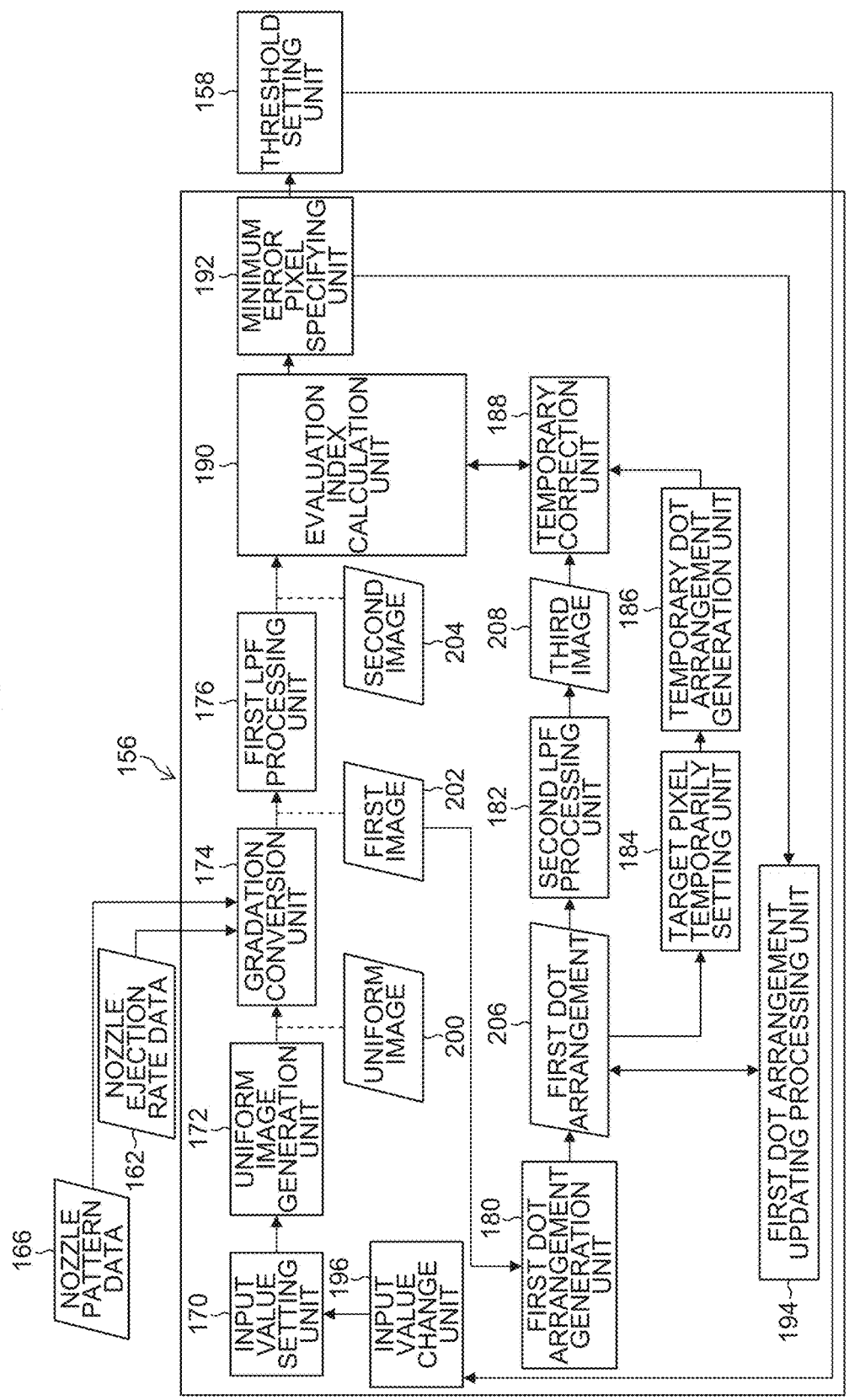
FIG. 21 is a block diagram illustrating a detailed configuration of a nozzle ejection rate reflecting processing unit in the dither mask generation device of the first embodiment.

FIG. 21 is a block diagram illustrating a detailed configuration of the nozzle ejection rate reflecting processing unit 156 in the dither mask generation device 150 of the first embodiment. In FIG. 21, the same signs are attached to the same elements as the ones in the configuration described in FIG. 20 and the description is omitted.

The nozzle ejection rate reflecting processing unit 156 includes an input value setting unit 170, a uniform image generation unit 172, a gradation conversion unit 174, a first low-pass filter processing unit 176, a first dot arrangement generation unit 180, a second low-pass filter processing unit 182, a target pixel temporarily setting unit 184, a temporary dot arrangement generation unit 186, a temporary correction unit 188, an evaluation index calculation unit 190, a minimum error pixel specifying unit 192, a first dot arrangement updating processing unit 194, and an input value change unit 196.

The input value setting unit 170 sets an input value I indicating the gradation value of the input image. The input value setting unit 170 sets an initial input value $I_0$ indicating the gradation value of the initial input image 146 (see FIG. 15) first.

The uniform image generation unit 172 generates a uniform image 200 of the input value set in the input value setting unit 170. The initial uniform image 200 corresponding to the initial input value $I_0$ corresponds to the input image 146 described in FIG. 15.

The gradation conversion unit 174 illustrated in FIG. 21 performs processing of gradation conversion of reflecting the corresponding nozzle ejection rates on the individual pixel values of the uniform image 200 based on the nozzle ejection rate data 162 and the nozzle pattern data 166. A first image 202 generated by the gradation conversion unit 174 corresponds to the ejection rate reflecting input image described in step S18 in FIG. 9. The first image 202 corresponds to the ejection rate reflecting input image 148 described in FIG. 15. The gradation conversion unit 174 can be called a first image generation unit, and the conversion processing by the gradation conversion unit 174 can be recognized as first image generation processing.

The first low-pass filter processing unit 176 illustrated in FIG. 21 generates a second image 204 by performing an operation of convoluting the first low-pass filter to the first image 202. The second image 204 corresponds to the low-pass ejection rate reflecting input image described in step S20 in FIG. 9. The first low-pass filter processing unit 176 can be called a second image generation unit, and filter processing by the first low-pass filter processing unit 176 can be recognized as second image generation processing.

The first dot arrangement generation unit 180 illustrated in FIG. 21 generates a first dot arrangement 206 which is the dot arrangement corresponding to the first image 202.

The second low-pass filter processing unit 182 generates a third image 208 by performing an operation of convoluting the second low-pass filter to the first dot arrangement. The third image 208 corresponds to the low-pass dot arrangement image described in step S24 in FIG. 9. The second low-pass filter processing unit 182 can be called a third image generation unit, and filter processing by the second low-pass filter processing unit 182 can be recognized as third image generation processing.

The target pixel temporarily setting unit 184 temporarily sets the target pixel to the threshold non-set pixels of the dither mask based on the first dot arrangement 206. The target pixel temporarily setting unit 184 performs the process indicated in step S42 in FIG. 16 and step S72 in FIG. 19.

The temporary dot arrangement generation unit 186 temporarily places the dot to the target pixel, or temporarily removes the dot from the target pixel, and generates a temporary dot arrangement. The temporary dot arrangement generation unit 186 performs the process indicated in step S44 in FIG. 16 and step S74 in FIG. 19.

The temporary correction unit 188 performs processing of temporarily correcting the third image 208 accompanying the temporary placement or temporary removal of the dot by the temporary dot arrangement generation unit 186. The temporary correction unit 188 performs the process indicated in step S46 in FIG. 16 and step S76 in FIG. 19.

The evaluation index calculation unit 190 calculates the evaluation index that evaluates the error between the second image 204 and the third image 208 after the temporary correction. The evaluation index calculation unit 190 performs the process indicated in step S48 in FIG. 16 and step S78 in FIG. 19.

The minimum error pixel specifying unit 192 changes the position of the temporarily set target pixel, and specifies the position of the pixel for which the error becomes minimum from the evaluation index calculated by the evaluation index calculation unit 190. The information of the minimum error pixel which is the pixel for which the error becomes minimum is provided to the threshold setting unit 158.

The threshold setting unit 158 sets the threshold to the pixel for which the error becomes minimum from the evaluation index obtained by the evaluation index calculation unit 190 among the threshold non-set pixels of the dither mask 164. By the minimum error pixel specifying unit 192 and the threshold setting unit 158, the process indicated in step S54 in FIG. 16 and step S84 in FIG. 19 is performed.

The first dot arrangement updating processing unit 194 performs processing of placing the dot to the minimum error pixel or removing the dot from the minimum error pixel based on the information of the minimum error pixel, and updating the first dot arrangement 206. Then, the second low-pass filter processing unit 182 updates the third image 208 by performing the operation of convoluting the second low-pass filter to the updated first dot arrangement 206. Or, the second low-pass filter processing unit 182 updates the third image 208 by adding the second low-pass filter to the pixel position corresponding to the minimum error pixel or removing the second low-pass filter from the pixel position corresponding to the minimum error pixel for the initial third image 208. By the first dot arrangement updating processing unit 194 and the second low-pass filter processing unit 182, the process indicated in step S56 in FIG. 16 and step S86 in FIG. 19 is performed.

The initial first dot arrangement may be rewritten and updated by the latest dot arrangement generated by the first dot arrangement updating processing unit 194, or the initial first dot arrangement may be held and also the updated dot arrangement may be held.

The input value change unit 196 changes the input value accompanying the setting of the threshold by the threshold setting unit 158. Specifically, using ΔI that is the increment of the input value for one dot, the input value is changed corresponding to the increase and decrease of the dot. Then, the uniform image generation unit 172 generates the uniform image 200 of the changed input value, the gradation conversion unit 174 generates the first image 202 by performing the processing of the gradation conversion of reflecting the corresponding nozzle ejection rates on the individual pixel values of the uniform image 200, and the first low-pass filter processing unit 176 generates the second image 204 by performing the operation of convoluting the first low-pass filter to the first image 202.

By the input value change unit 196, the uniform image generation unit 172, the gradation conversion unit 174 and the first low-pass filter processing unit 176, the process indicated in step S60 in FIG. 16 and step S90 in FIG. 19 is performed.

Second Embodiment

In the dither mask generation method described in the first embodiment, a huge operation amount is required since it is needed, as described in FIG. 16 and FIG. 19, to repeatedly execute the processing of temporarily setting the target pixel to the threshold non-set pixel to be a candidate every time of setting the individual thresholds, temporarily placing the dot to the first dot arrangement and adding the second low-pass filter to the low-pass dot arrangement image in the case of an ascending threshold setting order, temporarily removing the dot from the first dot arrangement and removing the second low-pass filter from the low-pass dot arrangement image in the case of a descending threshold setting order, and calculating the error between the low-pass ejection rate reflecting input image and the low-pass dot arrangement image.

Therefore, in the second embodiment, a device capable of generating the dither mask with an operation amount smaller than that in the first embodiment is provided.

Figure 22:
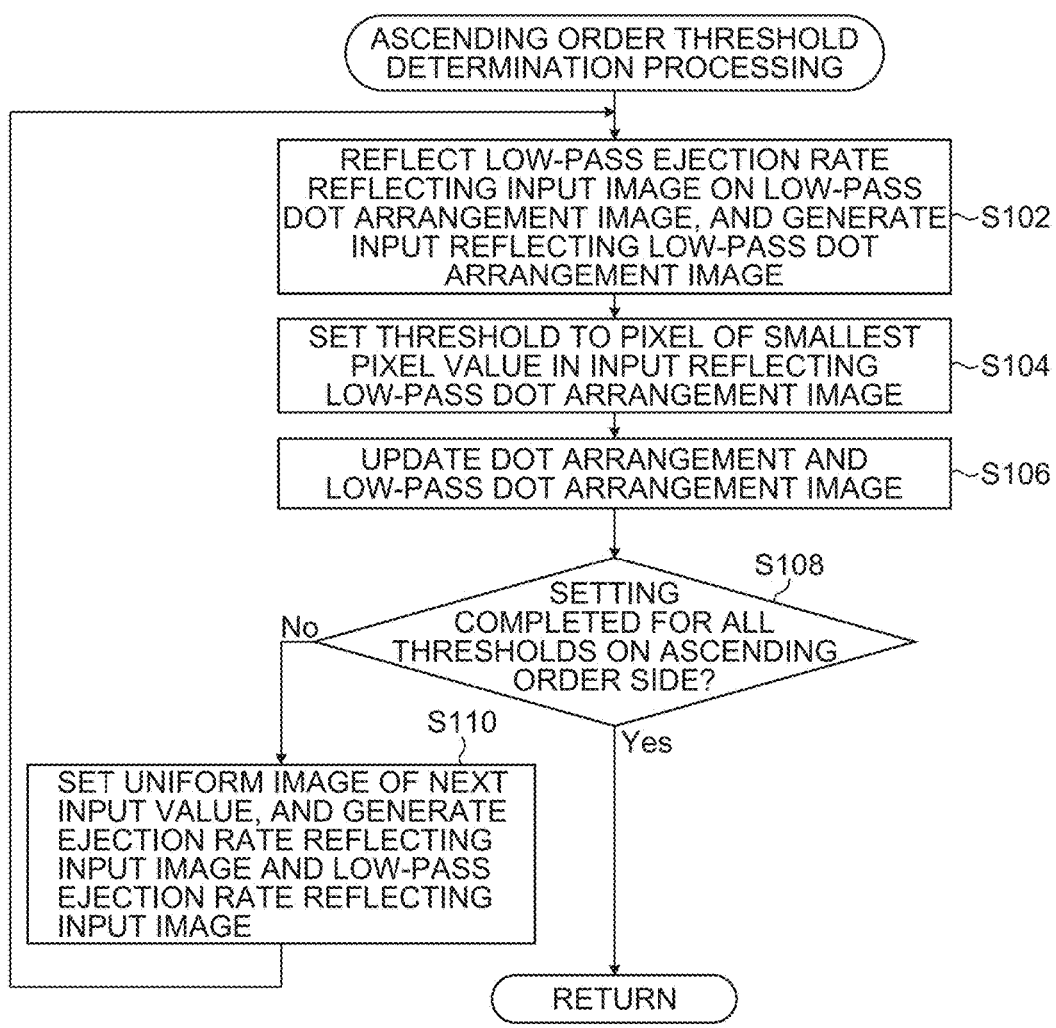
FIG. 22 is a flowchart of ascending order threshold determination processing in the dither mask generation method relating to a second embodiment.

FIG. 22 is a flowchart of the dither mask generation method by the second embodiment. Instead of the flowchart described in FIG. 16, the flowchart in FIG. 22 can be adopted.

Here, in order to simplify the description, only the case that the threshold setting order is the ascending order is described. As in the flowchart illustrated in FIG. 22, in threshold setting processing in FIG. 22, first, the low-pass ejection rate reflecting input image is reflected on the low-pass dot arrangement image, and an input reflecting low-pass dot arrangement image is generated (step S102). The process of step S102 corresponds to one form of a "fourth image generation process". The input reflecting low-pass dot arrangement image corresponds to one form of a "fourth image".

As a reflecting method, in the case of taking a difference between the low-pass dot arrangement image and the low-pass ejection rate reflecting input image, the input reflecting low-pass dot arrangement image is generated by the following expression (10).

$$RIN\_F\_HT(x,y) = F\_HT(x,y) - F\_IN(x,y) \qquad \text{Expression (10)}$$

Here, reference characters x and y designate the position of the pixel. Reference character $RIN\_F\_HT(x,y)$ designates the input reflecting low-pass dot arrangement image at x,y. Reference character $F\_HT(x,y)$ means the low-pass dot arrangement image at x,y. Reference character $F\_IN(x,y)$ means the low-pass ejection rate reflecting input image at x,y.

Also, as the reflecting method, in the case of taking the ratio (that is, the quotient) of the low-pass dot arrangement image and low-pass ejection rate reflecting input image, the input reflecting low-pass dot arrangement image is generated by the following expression (11).

$$RIN\_F\_HT(x,y) = F\_HT(x,y)/F\_IN(x,y) \qquad \text{Expression (11)}$$

In the case of taking the quotient, in order to prevent division by a denominator "0", it is desirable to add a minute value (for example, 1 or the like) to $F\_IN(x,y)$.

In order to help understanding, the description is given with a specific conceptual diagram.

Figure 23:
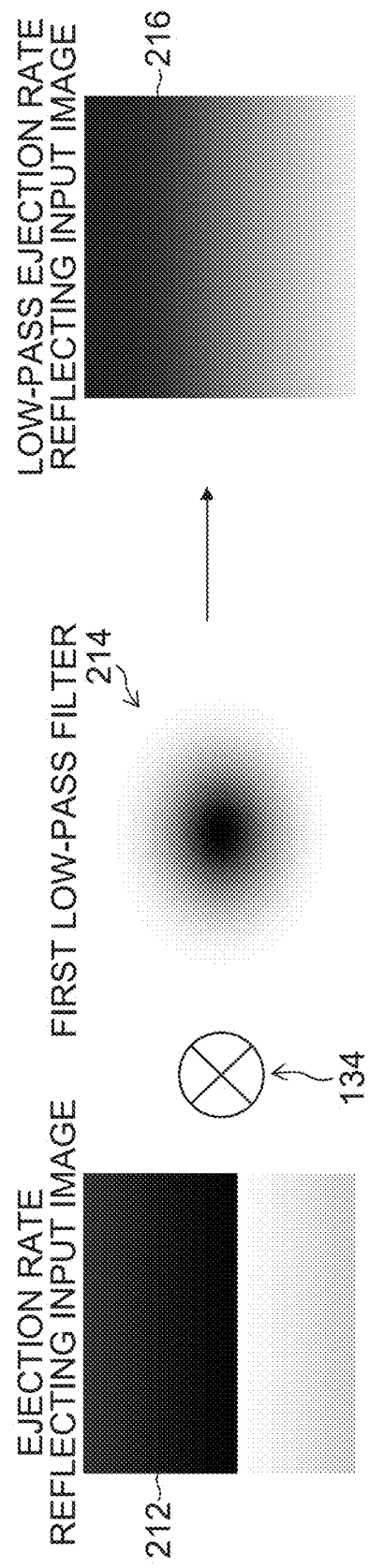
FIG. 23 is an explanatory diagram illustrating a process of generating a low-pass ejection rate reflecting input image, using a specific image.

FIG. 23 is an explanatory diagram illustrating a process of generating the low-pass ejection rate reflecting input image using a specific image. In FIG. 23, for the convenience of the illustration, as an example of an ejection rate reflecting input image 212, as illustrated, a separately painted pattern for which an upper side of an image is dark and a lower side is light is indicated. In FIG. 23, a first low-pass filter 214 indicates a size of a filter coefficient by shades. A tendency that the filter coefficient gradually becomes small from a filter center part to an outer side periphery is indicated.

By convoluting the first low-pass filter 214 to the ejection rate reflecting input image 212, a low-pass ejection rate reflecting input image 216 is generated. The low-pass ejection rate reflecting input image 216 corresponds to the second image 204 (see FIG. 21).

Figure 24:
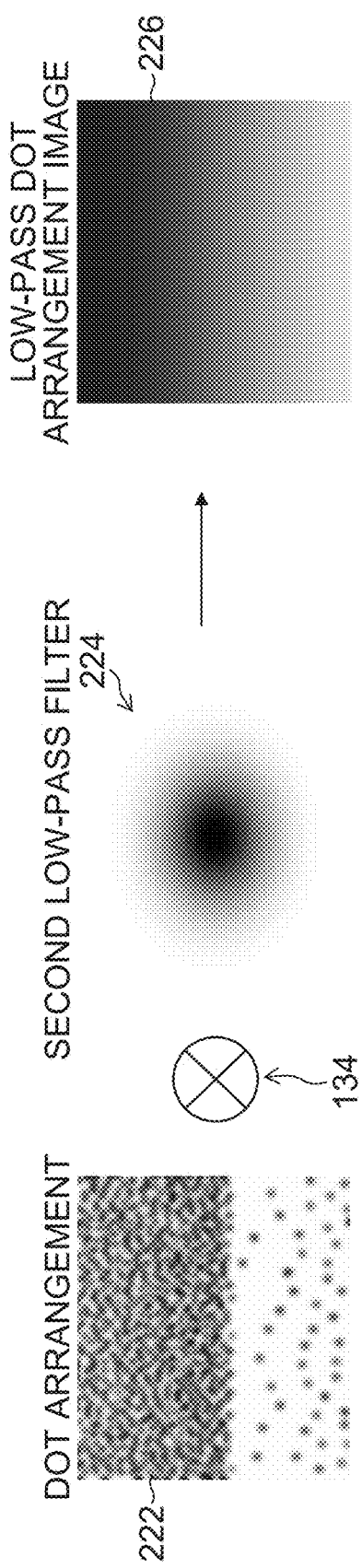
FIG. 24 is an explanatory diagram illustrating a process of generating a low-pass dot arrangement image, using a specific image.

FIG. 24 is an explanatory diagram illustrating a process of generating the low-pass dot arrangement image using a specific image. A dot arrangement 222 illustrated in FIG. 24 is the initial dot arrangement corresponding to the ejection rate reflecting input image 212 illustrated in FIG. 23. In FIG. 24, a second low-pass filter 224 indicates the size of the filter coefficient by shades. A tendency that the filter coefficient gradually becomes small from the filter center part to the outer side periphery is indicated.

By convoluting the second low-pass filter 224 to the dot arrangement 222, a low-pass dot arrangement image 226 is generated. The low-pass dot arrangement image 226 corresponds to the third image 208 (see FIG. 21).

Figure 25:
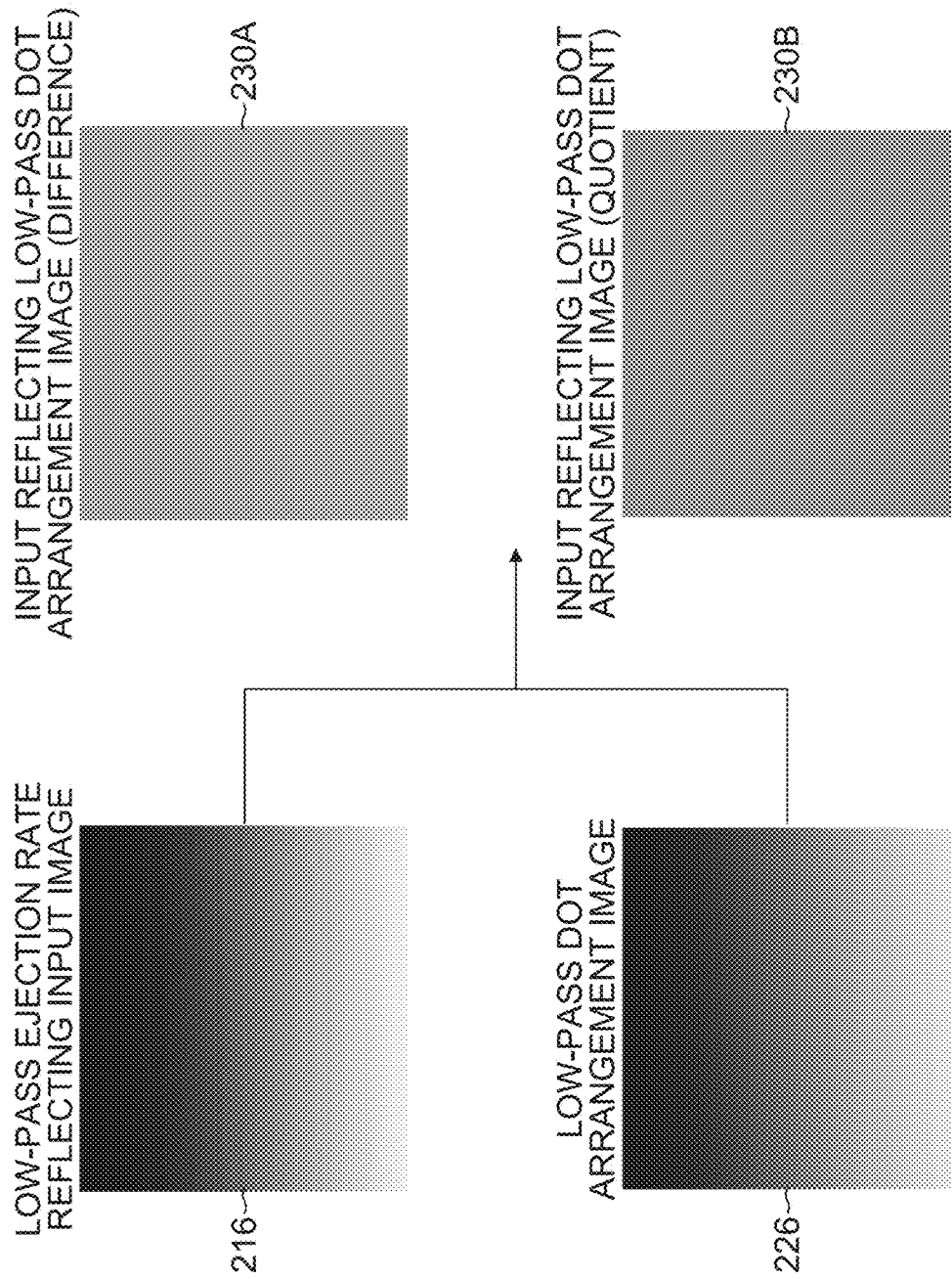
FIG. 25 is an explanatory diagram illustrating a process of generating an input reflecting low-pass dot arrangement image, using a specific image.

FIG. 25 is an explanatory diagram illustrating a process of generating the input reflecting low-pass dot arrangement image using a specific image.

The low-pass ejection rate reflecting input image 216 illustrated in FIG. 25 is an image obtained by convoluting the first low-pass filter 214 to the ejection rate reflecting input image 212 described in FIG. 23. The low-pass dot arrangement image 226 illustrated in FIG. 25 is an image obtained by convoluting the second low-pass filter 224 to the dot arrangement 222 described in FIG. 24. However, in FIG. 25, in order to easily understandably illustrate the drawing, a scale (change field) of the shades of the individual images in FIG. 25 is appropriately adjusted and drawn, and the scale is not unified among the images.

An input reflecting low-pass dot arrangement image 230A illustrated in FIG. 25 is an image obtained by subtracting the pixel values of the corresponding pixels of the low-pass ejection rate reflecting input image 216 and the low-pass dot arrangement image 226, indicating a difference between both.

Also, an input reflecting low-pass dot arrangement image 230B illustrated in FIG. 25 is an image obtained by dividing the pixel values of the corresponding pixels of the low-pass ejection rate reflecting input image 216 and the low-pass dot arrangement image 226, indicating the quotient of both.

Though there is a difference between indicating a distinction between the low-pass ejection rate reflecting input image 216 and the low-pass dot arrangement image 226 by the difference and indicating it by the quotient, in both cases, the input reflecting low-pass dot arrangement images 230A and 230B are the images reflecting the individual pixel values of the low-pass ejection rate reflecting input image 216 on the individual corresponding pixel values of the low-pass dot arrangement image 226.

As the error between the low-pass ejection rate reflecting input image 216 and the low-pass dot arrangement image 226 is smaller, uniformity of a gradation distribution of the input reflecting low-pass dot arrangement image 230A or 230B increases. That is, as the error between the low-pass ejection rate reflecting input image 216 and the low-pass dot arrangement image 226 is smaller, the input reflecting low-pass dot arrangement image 230A or 230B becomes closer to a more uniform image.

Therefore, by determining the position of the pixel to be a dot additionally installing position or a dot removing position so as to improve the uniformity of the gradation distribution of the input reflecting low-pass dot arrangement image 230A or 230B, the dot arrangement suitable for reproduction of the ejection rate reflecting input image 212 can be obtained.

"Improving uniformity of gradation distribution" means that the input reflecting low-pass dot arrangement images 230A and 230B become closer to the uniform image. The fact that the input reflecting low-pass dot arrangement image 230A or 230B becomes closer to the uniform image means that the difference (that is, the error) between the low-pass ejection rate reflecting input image 216 and the low-pass dot arrangement image 226 becomes small.

The fact that the low-pass dot arrangement image 226 with a small difference from the low-pass ejection rate reflecting input image 216 is obtained means, namely, that the dot arrangement (that is, the halftone image) that excellently reproduces image content of the ejection rate reflecting input image 212 can be obtained. "Improving uniformity of gradation distribution" is sometimes expressed as "uniformization". Improvement of the uniformity of the gradation distribution means that the uniformity of the gradation distribution becomes excellent, and has the same meaning as enhancement of the uniformity of the gradation distribution.

When the input reflecting low-pass dot arrangement image is generated in step S102 in FIG. 22, subsequently, the threshold is set to the pixel of the smallest pixel value inside the generated input reflecting low-pass dot arrangement image (step S104). In step S104, the pixel values of the individual pixels inside the image of the input reflecting low-pass dot arrangement image are compared with each other, and the pixel whose pixel value is the smallest is determined as a threshold setting pixel. Then, to the determined threshold setting pixel, the threshold is set.

The pixel whose pixel value is the smallest in the input reflecting low-pass dot arrangement image corresponds to one form of "the pixel that enhances the uniformity of the gradation distribution of the fourth image in the case of correcting the third image and the fourth image accompanying execution of dot installation, among the individual pixels in the first dot arrangement".

Accompanying the setting of the threshold by step S104, the dot arrangement and the low-pass dot arrangement image are updated (step S106). That is, the dot arrangement is updated by placing the dot at the position of the pixel to which the threshold is set by step S104, and the low-pass dot arrangement image is updated by generating the low-pass dot arrangement image corresponding to the updated dot arrangement.

In step S108, whether or not the setting of all the thresholds on the ascending order side is completed is determined. In the case of No determination in step S108, the process advances to step S110. In step S110, the uniform image of the next input value is set, and the ejection rate reflecting input image and the low-pass ejection rate reflecting input image are generated. The process of step S108 and step S110 is similar to the process of step S58 and step S60 in FIG. 16.

However, in the case that the input reflecting low-pass dot arrangement image is defined by the quotient as indicated by the expression (11), the process of step S110 in FIG. 22 is not needed.

After step S110 in FIG. 22, the process returns to step S102, and the above-described processing of step S102 to step S108 is repeated. In this way, the individual thresholds are determined in the ascending order, and when the setting is ended to the largest threshold, Yes determination is attained in step S108, a subroutine in FIG. 22 is ended, and the process returns to the main flow in FIG. 9.

The descending order threshold determination processing is similar to the flowchart in FIG. 22. In the case of the descending order, the threshold is set to the pixel of the largest pixel value in the input reflecting low-pass dot arrangement image instead of the process of setting the threshold to the pixel of the smallest pixel value in step S104, the dot is removed (eliminated) from the position of the pixel to which the threshold is set and the dot arrangement and the low-pass dot arrangement image are updated.

According to the dither mask generation method of the second embodiment, an operation method of reducing the error between the low-pass ejection rate reflecting input image and the low-pass dot arrangement image as a result by introducing the input reflecting low-pass dot arrangement image and determining the position to place the dot or the position to remove the dot so as to uniformize the input reflecting low-pass dot arrangement image is adopted. That is, in the second embodiment, the position of the pixel to set the threshold is specified and the threshold is set, based on the comparison of the pixel values within the input reflecting low-pass dot arrangement image, so as to uniformize the input reflecting low-pass dot arrangement image.

According to the second embodiment, the pixel value of the input reflecting low-pass dot arrangement image can be utilized as it is as the evaluation index, and the pixel to set the threshold can be easily specified based on the comparison of size relation among the pixel values with each other within the image of the input reflecting low-pass dot arrangement image, without calculating a separate evaluation value such as a square error.

Therefore, compared to the method in the first embodiment, the appropriate dither mask can be obtained with a small operation amount.

Figure 26:
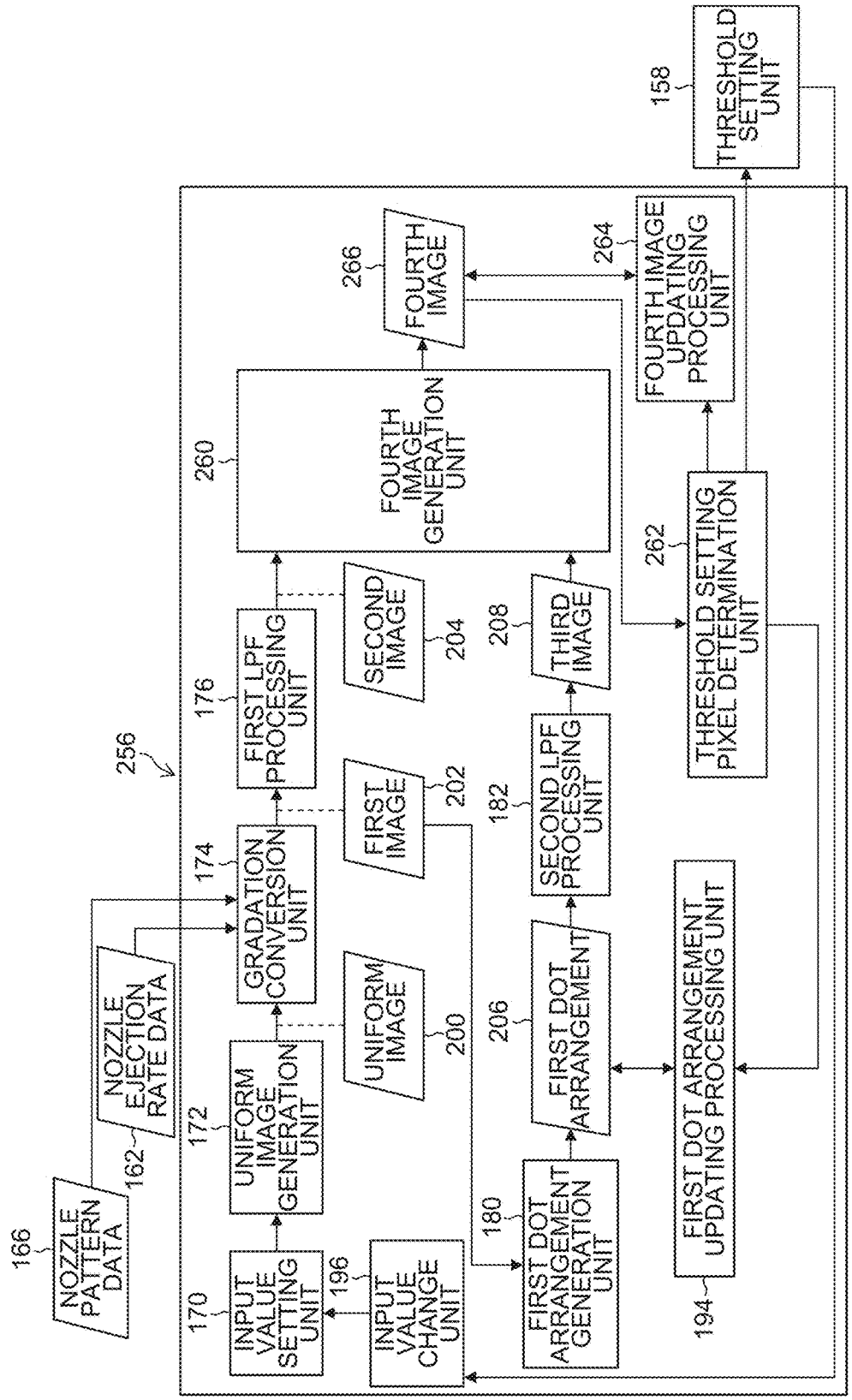
FIG. 26 is a block diagram illustrating a main part configuration of the dither mask generation device relating to the second embodiment.

FIG. 26 is a block diagram illustrating a main part configuration of the dither mask generation device relating to the second embodiment. In FIG. 26, the same signs are attached to the elements same as or similar to the ones in the configuration described in FIG. 21, and the description is omitted. A basic configuration of the dither mask generation device of the second embodiment is similar to the first embodiment illustrated in FIG. 20, however, instead of the nozzle ejection rate reflecting processing unit 156 described in FIG. 21, the configuration of a nozzle ejection rate reflecting processing unit 256 illustrated in FIG. 26 is provided.

The nozzle ejection rate reflecting processing unit 256 in the second embodiment includes a fourth image generation unit 260, a threshold setting pixel determination unit 262, and a fourth image updating processing unit 264. The fourth image generation unit 260 performs processing of generating, from the second image 204 and the third image 208, a fourth image 266 indicating a difference between both. The fourth image 266 corresponds to the input reflecting low-pass dot arrangement image described in step S102 in FIG. 22. The fourth image 266 is an image reflecting the individual pixel values of the second image 204 on the individual pixel values of the third image 208.

As the reflecting method of reflecting the individual pixel values of the second image on the individual pixel values of the third image 208 so as to indicate a difference between the second image 204 and the third image 208, there are the case of taking the difference and the case of taking the ratio. "Difference" is obtained by subtraction of the pixel values with each other. "Ratio" is obtained by division of the pixel values with each other. "Ratio" has the same meaning as "quotient".

The fourth image generation unit 260 can be the configuration of calculating the difference in the pixel value between the respectively corresponding pixel positions of the second image 204 and the third image 208 (that is, the subtraction), and generating the fourth image 266 for which the value indicating the difference is the pixel value.

Also, without being limited to the form of calculating the difference, the fourth image 266 indicating the difference between the second image 204 and the third image 208 may be generated by the ratio of the pixel values of the corresponding pixel positions with each other, that is, the quotient by the division. That is, the fourth image generation unit 260 can be the configuration of calculating the ratio (the quotient by the division) of the pixel values of the respectively corresponding pixel positions with each other of the second image 204 and the third image 208 and generating the fourth image 266 for which the value indicating the quotient is the pixel value.

The threshold setting pixel determination unit 262 performs processing of determining the threshold setting pixel which is a location of the pixel to set the threshold based on the fourth image 266. Specifically, the pixel values within the image of the fourth image 266 are compared, and the pixel whose pixel value becomes the smallest or the pixel whose pixel value becomes the largest is determined from the fourth image 266.

The information of the threshold setting pixel determined in the threshold setting pixel determination unit 262 is sent to the threshold setting unit 158. The threshold setting unit 158 sets the threshold to the threshold setting pixel.

Also, the information of the threshold setting pixel determined in the threshold setting pixel determination unit 262 is sent to the first dot arrangement updating processing unit 194. The first dot arrangement updating processing unit 194 performs processing of updating the first dot arrangement 206 by adding the dot to the threshold setting pixel or removing the dot from the threshold setting pixel. The initial first dot arrangement may be rewritten and updated by the latest dot arrangement generated by the first dot arrangement updating processing unit 194, or the initial first dot arrangement may be held and also the updated dot arrangement may be held.

Further, the information of the threshold setting pixel determined in the threshold setting pixel determination unit 262 is sent to the fourth image updating processing unit 264.

The fourth image updating processing unit 264 performs processing of correcting and updating the fourth image 266 accompanying the updating processing of the first dot arrangement 206 by the first dot arrangement updating processing unit 194. The fourth image updating processing unit 264 corrects the fourth image 266 by performing processing of adding a contributory component of the second low-pass filter corresponding to the dot to be added to the threshold setting pixel to the fourth image 266 or processing of removing the contributory component of the second low-pass filter corresponding to the dot to be removed from the threshold setting pixel from the fourth image 266.

As a result of correction processing by the fourth image updating processing unit 264, the fourth image 266 for which the value of the pixel is updated is obtained. The initial fourth image 266 may be rewritten and updated by the latest fourth image 266 generated by the fourth image updating processing unit 264, or the initial fourth image may be held and also the updated fourth image generated by the fourth image updating processing unit 264 may be held.

The individual pieces of data of the first image 202, the second image 204, the first dot arrangement 206, the third image 208 and the fourth image 266 generated inside the dither mask generation device 150 (see FIG. 20) are held in a storage unit such as a memory (not shown in the figure) provided inside the dither mask generation device 150 or the like.

Modification 1 of Second Embodiment

In the second embodiment described above, the example of holding the input reflecting low-pass dot arrangement image which is the fourth image 266 generated by the fourth image generation unit 260 in the memory or the like, updating the fourth image 266 accompanying the setting of the threshold, and holding the updated fourth image 266 is described.

However, when the present invention is implemented, it is not always needed to hold the generated fourth image 266. For example, only the second image 204 and the third image 208 may be held and a value corresponding to the fourth image may be calculated as required when the pixel value is evaluated upon determining the threshold setting pixel.

Modification 2 of Second Embodiment

In the second embodiment described above, the threshold is set to the pixel corresponding to the smallest value (in the case of the ascending threshold setting order) of the fourth image 266, however, the threshold setting pixel is not always needed to be the pixel of the smallest value in the fourth image 266. For example, the pixels smaller than the average value of the pixel values in the fourth image 266 by a specified value or less may be all defined as candidates, one threshold setting pixel may be selected from the candidates randomly or by considering a separate index or arrangement restrictions further, and the threshold may be set to the selected threshold setting pixel.

"Specified value" to be a reference of determining the candidates may be a fixed value set beforehand, or may be changed every time of setting the threshold. Also, in the case of changing the specified value, a negative value may be also included. Using the negative value as the specified value means, namely, including the pixels of the pixel value larger than the average value in the candidates. A reason for allowing the negative value as the specified value is to avoid falling into a partial and local optimum solution and reach an optimum solution, similarly to a simulated annealing method. In a range that such an object can be achieved, the specified value is changed.

For the separate index, for example, an index that evaluates image quality such as graininess, stripe-like image defects, density irregularity or banding, an index of a dot covering rate or the like, or an appropriate combination of these indexes can be adopted.

As the arrangement restrictions, for example, other than the restrictions of setting a limit to the pixel with an adjacent dot, or setting the limit to the pixel without the adjacent dot, the restrictions of setting the limit to the pixel corresponding to a specific nozzle or a specific scanning path or setting the limit to the pixel not corresponding to the specific nozzle or the specific scanning path or the like can be adopted, and these restrictions may be appropriately combined for the arrangement restriction.

While all the threshold non-set pixels are turned to the candidates and a trial operation is repeated in the method described in the first embodiment, according to the second embodiment, since the pixels to be the candidates are narrowed based on the pixel value of the input reflecting low-pass dot arrangement image, it is easy to determine the threshold setting pixel. In particular, by the second embodiment, one threshold setting pixel can be specified according to a simple rule, based on the comparison of the pixel values in the input reflecting low-pass dot arrangement image. The simple rule is the already described rule to be the pixel of the smallest value, or the rule for which narrowing of the candidates by the specified value and selection by a random number or the like are combined or the like. According to the present embodiment, an optimum dither mask can be obtained with a small operation amount. Also, when the pixel values in the input reflecting low-pass dot arrangement image is compared, without being limited to the case of comparing the pixel values in a pixel-to-pixel manner by a pixel unit, the plurality of pixels may be turned into a group and the pixel values may be compared by a group unit.

Modification 3 of Second Embodiment

Regarding the generation of the input reflecting low-pass dot arrangement image described in step S102 in FIG. 22, an expression (11) for which a first term and a second term on a right side of the already described expression (9) are replaced can be used.

That is, as the method of reflecting the low-pass ejection rate reflecting input image on the low-pass dot arrangement image, in the case of taking "difference" between both, instead of the expression (10), the following expression (12) can be used.

$$RIN\_F\_HT(x,y)=F\_IN(x,y)-F\_HT(x,y) \qquad \text{Expression (12)}$$

In this case, for the processing of step S104, the threshold is set to the pixel of the largest value in the input reflecting low-pass dot arrangement image, or the threshold is set to the pixel larger than the average value by the specified value or more.

Modification 4 of Second Embodiment

Regarding the generation of the input reflecting low-pass dot arrangement image described in step S102 in FIG. 22, an expression (13) for which a denominator and a numerator on a right side of the already described expression (11) are replaced can be used.

That is, as the method of reflecting the low-pass ejection rate reflecting input image on the low-pass dot arrangement image, in the case of taking "quotient" of both, instead of the expression (11), the following expression (13) can be used.

$$RIN\_F\_HT(x,y)=F\_IN(x,y)/F\_HT(x,y) \qquad \text{Expression (13)}$$

In order to prevent the division by the denominator "0", it is desirable to add a minute value (for example, "1") to F_HT(x,y).

In this case, for the processing of step S104, the threshold is set to the pixel of the largest value in the input reflecting low-pass dot arrangement image, or the threshold is set to the pixel larger than the average value by the specified value or more.

Modification 5 of Second Embodiment

For a definition of the input reflecting low-pass dot arrangement image, the case of defining it by "difference" by the subtraction like the expression (9) and the expression (11) and the case of defining it by "quotient" by the division like the expression (10) and the expression (12) are described, however, the subtraction can be also handled as addition of a negative value and the division can be handled as multiplication of a fraction. Therefore, under such equivalent handling, the difference by the subtraction can be noted as "sum" by the addition, and the quotient by the division can be noted as "product" by the multiplication.

<Case that Multiple Nozzle Numbers Exist for Individual Pixels of Dither Mask>

In the first embodiment and the second embodiment described above, the case that there is only one nozzle ejection rate to be reflected in the generation of the dither mask respectively for the individual pixels of the dither mask is described. However, the case that there are the plurality of nozzle ejection rates for the individual pixels of the dither mask is also assumed. When the size of the dither mask coincides with a multiple of the repetition cycle in the main scanning direction and the sub scanning direction of the nozzle numbers, since there is one nozzle number corresponding to the individual pixels of the dither mask for one pixel, there is only one nozzle ejection rate to be applied to the individual pixels of the dither mask for one pixel. However, in the case that the size of the dither mask does not coincide with the multiple of the repetition cycle in the main scanning direction and the sub scanning direction of the nozzle numbers, there are the plurality of nozzle numbers corresponding to the individual pixels of the dither mask for one pixel, and as a result, there are the plurality of nozzle ejection rates to be applied to the individual pixels of the dither mask for one pixel.

Also, for example, as disclosed in Japanese Patent Application Laid-Open No. 2000-101837 gazette, even in the case of shifting the dither mask in the sub scanning direction and arranging it upon the halftone processing of the continuous gradation image, there are the plurality of nozzle ejection rates respectively for the individual pixels of the dither mask.

The dither mask generation method in the case that there are the plurality of nozzle numbers for the individual pixels of the dither mask, that is, in the case that there are the plurality of nozzle ejection rates, is described. Here, an example of assuming processing of shifting the dither mask in the sub scanning direction and arranging it upon the halftone processing (called "mask shifting processing" in the present specification) is described.

Figure 27:
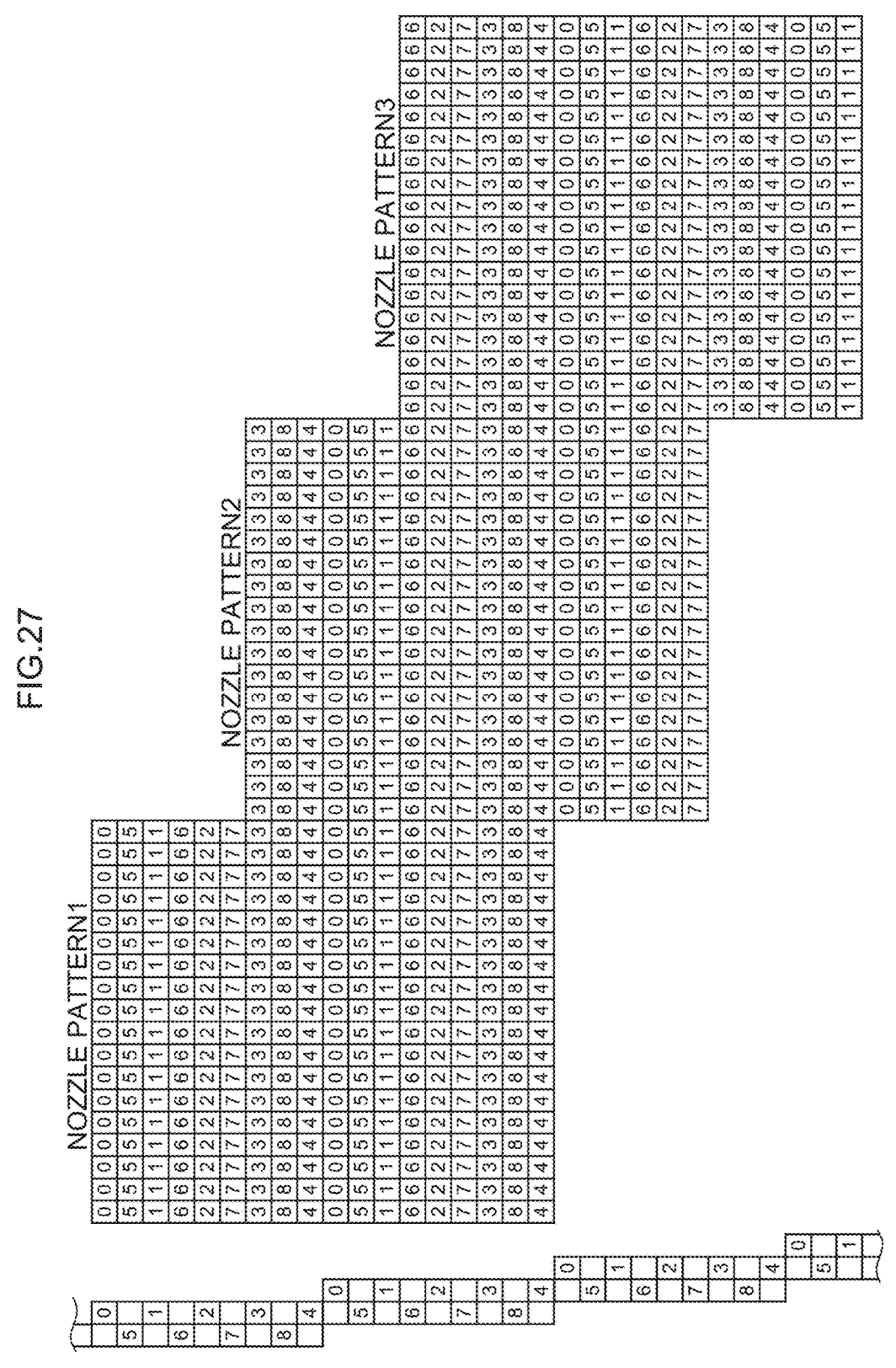

FIG. 27 is an explanatory diagram of the nozzle numbers corresponding to the individual pixels of the dither mask in the case of the mask shifting processing. FIG. 27 illustrates an example of performing scanning with one nozzle in the main scanning direction while moving the nozzle array 61A for which the nozzle pitch is two pixels and the number of the nozzles is nine in the sub scanning direction by nine pixels each, and illustrates the nozzle numbers corresponding to the individual pixels of the dither mask in the case of shifting the dither mask in the sub scanning direction by six pixels each and arranging it, in the case of changing a position in the main scanning direction and arranging the dither mask upon the application of the dither mask. In FIG. 27, a crosswise direction is the main scanning direction, and the longitudinal direction is the sub scanning direction.

As illustrated in FIG. 27, depending on the position in the main scanning direction of the dither mask, there are three kinds of the nozzle numbers corresponding to the individual pixels of the dither mask.

From the left in FIG. 27, a pattern of the nozzle numbers corresponding to the individual pixels of the dither mask at a first position in the main scanning direction of the dither mask is defined as "nozzle pattern 1". A pattern of the nozzle numbers corresponding to the individual pixels of the dither mask at a second position in the main scanning direction is defined as "nozzle pattern 2", and a pattern of the nozzle numbers corresponding to the individual pixels of the dither mask at a third position in the main scanning direction is defined as "nozzle pattern 3".

Also, it is assumed that the nozzle ejection rates of the individual nozzles in the nozzle array are set as in FIG. 11. In this case, the nozzle ejection rates corresponding to the individual pixels of the dither mask are like a graph in FIG. 28. A horizontal axis in FIG. 28 indicates a row number of the dither mask. A vertical axis indicates the nozzle ejection rate. Since the nozzle ejection rate does not change in the main scanning direction (since it is fixed), the graph in FIG. 28 indicates the nozzle ejection rates on individual lines at the individual positions in the sub scanning direction. The positions in the sub scanning direction of the individual lines are expressed by the row numbers.

Figure 28:
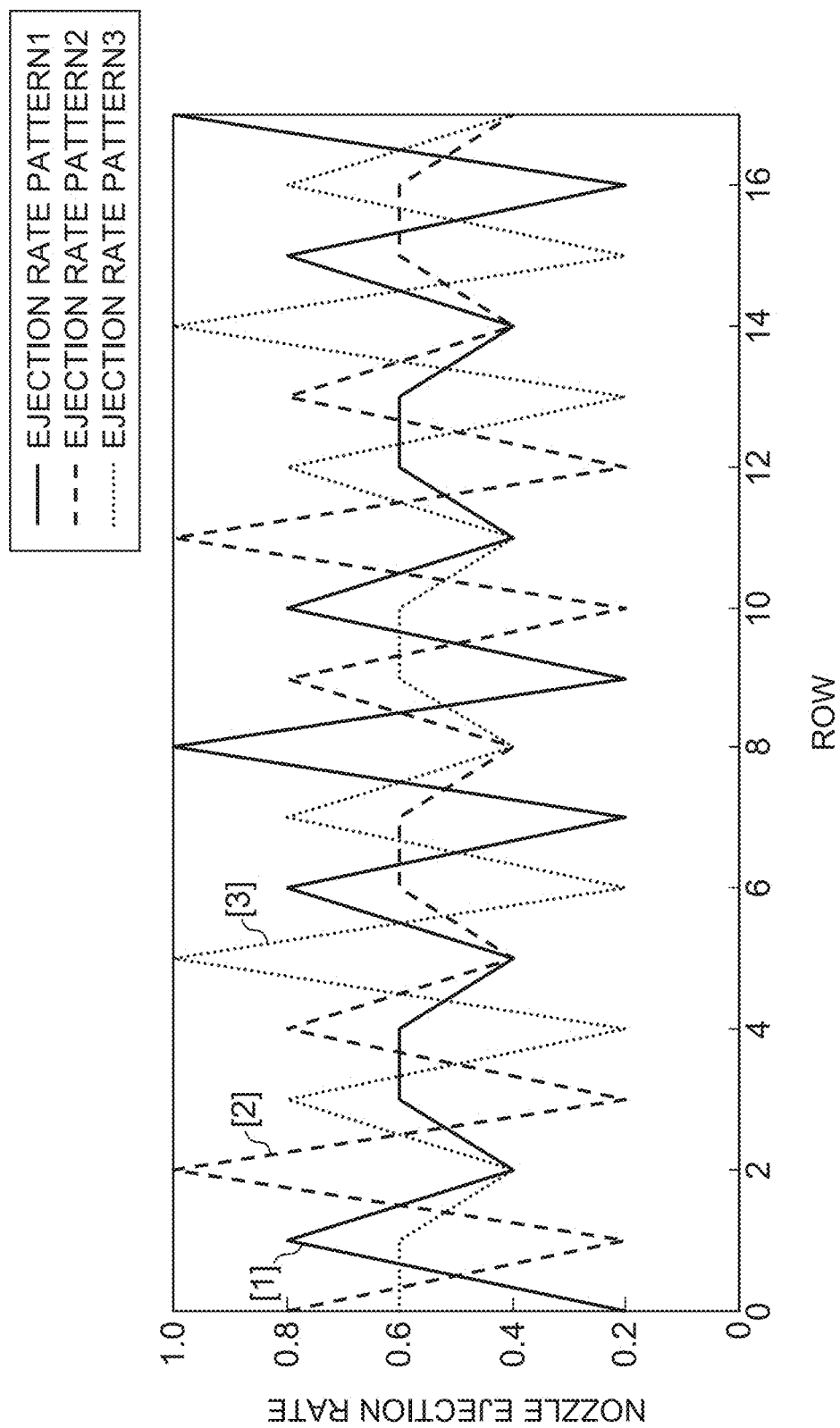
FIG. 28 is a graph illustrating an ejection rate pattern corresponding to each nozzle pattern illustrated in FIG. 27.

A graph [1] in FIG. 28 indicates a pattern of the nozzle ejection rates in the nozzle pattern 1. The pattern of the nozzle ejection rates in the nozzle pattern 1 is called "ejection rate pattern 1". A graph [2] indicates a pattern of the nozzle ejection rates in the nozzle pattern 2. The pattern of the nozzle ejection rates in the nozzle pattern 2 is called "ejection rate pattern 2". A graph [3] indicates a pattern of the nozzle ejection rates in the nozzle pattern 3. The pattern of the nozzle ejection rates in the nozzle pattern 3 is called "ejection rate pattern 3".

FIG. 29 is an explanatory diagram schematically illustrating the values of the nozzle ejection rates in the ejection rate patterns 1, 2 and 3 by shades. A darker color indicates a larger value of the nozzle ejection rate.

Figure 30:
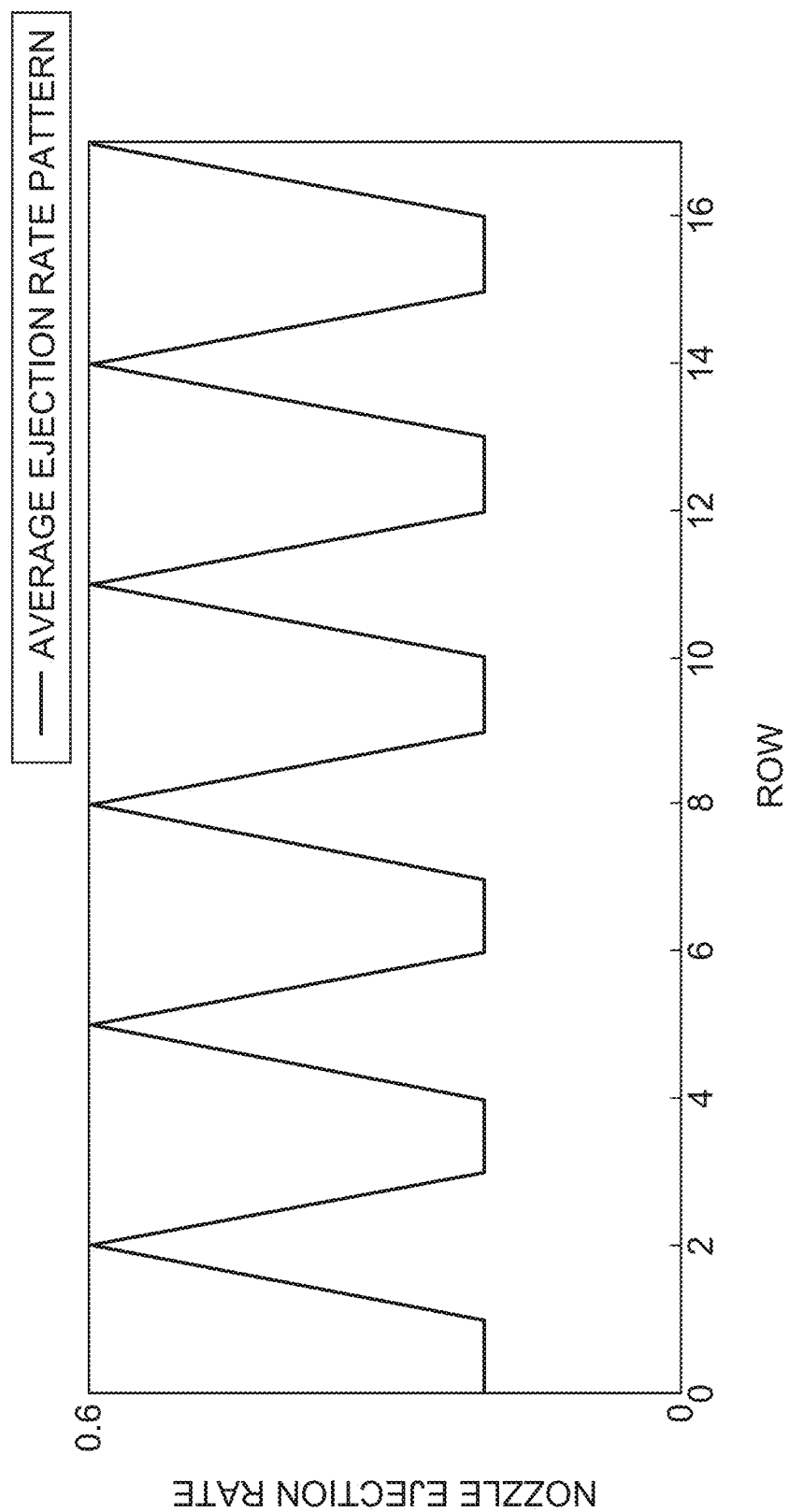
FIG. 30 is a graph of an average ejection rate pattern of three kinds of ejection rate patterns illustrated in FIG. 28 and FIG. 29.

FIG. 30 illustrates a graph of the average ejection rate pattern of the three kinds of ejection rate patterns illustrated in FIG. 28 and FIG. 29.

FIG. 31 is an explanatory diagram schematically illustrating the values of the nozzle ejection rates in the case of applying the average ejection rate pattern to each of the nozzle patterns 1, 2 and 3 by shades. The darker color indicates the larger value of the nozzle ejection rate.

The average ejection rate pattern illustrated in FIG. 30 is a pattern for which the nozzle ejection rates on three different lines shifted by a shift amount of the dither mask on the individual lines of the original ejection rate patterns 1, 2 and 3 described in FIG. 28 are averaged. Then, since "three different lines" are circulated depending on a shift setting condition of the dither mask, even when it is shifted and arranged in the sub scanning direction by the shift amount of the dither mask as illustrated in FIG. 31, the nozzle ejection rates of the individual lines coincide. "Shift setting condition" includes a condition of the shift amount.

Then, since the nozzle ejection rates of the individual lines do not change depending on the position in the main scanning direction of the dither mask, the nozzle ejection rates of the corresponding nozzles also do not change depending on the position in the main scanning direction of the dither mask.

Figure 32:
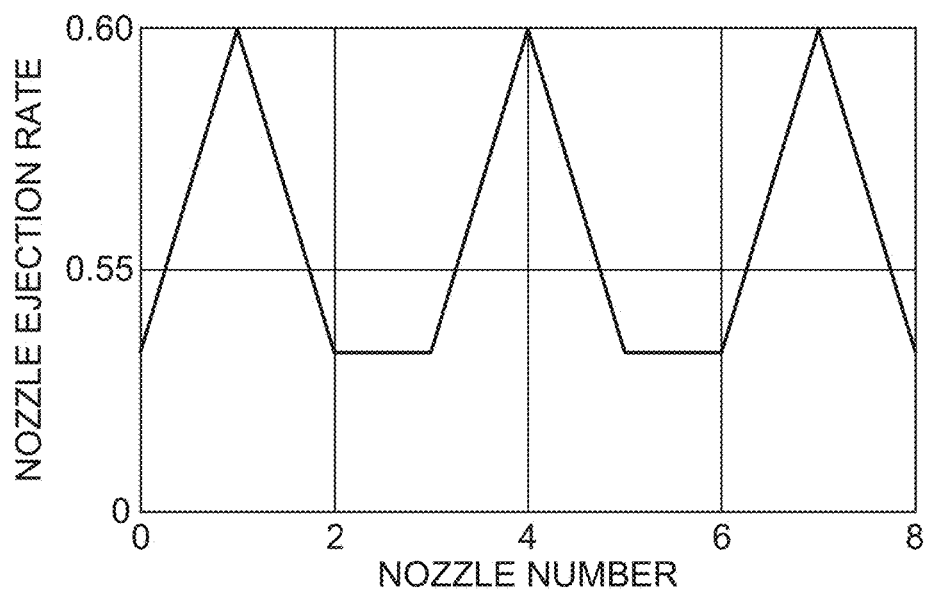
FIG. 32 is a graph illustrating the nozzle ejection rate of each nozzle derived from the average ejection rate pattern.

FIG. 32 illustrates the nozzle ejection rates of the individual nozzles derived from the average ejection rate pattern. In FIG. 32, it is recognized that it is possible to "make the nozzle ejection rate of the nozzle at the center high and the nozzle ejection rate of the nozzles at both ends low" though the nozzle ejection rates of the nozzle numbers 2, 3, 5, and 6 that are the nozzles in the middle other than the center and both ends of the nozzle array become low, differently from the initially assumed nozzle ejection rates of the individual nozzles illustrated in the figure. In FIG. 32, the nozzle number is 4 for the nozzle at the center and the nozzle numbers are 0 and 8 for the nozzles at both ends.

As described in FIG. 27 to FIG. 32, in order to control the nozzle ejection rates of the individual nozzles while shifting the dither mask in the sub scanning direction, there is a condition for the shift amount of the dither mask.

[About Condition for Shift Amount of Dither Mask]

Hereinafter, the condition for the shift amount of the dither mask is simply described.

When the dither mask is shifted and arranged in the sub scanning direction, depending on the shift amount, all the nozzle numbers are circulated for the nozzle numbers corresponding to the individual pixels of the dither mask. As a result, the average ejection rate pattern becomes all the same value, and the nozzle ejection rate cannot be controlled.

A condition of circulating all the nozzle numbers is as follows.

<<Condition of Circulating all Nozzle Numbers>>

All the nozzle numbers are circulated "in the case that the size in the sub scanning direction of the dither mask is defined as m, the shift amount in the sub scanning direction of the dither mask is defined as p, and p or m−p is equal to the nozzle pitch or a divisor of the nozzle pitch".

Provided that, m and p are positive integers whose unit is a pixel size determined from the recording resolution in the sub scanning direction, m is an integer equal to or larger than 2, and p is an integer equal to or larger than 1 and smaller than m. Also, the nozzle pitch is indicated by a positive integer whose unit is the pixel size determined from the recording resolution in the sub scanning direction.

Figure 33:
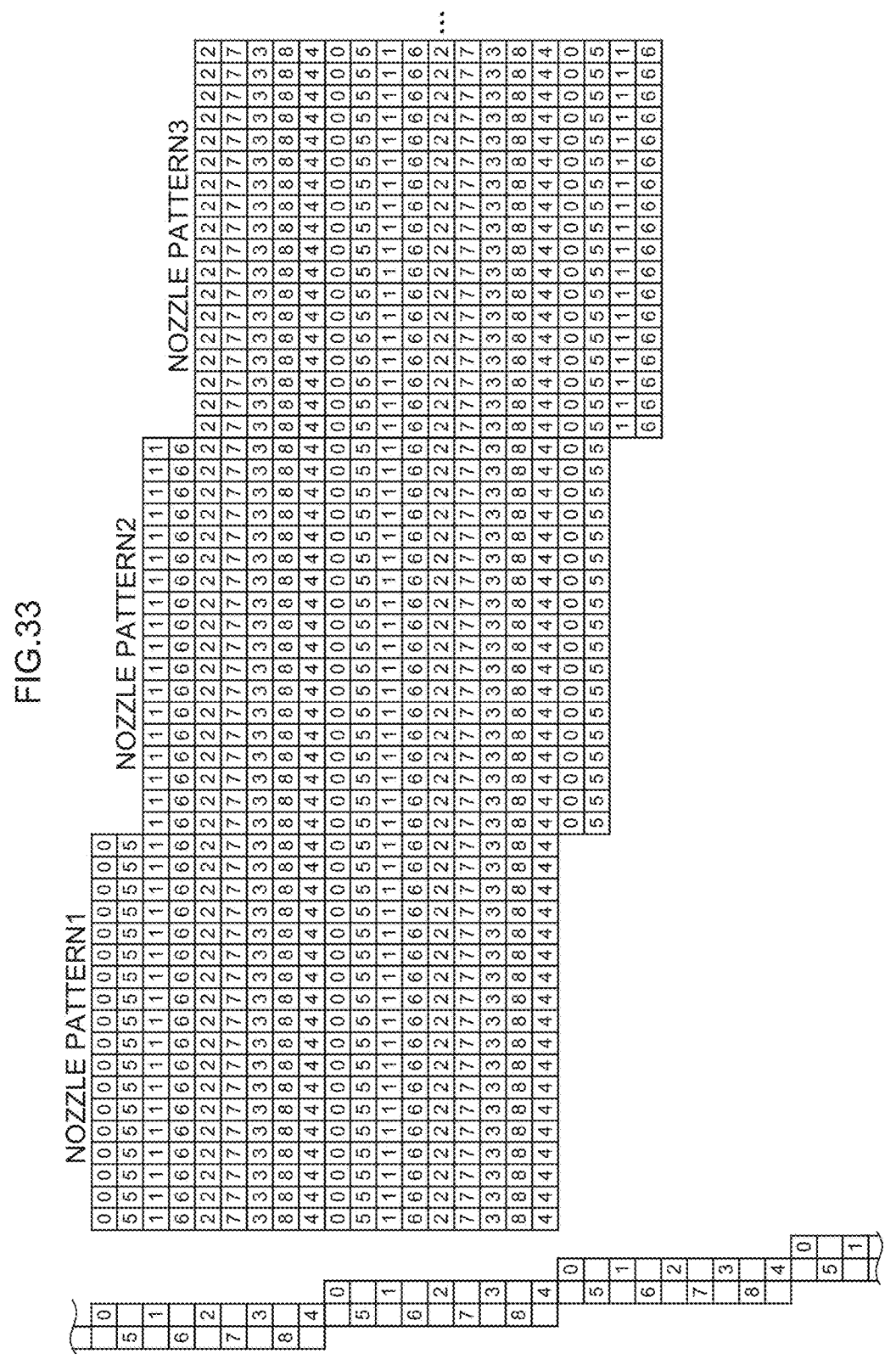
Figure 34:
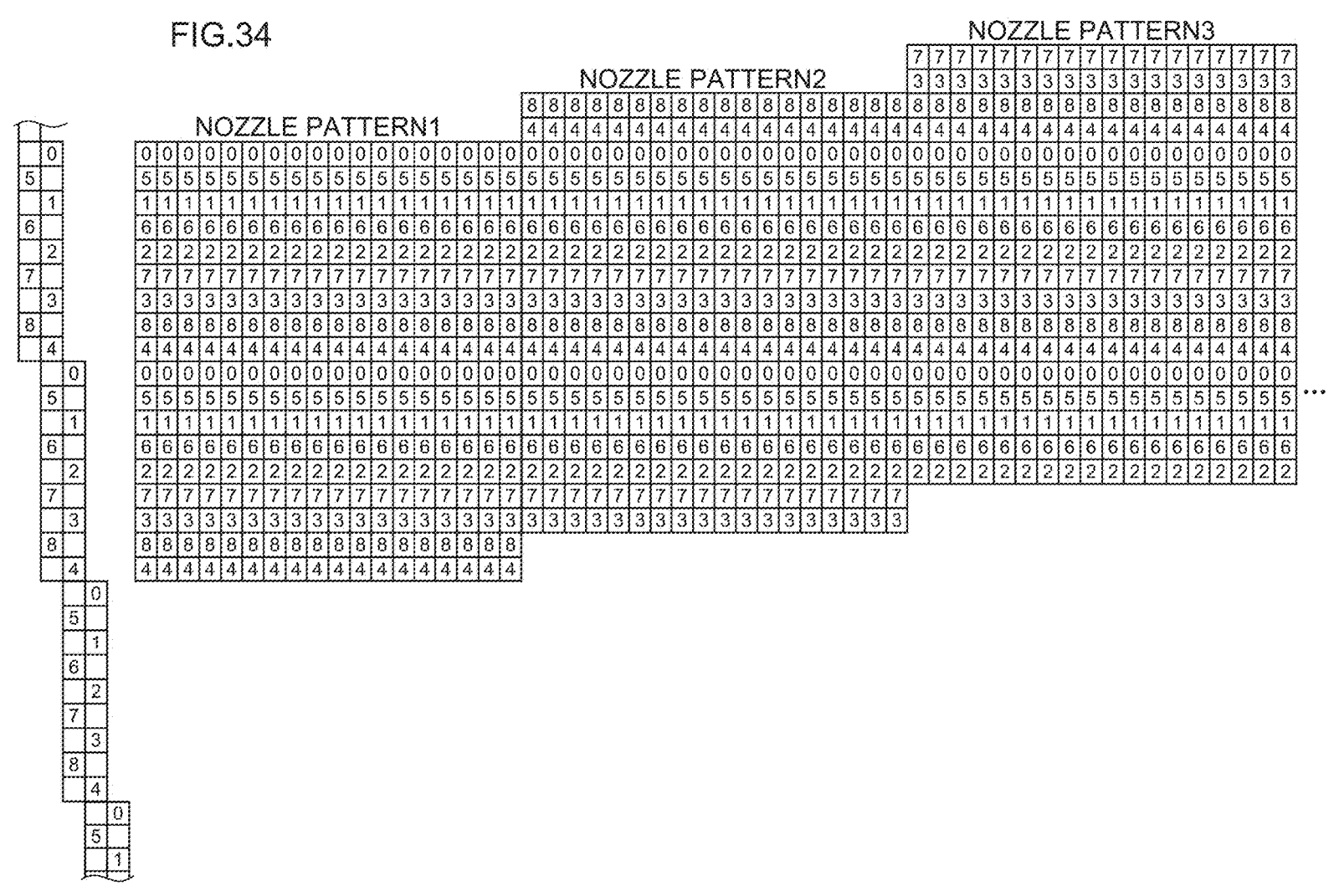

FIG. 33 and FIG. 34 are explanatory diagrams illustrating an example of the case of satisfying the condition of circulating all the nozzle numbers. FIG. 33 illustrates the case that the shift amount of the dither mask is "2". FIG. 34 illustrates the case that the shift amount of the dither mask is "16". The shift amount is noted assuming that the dither mask is shifted in a lower direction in FIG. 33.

Also, " . . . " indicated on the right side of the nozzle pattern 3 in FIG. 33 and FIG. 34 indicates that a nozzle pattern 4, a nozzle pattern 5 . . . continue on the right side of the nozzle pattern 3.

For example, in the case of the scanning pattern described in FIG. 27, as illustrated in FIG. 33, when the shift amount is equal to "2" of the nozzle pitch, it is recognized that the nozzle numbers corresponding to the individual pixels of the individual nozzle patterns are circulated through all the nozzles (0 to 8).

Or, as illustrated in FIG. 34, in the case that a value for which the shift amount "16" is subtracted from the size "18" in the sub scanning direction of the dither mask is equal to "2" of the nozzle pitch, it is recognized also that the nozzle numbers corresponding to the individual pixels of the individual nozzle patterns are circulated through all the nozzles (0 to 8).

In the case of FIG. 34, the shift amount of the dither mask is equal to shifting of "16" in the lower direction in the figure, however, it can be also recognized that the shift amount is "2" in an upper direction of FIG. 34. No matter which interpretation is adopted, it is clear that it is pertinent to the condition of circulating all the nozzle numbers.

When the shift amount of the dither mask is called a mask shift amount and the size in the sub scanning direction of the dither mask is called a mask size, even if "mask shift amount" or "mask size-mask shift amount" does not coincide with the nozzle pitch, when it is equal to the divisor of the nozzle pitch (in the case of this example, when it is equal to 1 which is the divisor of the nozzle pitch "2"), it is easily recognized from arrangement diagrams like FIG. 33 and FIG. 34 that the nozzle numbers corresponding to the individual pixels of the individual nozzle patterns are circulated through all the nozzles (0 to 8) similarly.

Also, while this example is an example that the number of main scanning paths, that is, the number of overlaps in the main scanning direction, is "1", regardless of the number of the main scanning paths, the condition of circulating all the nozzles is satisfied.

From the above observations, a condition of the shift amount of the dither mask for controlling the nozzle ejection rates of the individual nozzles while shifting the dither mask in the sub scanning direction is as follows.

<<Condition of Shift Amount of Dither Mask>>

"The size in the sub scanning direction of the dither mask is defined as m, the shift amount in the sub scanning direction of the dither mask is defined as p, and p or m−p is different from the nozzle pitch and a divisor of the nozzle pitch".

Provided that, m and p are positive integers whose unit is the pixel size determined from the recording resolution in the sub scanning direction, m is an integer equal to or larger than 2, and p is an integer equal to or larger than 1 and smaller than m. Also, the nozzle pitch is indicated by a positive integer whose unit is the pixel size determined from the recording resolution in the sub scanning direction.

When the shift amount p of the dither mask satisfies such a condition, since the nozzle numbers corresponding to the individual nozzle patterns are circulated only through some nozzle numbers, even when the nozzle ejection rates are averaged, the nozzle ejection rates of those some nozzle numbers can be averagely controlled.

By using "average ejection rate pattern" described above for the ejection rate pattern used in the first embodiment and the second embodiment, even in the case of shifting and arranging the dither mask, the dither mask capable of averagely controlling the nozzle ejection rate can be generated.

Hereinafter, a flow of specific dither mask generation processing is simply described.

Third Embodiment

The third embodiment is a form of coping with the mask shifting processing for the example described in the first embodiment.

Figure 35:
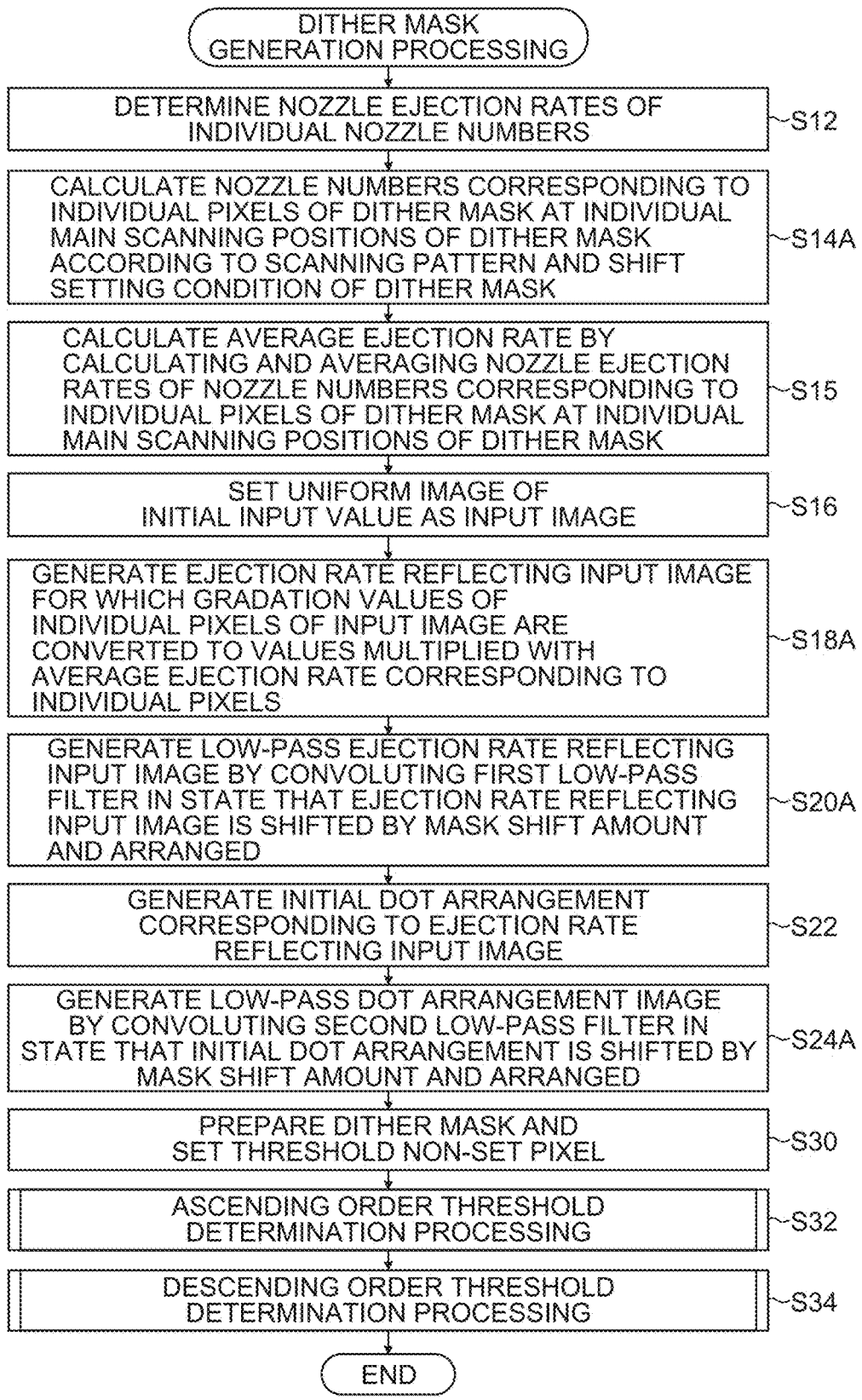
FIG. 35 is a flowchart illustrating a procedure of the dither mask generation method relating to a third embodiment.

FIG. 35 is a flowchart illustrating the dither mask generation method relating to the third embodiment. In FIG. 35, the same step numbers are attached to the processes same as or similar to that in the flowchart described in FIG. 9, and the description is omitted.

In FIG. 35, instead of step S14 in FIG. 9, a process of step S14A is adopted, and a process of step S15 is added further. Also, in FIG. 35, instead of the individual processes of steps S18, S20 and S24 in FIG. 9, processes of steps S18A, S20A and S24A are adopted.

In step S14A in FIG. 35, according to the scanning pattern and the shift setting condition of the dither mask, the nozzle numbers corresponding to the individual pixels of the dither mask are calculated at individual main scanning positions of the dither mask. Provided that, "individual main scanning positions" here mean only the main scanning positions where the relation between the individual pixels and the nozzle numbers is different. Even in the case that the main scanning positions are different, regarding the main scanning positions where the relation between the individual pixels and the nozzle numbers is the same, it is not needed to redundantly calculate the nozzle numbers corresponding to the individual pixels of the dither mask. "Main scanning position" means the position in the main scanning direction.

Next, in step S15, at the individual main scanning positions of the dither mask, the nozzle ejection rates of the nozzle numbers corresponding to the individual pixels of the dither mask are calculated, they are averaged, and the average ejection rate is calculated. The average ejection rate corresponds to "average ejection rate pattern" described in FIG. 30.

In step S18A in FIG. 35, the ejection rate reflecting input image, for which the gradation values of the individual pixels of the input image are converted to the values multiplied with the average ejection rate corresponding to the individual pixels, is generated.

Then, in step S20A, in the state that the ejection rate reflecting input image is shifted by the mask shift amount and arranged, the first low-pass filter is convoluted and the low-pass ejection rate reflecting input image is generated.

Also, in step S24A, in the state that the initial dot arrangement is shifted by the mask shift amount and arranged, the second low-pass filter is convoluted and the low-pass dot arrangement image is generated.

The initial dot arrangement in step S22 can be, as already described, obtained by executing the halftone processing such as a known dither method, an error diffusion method or a DBS method. At the time, in the case of the dither method, it is preferable to use the dither mask generated in consideration of the mask shifting processing, as the dither mask to be used. The dither mask generation method of generating the dither mask in consideration of the mask shifting processing is disclosed in Japanese Patent Application Laid-Open No. 2000-101837 gazette for instance. Also, in the case of using the DBS method for generating the initial dot arrangement, the halftone processing of the DBS method is executed in consideration of the mask shifting processing.

Figure 36:
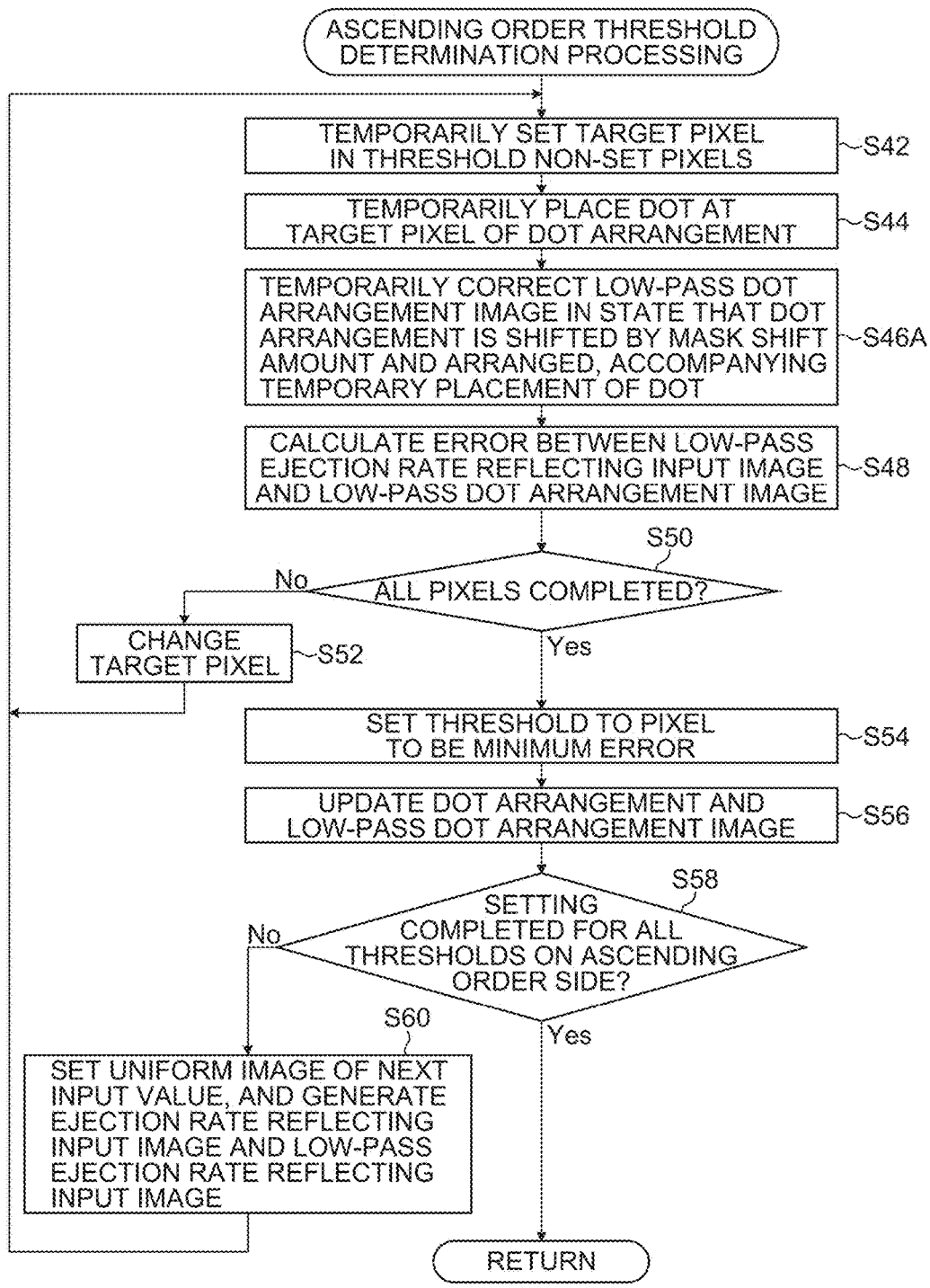
FIG. 36 is a flowchart of ascending order threshold setting processing in the third embodiment.

FIG. 36 is a flowchart illustrating a procedure of the ascending order threshold setting processing in the third embodiment. In FIG. 36, the same step numbers are attached to the processes same as or similar to that in the flowchart described in FIG. 16, and the description is omitted.

In FIG. 36, instead of step S46 in FIG. 16, a process of step S46A is adopted.

In step S46A in FIG. 36, the low-pass dot arrangement image is temporarily corrected in the state of shifting the dot arrangement by the mask shift amount and arranging it accompanying temporary placement of the dots.

Though the description relating to the descending order threshold setting processing is omitted, instead of step S76 in FIG. 19, the low-pass dot arrangement image is temporarily corrected in the state of shifting the dot arrangement by the mask shift amount and arranging it accompanying temporary removal of the dots. The other processes are similar to the first embodiment.

Fourth Embodiment

The fourth embodiment is a form of coping with the mask shifting processing for the example described in the second embodiment.

The dither mask generation method relating to the fourth embodiment is achieved by a combination of the flowchart illustrated in FIG. 35 and the flowchart of the second embodiment described in FIG. 22.

However, in step S106 of FIG. 22, the low-pass dot arrangement image is updated in the state of shifting the dot arrangement by the mask shift amount and arranging it. Since content of the other processes is already described, the description is omitted.

As described using FIG. 27 to FIG. 36, even in the case that the dither mask is shifted in the sub scanning direction and arranged, and there are the plurality of nozzle numbers corresponding to the individual pixels of the dither mask, the dither mask that can averagely control the nozzle ejection rate can be generated.

Without being limited to the case of shifting and arranging the dither mask, in the case that there are the plurality of nozzle numbers corresponding to the individual pixels of the dither mask, the dither mask can be generated similarly, and the nozzle ejection rate can be averagely controlled.

[Other Modifications]

In the first embodiment to the fourth embodiment, as the inkjet recording device, the example of the wide format printer that uses the ultraviolet curing type ink is described, however, the present invention can be applied not only to the one that uses the ultraviolet curing type ink but also to various kinds of inkjet recording devices that record images on the recording medium using various kinds of ink.

In the first embodiment to the fourth embodiment, in order to suppress banding generated when the image is recorded by the multipath type (serial type) recording head, the nozzle ejection rates of the nozzles at both ends of the nozzle array are set lower than the nozzle ejection rate of the nozzle at the center part of the nozzle array, however, the nozzle ejection rates of the individual nozzles may be appropriately changed according to the kind or recording system of the recording head.

Also, in the first embodiment to the fourth embodiment, the example of the inkjet recording device having the serial type recording head is described, however, upon applying the invention, the inkjet recording device to be a target is not limited to the serial type. The present invention can be applied also to the inkjet recording device having a single path type recording head.

Fifth Embodiment

Figure 37A:
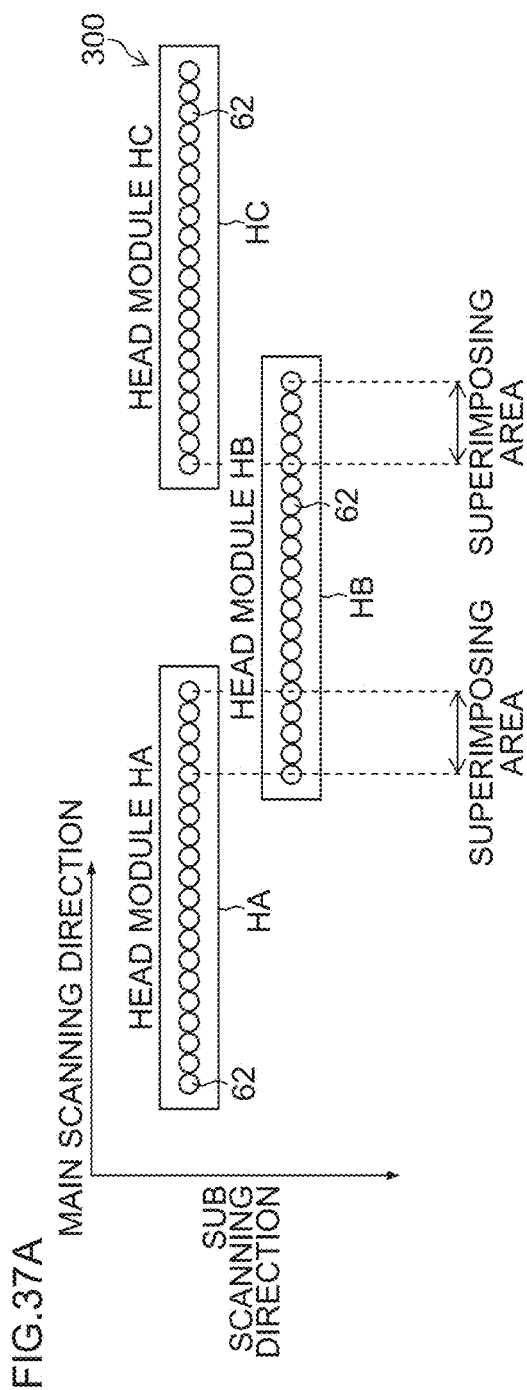
FIG. 37A is a schematic diagram of a single path type recording head.
Figure 37B:
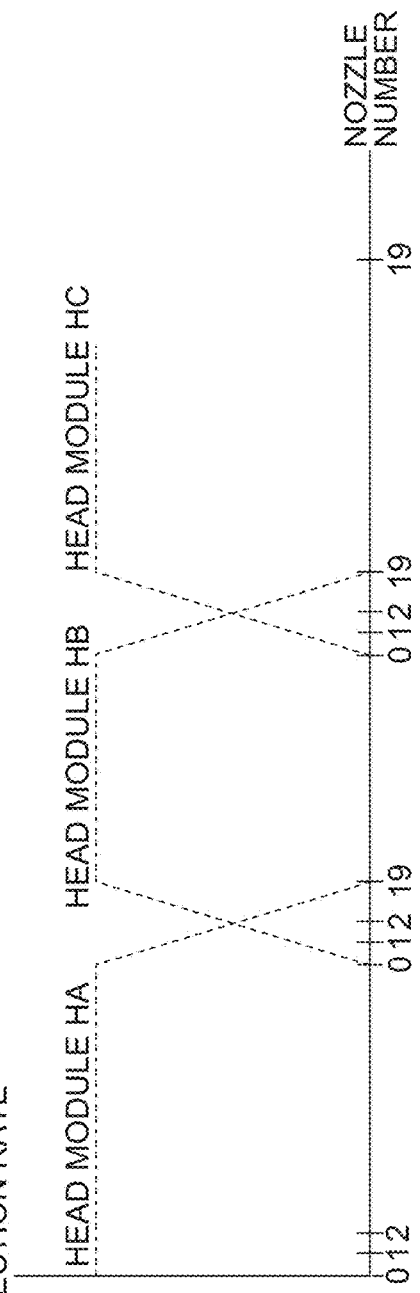
FIG. 37B is a graph illustrating the nozzle ejection rate of each nozzle of the recording head.

FIG. 37A is a schematic diagram of a single path type recording head 300. FIG. 37B is a graph illustrating the nozzle ejection rates of the individual nozzles 62 of the recording head 300.

The single path type recording head 300 is a line head having a structure for which a plurality of head modules HA, HB and HC are connected in the main scanning direction. In FIGS. 37A and 37B, for the individual head modules HA, HB and HC, the number of the nozzles 62 configuring the nozzle array in the main scanning direction is defined as "20", however, the number of the nozzles and an array form of the nozzles 62 are not limited to this example.

The recording head 300 is provided with a superimposing area of the nozzle array in order to smooth joints of the plurality of head modules HA, HB and HC and to make the error of a dot forming position and an ejection amount generated at the ends of the individual head modules HA, HB and HC inconspicuous.

That is, as illustrated in FIG. 37A, the recording head 300 is provided with the superimposing area of the head module HA and the head module HB, and the superimposing area of the head module HB and the head module HC. In the individual superimposing areas, the dots are formed by alternately using the nozzles 62 of the head module HA and the head module HB, and the head module HB and the head module HC in the sub scanning direction.

However, due to the difference in the nozzle position and the ejection amount between the head module HA and the head module HB, and the head module HB and the head module HC, image defects such as stripes and irregularity in the superimposing areas or the density irregularity in the individual head module cycles are generated.

For this problem, as illustrated in FIG. 37B, in the superimposing area, the nozzle ejection rate is set smaller near the nozzle 62 at the end of the head module. Then, when the dither mask is generated, the nozzle ejection rate illustrated in FIG. 37B is reflected and the threshold is determined.

For the specific dither mask generation method, the method similar to the method described in the first embodiment to the fourth embodiment can be used.

Using the dither mask obtained in this way, the halftone processing of the image data for printing is performed, and the ejection of the individual nozzles of the recording head 300 is controlled on the basis of the generated halftone image. Thus, generation of the image defects such as the stripes and the irregularity can be suppressed.

<About Program that Makes Computer Function as Dither Mask Generation Device>

It is possible to record a program for making a computer function as the dither mask generation device described in the embodiments described above in a computer readable medium (a non-temporary information storage medium that is a tangible object) such as a CD-ROM (Compact Disc read-only memory) or a magnetic disk, and provide the program through the information storage medium. Instead of such a form of storing and providing the program in the information storage medium, it is also possible to provide a program signal as a downloading service by utilizing a communication network like the Internet.

Also, it is also possible to provide the function of the dither mask generation device as an application server and perform a service of providing the processing function through the communication network.

Further, by incorporating the program in a computer, the computer can be made to achieve the individual functions of the dither mask generation device, and the dither mask generation function described in the above-described embodiments can be achieved.

Also, a form of incorporating some or all of the program for achieving printing control including the dither mask generation function described in the present embodiments in a high-order controller such as a host computer, and application as an operation program of a central processing unit (CPU) on an inkjet recording device side are also possible.

Advantages of Embodiments

According to the embodiments of the present invention, it is possible to generate the dither mask that can improve the graininess of the dot arrangement compared to a conventional method, and can obtain halftone images of the dot arrangement to be the target nozzle ejection rate regardless of a recording duty.

By performing halftone processing using the dither mask obtained by the present embodiments, and controlling the ejection of the ink based on the obtained halftone images, excellent images for which banding is suppressed can be formed.

[Others]

While an object is to suppress banding, stripes or irregularity due to density change in the above embodiment, banding, stripes or irregularity due to gloss change is similarly generated in the inkjet recording device, and the present invention is effective also for this problem. Also, the present invention is similarly effective for banding, stripes or irregularity by the change of a dot pattern.

For the embodiment of the present invention described above, without departing from the scope of the invention, components can be appropriately changed, added or deleted. The present invention is not limited to the embodiment described above, and many modifications are possible by persons skilled in the art within the technical idea of the present invention.

What is claimed is:

1. A dither mask generation method that generates a dither mask used in halftone processing, the method comprising:

a nozzle ejection rate determination process of determining a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording;

a corresponding nozzle specifying process of specifying the nozzle corresponding to the individual pixels of the dither mask by making at least one nozzle in charge of recording at each pixel position correspond to the individual pixels of the dither mask;

a nozzle ejection rate reflecting processing process of performing processing of reflecting the nozzle ejection rate on an evaluation index when individual thresholds of the dither mask are set;

a threshold setting process of setting the thresholds to the individual pixels of the dither mask on the basis of the evaluation index;

a gradation conversion process of converting gradation values of the individual pixels, reflecting the nozzle ejection rates of the nozzles corresponding to the individual pixels, which are specified by the corresponding nozzle specifying process, on the gradation values of the individual pixels in an input value uniform image, wherein an input image reflecting the nozzle ejection rate is generated by the gradation conversion process; and a correction process of correcting the nozzle ejection rate, wherein in the correction process, a correction is performed to the value of the nozzle ejection rate that makes an average gradation value per unit area be invariable before and after reflecting the nozzle ejection rate in the gradation conversion process.

2. The dither mask generation method according to claim 1, wherein the plurality of nozzles corresponding to the individual pixels of the dither mask are present.

3. The dither mask generation method according to claim 1, wherein the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

4. The dither mask generation method according to claim 3, wherein, in the nozzle ejection rate determination process, the nozzle ejection rate of the nozzle arranged at an end of the nozzle array is made lower than the nozzle ejection rate of the nozzle arranged at a center part of the nozzle array.

5. A dither mask generation method that generates a dither mask used in halftone processing, the method comprising:

a nozzle ejection rate determination process of determining a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording;

a corresponding nozzle specifying process of specifying the nozzle corresponding to the individual pixels of the dither mask by making at least one nozzle in charge of recording at each pixel position correspond to the individual pixels of the dither mask;

a nozzle ejection rate reflecting processing process of performing processing of reflecting the nozzle ejection rate on an evaluation index when individual thresholds of the dither mask are set;

a threshold setting process of setting the thresholds to the individual pixels of the dither mask on the basis of the evaluation index;

a gradation conversion process of converting gradation values of the individual pixels, reflecting the nozzle ejection rates of the nozzles corresponding to the individual pixels, which are specified by the corresponding nozzle specifying process, on the gradation values of the individual pixels in an input value uniform image, wherein an input image reflecting the nozzle ejection rate is generated by the gradation conversion process; and a first low-pass filter processing process of generating a second image by convoluting a first low-pass filter to a first image that is an input image reflecting the nozzle ejection rate, generated by the gradation conversion process.

6. The dither mask generation method according to claim 5,
wherein the first low-pass filter is a filter of a function indicating a human visual characteristic, or a filter of a Gaussian function.

7. The dither mask generation method according to claim 5, comprising:
a first dot arrangement generation process of generating a first dot arrangement corresponding to the first image; and
a second low-pass filter processing process of generating a third image by convoluting a second low-pass filter to the first dot arrangement.

8. The dither mask generation method according to claim 7,
wherein the second low-pass filter is a filter of a function indicating a human visual characteristic, or a filter of a Gaussian function.

9. The dither mask generation method according to claim 7, comprising:
a process of temporarily setting a target pixel to threshold non-set pixels to which the threshold is not set among the pixels of the dither mask, and temporarily placing or temporarily removing a dot for the target pixel in the first dot arrangement; and
a process of temporarily correcting the third image accompanying the temporary placement or temporary removal of the dot,
wherein an error between the second image and the third image is calculated as the evaluation index.

10. The dither mask generation method according to claim 7, comprising:
a fourth image generation process of generating a fourth image indicating a difference between the second image and the third image; and
the threshold setting process of determining the pixels that improve uniformity of a gradation distribution of the fourth image in the case of correcting the third image and the fourth image accompanying execution of dot installation or removal, among the individual pixels in the first dot arrangement corresponding to the individual pixels by comparing values of the individual pixels of the fourth image, and setting the thresholds to the determined pixels.

11. The dither mask generation method according to claim 10,
wherein, in the fourth image generation process, the fourth image indicating a difference between the second image and the third image by subtraction of pixel values of the pixels corresponding to each other between the images of the second image and the third image is generated.

12. The dither mask generation method according to claim 10,
wherein, in the fourth image generation process, the fourth image indicating a ratio between the second image and the third image by division of pixel values of the pixels corresponding to each other between the images of the second image and the third image is generated.

13. A dither mask generation method that generates a dither mask used in halftone processing, the method comprising:
a nozzle ejection rate determination process of determining a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording;

a corresponding nozzle specifying process of specifying the nozzle corresponding to the individual pixels of the dither mask by making at least one nozzle in charge of recording at each pixel position correspond to the individual pixels of the dither mask;

a nozzle ejection rate reflecting processing process of performing processing of reflecting the nozzle ejection rate on an evaluation index when individual thresholds of the dither mask are set; and a threshold setting process of setting the thresholds to the individual pixels of the dither mask on the basis of the evaluation index, wherein the method is configured such that
the nozzle ejection rate of each nozzle is controlled by the dither mask, and
the dither mask is position-shifted in a sub scanning direction and arranged, to image data, when the dither mask is applied to the image data, in the halftone processing,
wherein, in the case that m is an integer equal to or larger than 2 and p is an integer equal to or larger than 1 and is smaller than m, a size in the sub scanning direction of the dither mask is m, and a shift amount in the sub scanning direction of the dither mask is p, and
wherein p and m−p are different from a nozzle pitch in the sub scanning direction and a divisor of the nozzle pitch.

14. A dither mask generation device that generates a dither mask used in halftone processing, the device comprising:
a nozzle ejection rate determination unit that determines a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording;

a corresponding nozzle specifying unit that specifies the nozzle corresponding to the individual pixels of the dither mask by making at least one nozzle in charge of recording at each pixel position correspond to the individual pixels of the dither mask;

a nozzle ejection rate reflecting processing unit that performs processing of reflecting the nozzle ejection rate on an evaluation index when individual thresholds of the dither mask are set;

a threshold setting unit that sets the thresholds to the individual pixels of the dither mask on the basis of the evaluation index;

a gradation conversion unit that converts gradation values of the individual pixels, reflecting the nozzle ejection rates of the nozzles corresponding to the individual pixels, which are specified by the corresponding nozzle specifying unit, on the gradation values of the individual pixels in an input value uniform image, wherein an input image reflecting the nozzle ejection rate is generated by the gradation conversion unit; and a correction unit that corrects the nozzle ejection rate, wherein by the correction unit, a correction is performed to the value of the nozzle ejection rate that makes an average gradation value per unit area be invariable before and after reflecting the nozzle ejection rate by the gradation conversion unit.

15. A non-transitory computer-readable recording medium including a program for making a computer achieve a function of generating a dither mask used in halftone processing, stored thereon, such that when the program is read and executed by the computer, the computer achieves:

a nozzle ejection rate determination function of determining a nozzle ejection rate of each nozzle, that is information indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording;

a corresponding nozzle specifying function of specifying the nozzle corresponding to the individual pixels of the dither mask by making at least one nozzle in charge of recording at each pixel position correspond to the individual pixels of the dither mask;

a nozzle ejection rate reflecting processing function of performing processing of reflecting the nozzle ejection rate on an evaluation index when individual thresholds of the dither mask are set;

a threshold setting function of setting the thresholds to the individual pixels of the dither mask on the basis of the evaluation index;

a gradation conversion function of converting gradation values of the individual pixels, reflecting the nozzle ejection rates of the nozzles corresponding to the individual pixels, which are specified by the corresponding nozzle specifying function, on the gradation values of the individual pixels in an input value uniform image, wherein an input image reflecting the nozzle ejection rate is generated by the gradation conversion function; and a correction function of correcting the nozzle ejection rate, wherein by the correction function, a correction is performed to the value of the nozzle ejection rate that makes an average gradation value per unit area be invariable before and after reflecting the nozzle ejection rate by the gradation conversion function.

* * * * *